US012613811B2

(12) United States Patent
Nahmias et al.

(10) Patent No.: US 12,613,811 B2
(45) Date of Patent: Apr. 28, 2026

(54) COMPUTER ARCHITECTURE WITH DISAGGREGATED MEMORY AND HIGH-BANDWIDTH COMMUNICATION INTERCONNECTS

(71) Applicant: Luminous Computing, Inc., Santa Clara, CA (US)

(72) Inventors: Mitchell A Nahmias, Santa Clara, CA (US); Michael J. Hochberg, New York, NY (US); Thomas W. Baehr-Jones, Arcadia, CA (US); Ari Novack, New York, NY (US); David Cureton Baker, Austin, TX (US); Matthew Chang, Santa Clara, CA (US); Lei Wang, Santa Clara, CA (US); Matthew Streshinsky, Taos, NM (US); Wuchun Wu, Santa Clara, CA (US); Hamidreza Nahavandi, Santa Clara, CA (US); Brian West, Santa Clara, CA (US)

(73) Assignee: Luminous Computing, Inc., Santa Clara, CA (US)

( * ) Notice: Subject to any disclaimer, the term of this patent is extended or adjusted under 35 U.S.C. 154(b) by 173 days.

(21) Appl. No.: 18/461,105

(22) Filed: Sep. 5, 2023

(65) Prior Publication Data

US 2024/0077781 A1 Mar. 7, 2024

Related U.S. Application Data

(63) Continuation-in-part of application No. 18/096,740, filed on Jan. 13, 2023, now Pat. No. 12,117,930, (Continued)

(51) Int. Cl.
*G06F 13/16* (2006.01)
*G06F 12/02* (2006.01)
(Continued)

(52) U.S. Cl.
CPC ...... *G06F 13/1615* (2013.01); *G06F 12/0223* (2013.01); *G06F 13/1657* (2013.01); *H04B 10/2589* (2020.05); *H04B 10/40* (2013.01)

(58) Field of Classification Search
None
See application file for complete search history.

(56) References Cited

U.S. PATENT DOCUMENTS 5,576,873 A * 11/1996 Crossland ........... H04L 12/5601
398/45
6,535,661 B2 * 3/2003 Takahashi ............ H04B 10/299
385/24

(Continued)

OTHER PUBLICATIONS

Alexoudi et al., Optical RAM Row With 20 GB/s Optical Word Read/Write, IEEE, 2021 (Year: 2021).*

*Primary Examiner* — Jai M Lee
(74) *Attorney, Agent, or Firm* — Stratford Group Ltd.

(57) ABSTRACT

Conventional high performance computer connections are electron-based systems, which require the memory packages to be as close as mechanically possible to the computation engine. Low power and high bandwidth communication, e.g. photonic, links can drastically change the architecture of high-performance computers by eliminating the bottlenecks in communication and augment existing memory systems to allow them to be both high capacity and high bandwidth simultaneously. A computer system comprises: a plurality of memory aggregation devices configured to retrieve data from and store data in a plurality of random access memory modules forming a unified contiguous memory address space disaggregated from a processing unit; a plurality of computational devices configured for simultaneously launching a plurality of data signals including memory read and/or write requests for the data to the plurality of memory aggregation devices; and a plurality of communication links
(Continued)

coupling each of the plurality of memory aggregation devices to each of the plurality of computational devices for transferring the data therebetween.

20 Claims, 57 Drawing Sheets

Related U.S. Application Data which is a continuation-in-part of application No. 18/149,013, filed on Dec. 30, 2022, now Pat. No. 12,099,724.

(60) Provisional application No. 63/374,703, filed on Sep. 6, 2022, provisional application No. 63/374,705, filed on Sep. 6, 2022, provisional application No. 63/374,710, filed on Sep. 6, 2022, provisional application No. 63/374,713, filed on Sep. 6, 2022, provisional application No. 63/374,689, filed on Sep. 6, 2022.

(51) Int. Cl.
H04B 10/25 (2013.01)
H04B 10/40 (2013.01)

(56) References Cited

U.S. PATENT DOCUMENTS

| | | | | | |
|---|---|---|---|---|---|
| 7,840,140 | B2 * | 11/2010 | Gottwald | ............. | H04B 10/508 |
| | | | | | 398/193 |
| 8,422,314 | B2 | 4/2013 | Lee | | |
| 9,299,423 | B2 * | 3/2016 | Baker | ................. | G06F 13/4234 |
| 10,671,557 | B2 * | 6/2020 | Li | ........................... | H04B 10/27 |
| 10,866,376 | B1 * | 12/2020 | Ghiasi | .................. | G02B 6/4292 |
| 11,522,607 | B2 * | 12/2022 | Boroson | .............. | H04L 1/1835 |
| 11,525,956 | B2 * | 12/2022 | Bchir | ..................... | G02B 6/428 |
| 12,367,134 | B2 * | 7/2025 | Baker | ................. | G11C 29/1201 |
| 12,386,512 | B2 * | 8/2025 | Yoo | ........................ | G06F 3/0659 |
| 2014/0059286 | A1 | 2/2014 | Matsuo et al. | | |
| 2019/0317287 | A1 * | 10/2019 | Raghunathan | ......... | G02B 6/426 |
| 2022/0114121 | A1 * | 4/2022 | Thakur | ................... | G06F 13/20 |

* cited by examiner

FIG. 4B

MEMCPY WORK REQUEST

Laser Input

TM0 to TE1 Converter

TE1

TE0/2

"high-nonlinearity" TE polarization only exists as TE1 in relatively wide rib, over a very short distance

TE0/2

TE1 mode can be split by a y-branch with very low broadband loss and very good ORL, due to field null along the axis Power magnitude in an in-plane cross-section through the device (TM0 input)

Electric field magnitude in an in-plane cross-section through the device (TM0 input)

|Ey| in an in-plane cross-section through the device (TM0 input)

|Ez| in an in-plane cross-section through the device (TM0 input)

PLC (4λ WDM)

572

561

Cover glass

Front view (Si PIC side)

550

571

565

562

582

565

Cover glass

Baseplate with V-groove

560

581

Back view (fiber connector side)

COMPUTER ARCHITECTURE WITH DISAGGREGATED MEMORY AND HIGH-BANDWIDTH COMMUNICATION INTERCONNECTS

CROSS-REFERENCE TO RELATED APPLICATIONS

This application is a continuation-in-part of U.S. patent application Ser. No. 18/096,740, filed on Jan. 13, 2023, which is a continuation-in-part of U.S. patent application Ser. No. 18/149,013, filed on Dec. 30, 2022. This application claims the benefit of priority of U.S. Provisional Patent Application No. 63/374,689, filed on Sep. 6, 2022, U.S. Provisional Patent Application No. 63/374,703, filed on Sep. 6, 2022, U.S. Provisional Patent Application No. 63/374, 705, filed on Sep. 6, 2022, U.S. Provisional Patent Application No. 63/374,710, filed on Sep. 6, 2022, and U.S. Provisional Patent Application No. 63/374,713, filed on Sep. 6, 2022. All of the above applications are hereby incorporated by reference herein in their entirety.

TECHNICAL FIELD

The present disclosure relates to computer architecture, and in particular to computer architecture with communication, e.g. photonic, interconnects providing a unified contiguous memory address space disaggregated from any number of processing units, e.g. central processing units or AI training accelerators.

BACKGROUND

Conventional computer architectures are designed around the assumption that long distance communication was difficult and costly, with diminishing performance at scale because typical computers use electrical signals, which consume far more energy and carry far less information the further the transmission. Huge amounts of time, money, and effort are spent molding software around hardware to compensate for bottlenecks in communication. This leads to systems that have significant communication bottlenecks between boxes, which can limit the performance and scaling efficiency, e.g. for large AI models. In addition, these links are costly and power hungry, thanks to the interfaces required in using pluggable connectors. Although local memory solutions can provide higher bandwidths, e.g. HBM, to accelerators, adding HBM can significantly increase system costs. In addition, their low capacities lead to the requirement to split models across many processors, which can complicate the programming stack and saturate communication links. Communication bandwidth is becoming the most important bottleneck in large-scale AI. With the advent of cutting-edge silicon photonics and high-performance interconnects, data links can be built that are orders of magnitude more bandwidth-dense and power-efficient than have ever been possible. Communication is simply no longer the bottleneck for scaling and performance. Breaking these bandwidth bottlenecks enables fundamental assumptions about computer architecture to be revisited at the hardware, software, and for machine learning, even the model level.

The state of the art for high performance computer connections in electron-based systems is embodied in the High-Bandwidth-Memory (HBM) dynamic random access memory (DRAM) memory chips found in general purpose computer architectures and special purpose ones like graphic processing units (GPUs) of today. The HBM approach is to place the HBM memory packages as close as mechanically possible to the computation engine, e.g. the GPU or the central processing unit (CPU). In addition, the HBM memory architectures depend heavily on very wide data busses, e.g. 1024 bits and limit clock speeds to near the physical limits for electronic interfaces. Representative systems are A100, H100 GPUs and EPYC CPUs. For electronic based interconnects, distance means severe throughput and latency limitations. Unlike electronic interfaces, optical interfaces provide extremely high-bandwidth computer-memory data transfer over long distances allowing for the physical disaggregation of memory from compute. Such disaggregation enables the physical space for the creation of massive continuous shared, interleaved DRAM memory capacity. This provides a solution to the longstanding memory and data throughput bottleneck for AI accelerators by providing both high capacity and high bandwidth memory simultaneously. This, in turn, enables more efficient utilization of computation and a reduction in programming complexity at large scales for a variety of models.

An object of the present disclosure is to provide low power and high bandwidth-density communication, e.g. photonic, links to drastically change the architecture of high-performance computers by providing a unified contiguous memory address space disaggregated from a processing unit.

SUMMARY

Accordingly, a first apparatus includes a computer system comprising:
a plurality of memory aggregation devices configured to retrieve data from and store data in a plurality of random access memory modules forming a unified contiguous memory address space disaggregated from a processing unit;
a plurality of computational devices configured for simultaneously launching a plurality of data signals including memory read and/or write requests for the data to the plurality of memory aggregation devices; and
a plurality of optical links configured for coupling each of the plurality of memory aggregation devices to each of the plurality of computational devices for transferring the data therebetween;
wherein the plurality of computational devices are configured to read/write multiple read/write requests simultaneously in parallel across the unified contiguous memory address space in the plurality of random access memory modules via the plurality of memory aggregation devices;
wherein the plurality of optical links comprises a plurality of transmitter optical links and a plurality of receiver optical links; and
wherein the plurality of transmitter optical links comprises:
a first light source coupled to a first one of the plurality of memory aggregation devices or a first one of the plurality of computational devices configured for generating a first optical beam;
a first photonic integrated circuit (PIC) mounted on the first one of the plurality of memory aggregation devices or the first one of the plurality of computational devices comprising:
a first splitter configured for splitting the first optical beam into a plurality of first optical sub-beams;

a first plurality of modulators configured for modulating the plurality of first optical sub-beams into a plurality of first modulated optical signals;

a first optical waveguide coupled to an edge of the first PIC configured for transmitting a first one of the plurality of first modulated optical signals from the first one of the plurality of memory aggregation devices or the first one of the plurality of computational devices;

a second optical waveguide coupled to the edge of the first PIC configured for transmitting a second one of the plurality of first modulated optical signals from the first one of the plurality of memory aggregation devices or the first one of the plurality of computational devices; and a second photonic integrated circuit (PIC) mounted on the second one of the plurality of memory aggregation devices or the second one of the plurality of computational devices, comprising:

a first plurality of photodetectors for converting the first one of the plurality of first modulated optical signals and the second one of the plurality of first modulated optical signals into respective electrical signals.

According to any of the aforementioned embodiments the computer system may further comprise:

a second light source coupled to the first one of the plurality of memory aggregation devices or the first one of the plurality of computational devices configured for generating a second optical beam;

wherein the first photonic integrated circuit (PIC) includes:

a second splitter configured for splitting the second optical beam into a plurality of second optical sub-beams;

a second plurality of modulators configured for modulating the second optical sub-beams into a plurality of second modulated optical signals;

a first multiplexer configured for combining a first one of the plurality of first modulated optical signals and a first one of the plurality of second modulated optical signals into a first multiplexed optical signal; and a second multiplexer configured for combining a second one of the plurality of first modulated optical signals and a second one of the plurality of second modulated optical signals into a second multiplexed optical signal;

wherein the first multiplexed optical signal is transmitted on the first optical waveguide;

wherein the second multiplexed optical signal is transmitted on the second optical waveguide;

wherein the second photonic integrated circuit (PIC) includes:

a first demultiplexer coupled to the first optical waveguide configured for demultiplexing the first multiplexed optical signal into the first one of the plurality of first modulated optical signals and the first one of the plurality of second modulated optical signals;

a second demultiplexer coupled to the second optical waveguide configured for demultiplexing the second multiplexed optical signal into the second one of the plurality of first modulated optical signals and the second one of the plurality of second modulated optical signals.

According to any of the aforementioned embodiments the plurality of receiver optical links may comprise:

a third light source coupled to the second one of the plurality of memory aggregation devices or the second one of the plurality of computational devices configured for generating a third optical beam;

wherein the second photonic integrated circuit (PIC) comprises:

a third splitter configured for splitting the third optical beam into a plurality of third optical sub-beams;

a third plurality of modulators configured for modulating the plurality of third optical sub-beams into a plurality of third modulated optical signals;

a fourth light source coupled to the second one of the plurality of memory aggregation devices or the second one of the plurality of computational devices configured for generating a fourth optical beam;

a fourth splitter configured for splitting the fourth optical beam into a plurality of fourth optical sub-beams;

a fourth plurality of modulators configured for modulating the fourth optical sub-beams into a plurality of fourth modulated optical signals;

a third multiplexer configured for combining a first one of the plurality of third modulated optical signals and a first one of the fourth modulated optical signals into a third multiplexed optical signal;

a fourth multiplexer configured for combining a second one of the plurality of third modulated optical signals and a second one of the plurality of fourth modulated optical signals into a fourth multiplexed optical signal;

a third optical waveguide configured for transmitting the third multiplexed optical signal from the second one of the plurality of memory aggregation devices or the second one of the plurality of computational devices;

a fourth optical waveguide configured for transmitting the fourth multiplexed optical signal from the second one of the plurality of memory aggregation devices or the second one of the plurality of computational devices;

wherein the first photonic integrated circuit (PIC) also comprises:

a third demultiplexer coupled to the third optical waveguide and to the first one of the plurality of memory aggregation devices or the first one of the plurality of computational devices configured for demultiplexing the third multiplexed optical signal into the first one of the plurality of third modulated optical signals and the first one of the plurality of fourth modulated optical signals; and a fourth demultiplexer coupled to the fourth optical waveguide and to the first one of the plurality of memory aggregation devices or the first one of the plurality of computational devices configured for demultiplexing the fourth multiplexed optical signal into the second one of the plurality of third modulated optical signals and the second one of the plurality of fourth modulated optical signals; and a second plurality of photodetectors for converting the first one of the plurality of third modulated optical signals, the first one of the plurality of fourth modulated optical signals, the second one of the plurality of third modulated optical signals, and the second one of the plurality of fourth modulated optical signals into respective electrical signals.

According to any of the aforementioned embodiments the third plurality of modulators may comprise coherent modulators;

wherein the first PIC includes a plurality of coherent receivers configured to combine a first plurality of local oscillator optical signals with the first one of the plurality of third modulated optical signals, the first one of the plurality of fourth modulated optical signals, the second one of the plurality of third modulated optical signals, and the second one of the plurality of fourth modulated optical signals into respective electrical signals; and wherein the first plurality of local oscillator optical signals includes a third one of the plurality of first optical sub-beams, and a third one of the plurality of second optical sub-beams.

According to any of the aforementioned embodiments the first splitter may comprise:

an input port for receiving the first optical beam in a first fundamental (TM0) polarization mode from the first light source;

a polarization mode converter for converting the first, fundamental polarization mode (TM0) to a second, first-order polarization mode (TE1);

a y-branch splitter including a first output optical waveguide arm and a second output optical waveguide arm, each configured to output a portion of the first optical beam in the second, fundamental polarization mode (TE0).

According to any of the aforementioned embodiments the polarization mode converter may comprise:

a rib waveguide, which tapers with a first taper angle from a first end with a first width at the input port to a second end with a second wider width at a second end at the y-branch splitter; and a slab waveguide, which comprises: an initial tapered section with a second taper angle wider than the first taper angle and expanding to a maximum width wider than the second width; and a final tapered section, which narrows down from the maximum width to the second width at the second end.

According to any of the aforementioned embodiments the first multiplexer may comprise a polarization rotator and combiner for rotating a first polarization state of the first one of the plurality of first optical signals to be orthogonal to a second polarization state of the first one of the plurality of second optical signals before combining into the first multiplexed optical signal; and wherein the first demultiplexer comprises: a polarization rotator and splitter configured for splitting the first combined multiplexed optical signal into the first one of the plurality of first modulated optical signals with the first polarization state, and the first one of the plurality of second modulated optical signals with the second polarization state, and for rotating one of the first polarization state or the second polarization state to be a same polarization; and a WDM demultiplexer configured for further separating the first one of the plurality of first modulated optical signals and the first one of the plurality of second modulated optical signals into distinct optical data signals.

According to any of the aforementioned embodiments the system may further comprise: a polarization controller configured for manipulation of one or both of the first polarization state and the second polarization state;

wherein the polarization controller comprises:

a plurality of first Mach-Zehnder interferometers in series, each first Mach-Zehnder interferometer comprising parallel pairs of waveguide arms;

a phase controller in one or both of the waveguide arms;

wherein each phase controller comprises: a plurality of second Mach Zehnder interferometer stages, each of the plurality of second Mach Zehnder interferometers comprising first and second parallel waveguide arms separated by optical couplers; and a phase tuner in one or both of the first and second waveguide arms.

According to any of the aforementioned embodiments the first optical waveguide may include a first optical core of a first multi-core optical fiber optically coupled to the first PIC, and wherein the second optical waveguide includes a second optical core of the first multi-core optical fiber.

According to any of the aforementioned embodiments the first optical waveguide may include an optical interface optically coupled to the first optical core of the first multi-core optical fiber, and a first single mode fiber optically coupled to the optical interface; and wherein the second optical waveguide includes the optical interface optically coupled to the second optical core of the first multi-core optical fiber, and a second single mode fiber optically coupled to the optical interface.

According to any of the aforementioned embodiments the system may further comprise a third photonic integrated circuit substantially identical to the first photonic integrated circuit;

wherein the first one of the plurality of memory aggregation devices or the first one of the plurality of computational devices includes a first substrate;

wherein the first photonic integrated circuit (PIC) is mounted on a first surface of the first substrate; and wherein the third photonic integrated circuit (PIC) is mounted on a second surface of the first substrate opposite the first surface.

According to any of the aforementioned embodiments the first optical waveguide may comprise the third optical waveguide; and wherein the second optical waveguide comprises the fourth optical waveguide;

wherein the computer system may further comprise:

a first bidirectional demultiplexer optically coupled to the first optical waveguide and configured for directing the third multiplexed optical signal to the third demultiplexer, and for directing the first multiplexed optical signal to the first optical waveguide; and a second bidirectional demultiplexer optically coupled to the second optical waveguide and configured for directing the fourth multiplexed optical signal to the fourth demultiplexer, and for directing the second multiplexed optical signal to the second optical waveguide.

According to any of the aforementioned embodiments the first splitter may comprise:

a primary unbalanced optical splitter with an unbalanced split ratio configured for splitting the first optical beam into a first one of the plurality of first optical sub-beams and a remaining portion of the first optical beam, whereby the first one of the plurality of first optical sub-beams comprises a larger fraction of a total optical power of the first optical beam than each of the other of the plurality of first optical sub-beams; and a secondary optical splitter configured for splitting the remaining portion of the first optical beam into others of the plurality of first optical sub-signals.

According to any of the aforementioned embodiments each transmitter optical link and each receiver optical link may comprise a serializer for converting the data from parallel electrical signals to serial optical signals; and a deserializer for converting the serial optical signals into parallel electrical signals at the computational devices and the memory aggregation devices.

According to any of the aforementioned embodiments wherein the plurality of optical links may be connected to the plurality of memory aggregation devices provide substantially all of an available read/write bandwidth of the plurality of random access memory modules to be accessed simultaneously.

According to any of the aforementioned embodiments the system may further comprise a switching system configured to provide any to any switching of the data signals between the plurality of computational devices and the plurality of memory aggregation devices.

According to any of the aforementioned embodiments each computational device may include a memory copy engine configured to move the data over the optical links from any memory in any of the plurality of computational devices, the plurality of memory aggregation devices and the plurality of random access memory modules to anywhere in the plurality of random access memory modules.

According to any of the aforementioned embodiments each memory copy engine may be configured to divide transfers of data into packets and to dispatch the packets over multiple communication links in parallel and substantially simultaneously to a plurality of the plurality of memory aggregation devices for uniformly storing in a plurality of the plurality of random access memory modules.

According to any of the aforementioned embodiments the plurality of computational devices may comprise at least eight computational devices;

wherein the plurality of memory aggregation devices comprises at least eight memory aggregation devices;

wherein each memory copy engine is configured to launch at least sixteen of the memory read and/or write requests in parallel and substantially simultaneously to each memory aggregation device over the optical links there between.

According to any of the aforementioned embodiments the plurality of random access memory modules may include four to eight random access memory modules per memory aggregation device.

BRIEF DESCRIPTION OF THE DRAWINGS

Some example embodiments will be described in greater detail with reference to the accompanying drawings, wherein:

FIG. 4B is a list of 56-bit link-layer blocks;

8

Figure 10:
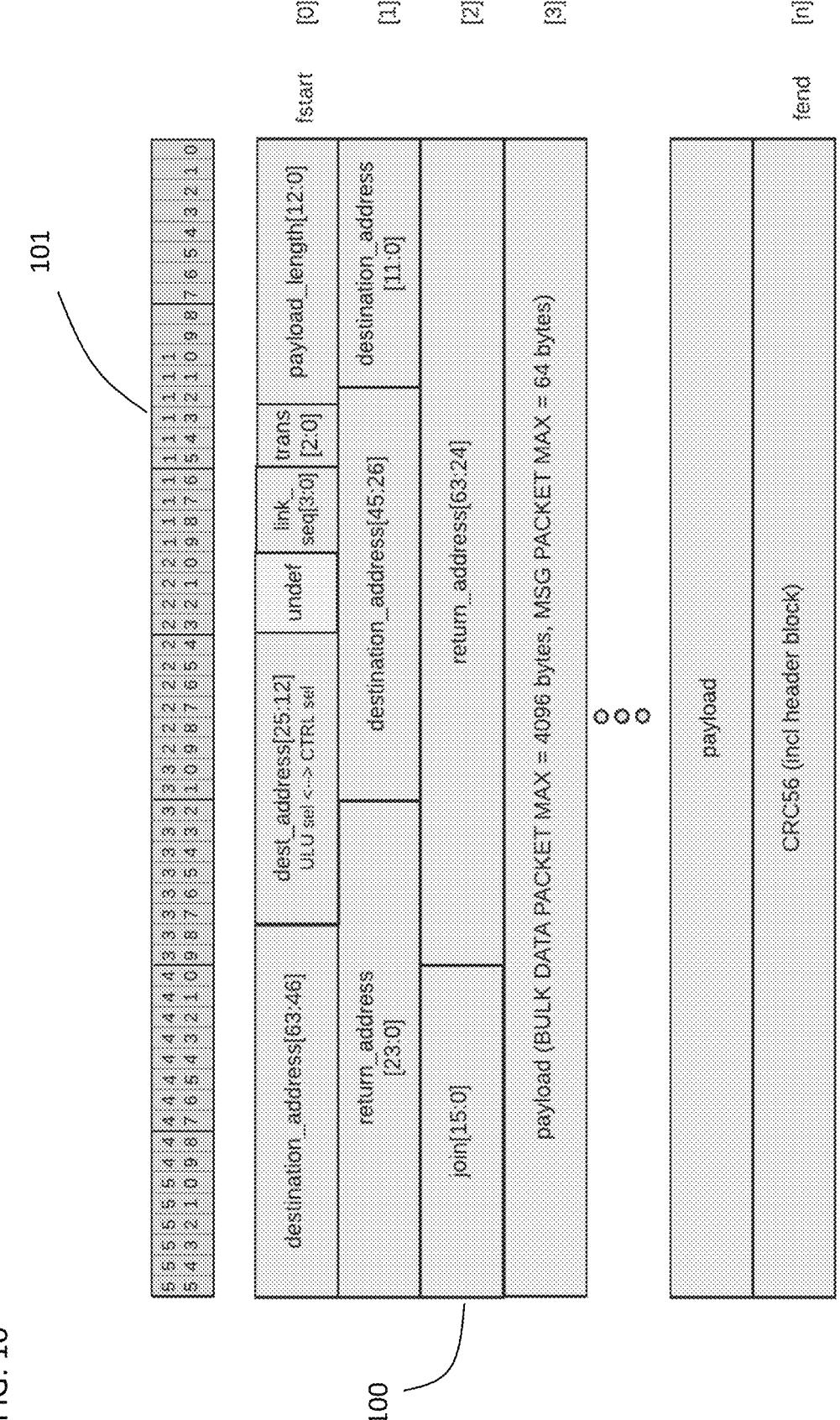
Figure 11:
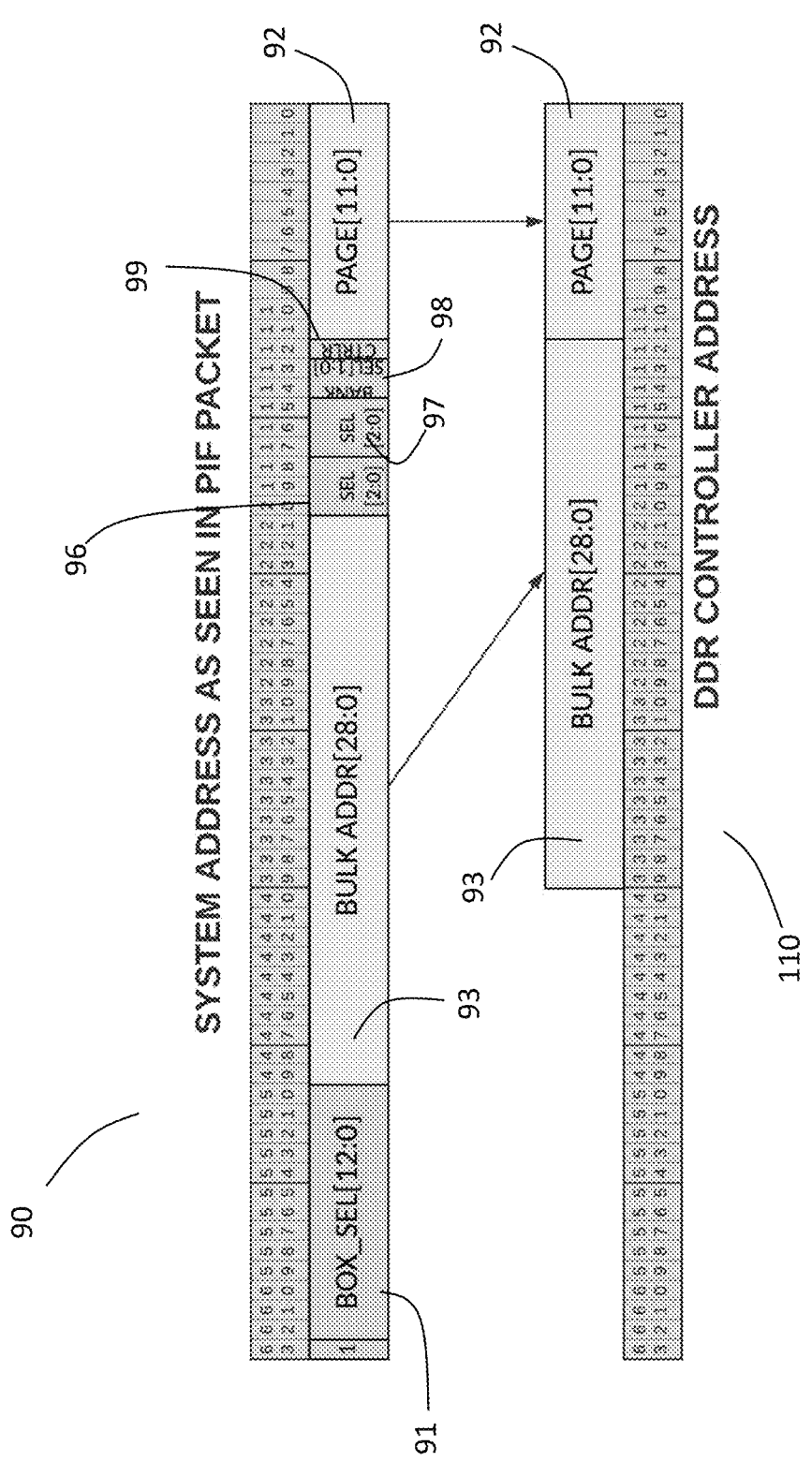
Figure 12:
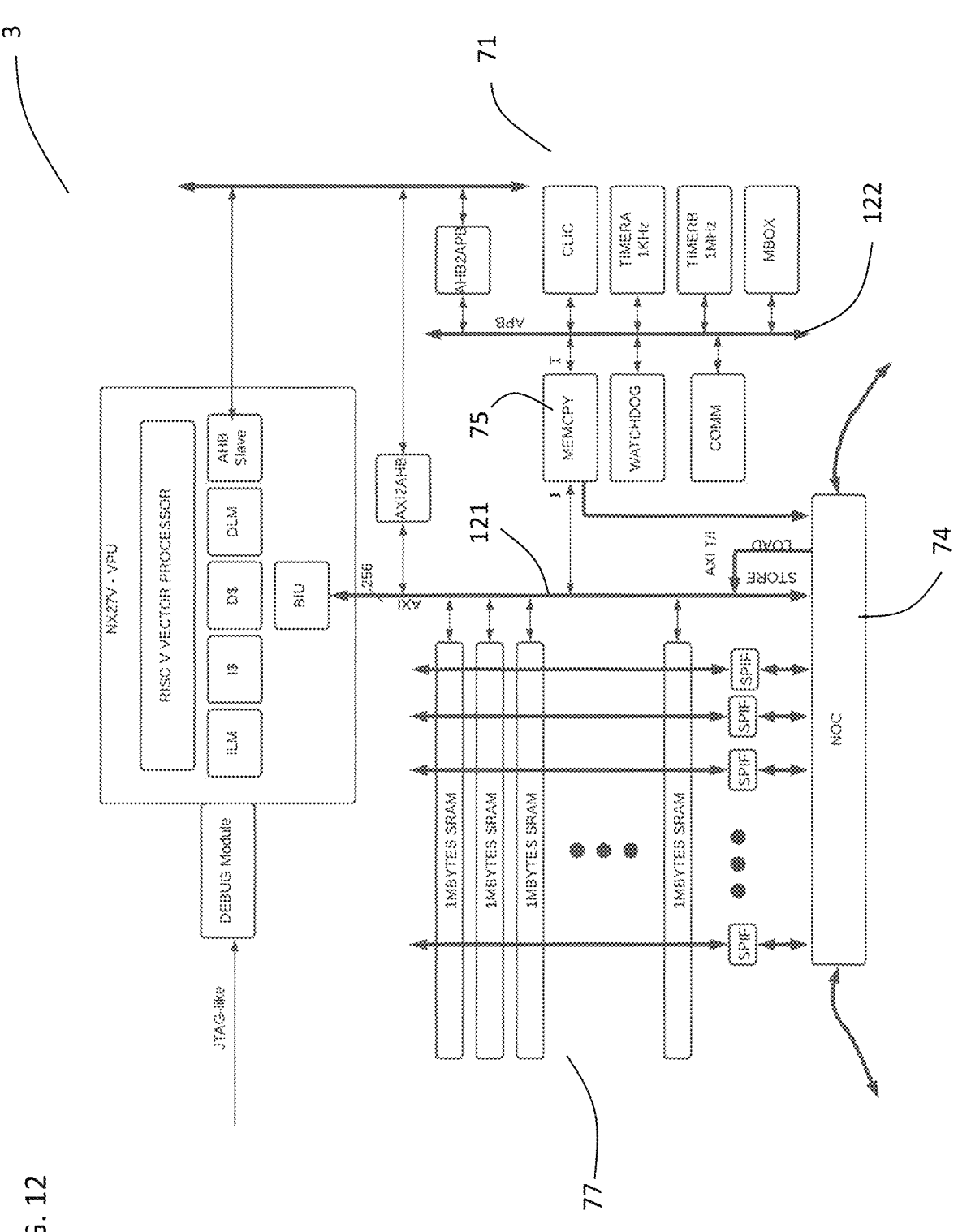
Figure 13:
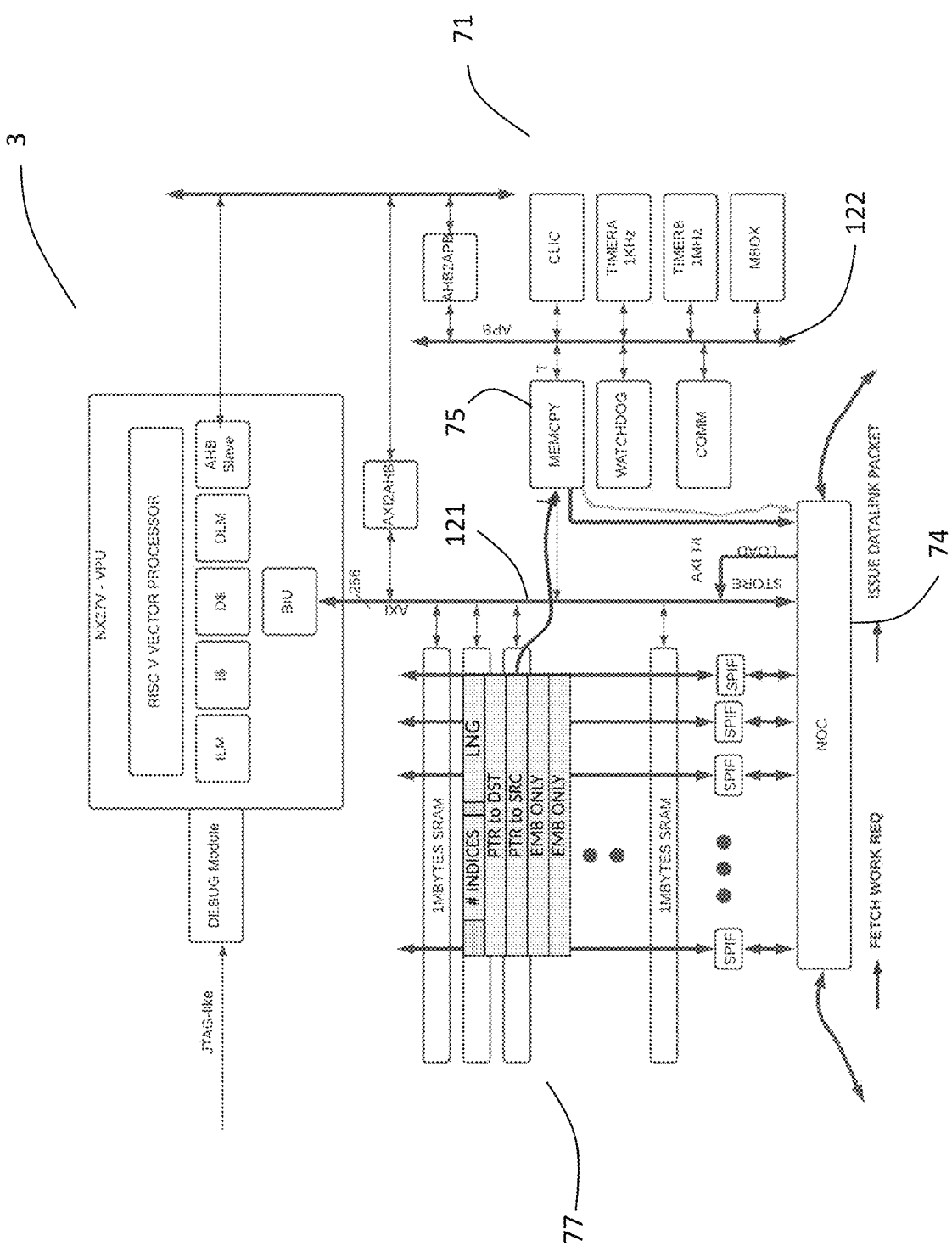
Figure 14:
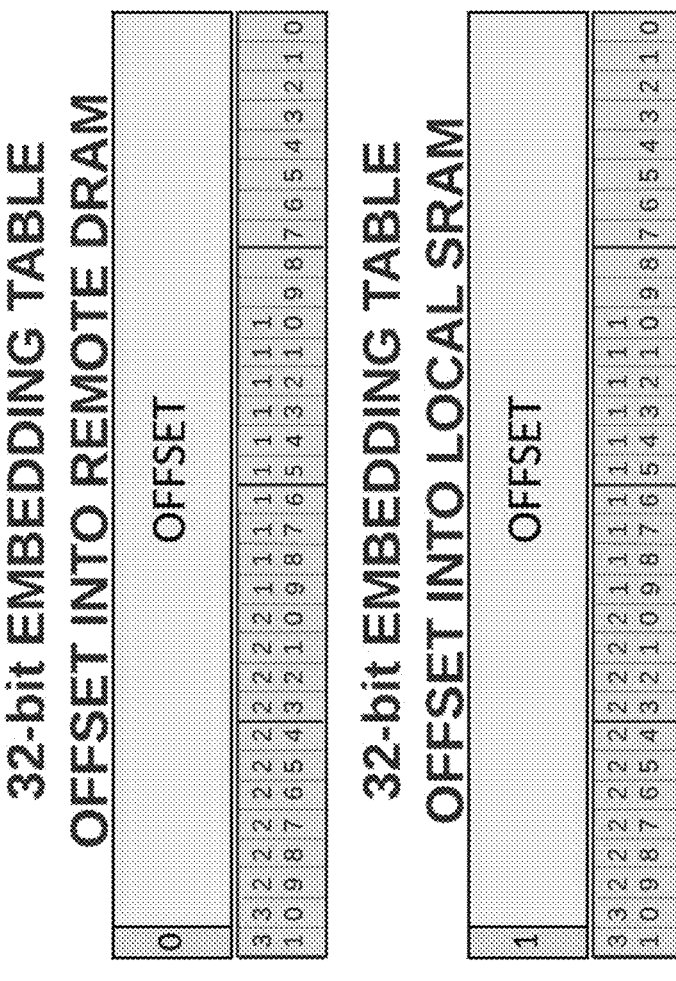
Figure 15:
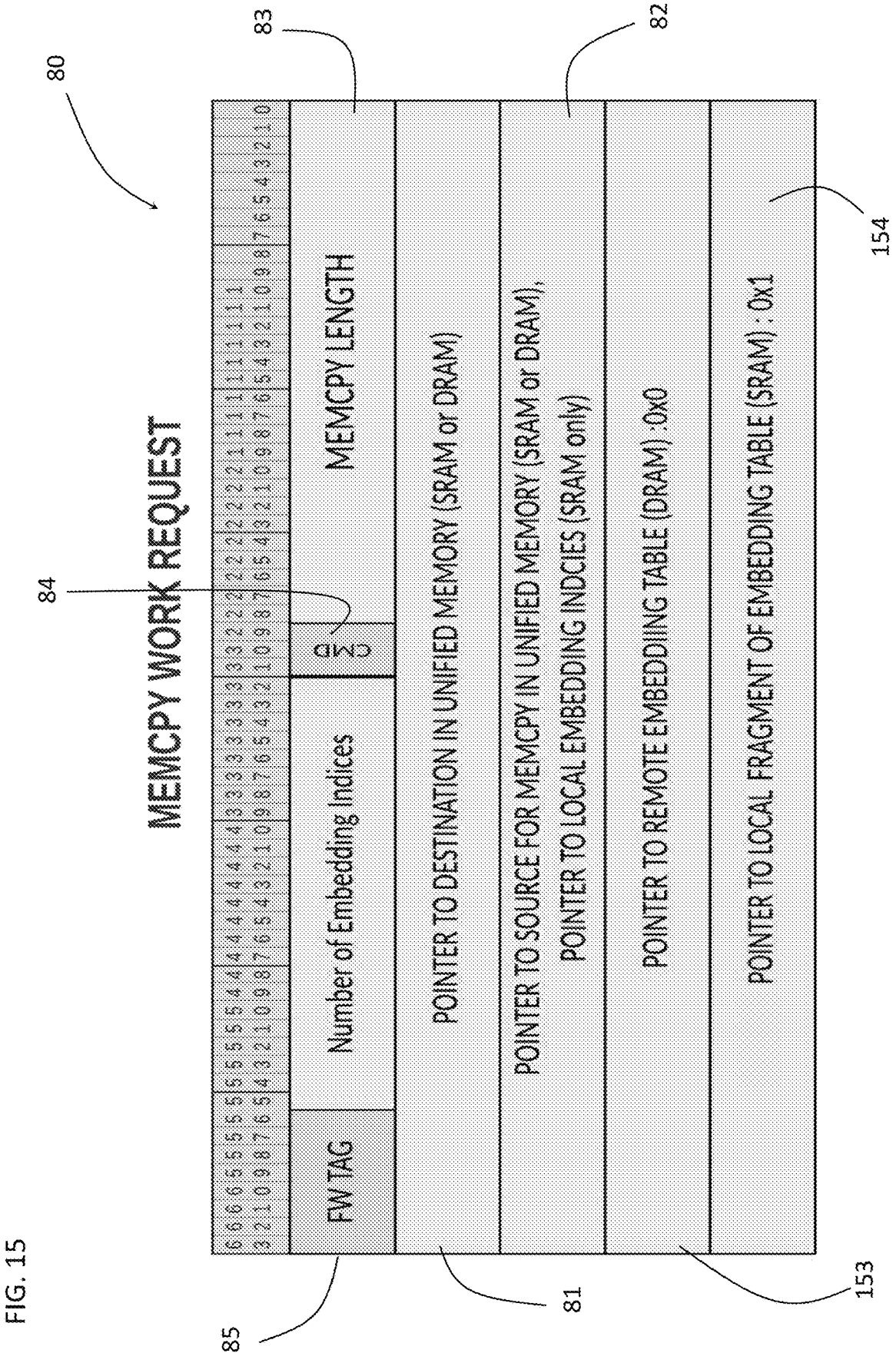
Figure 16:
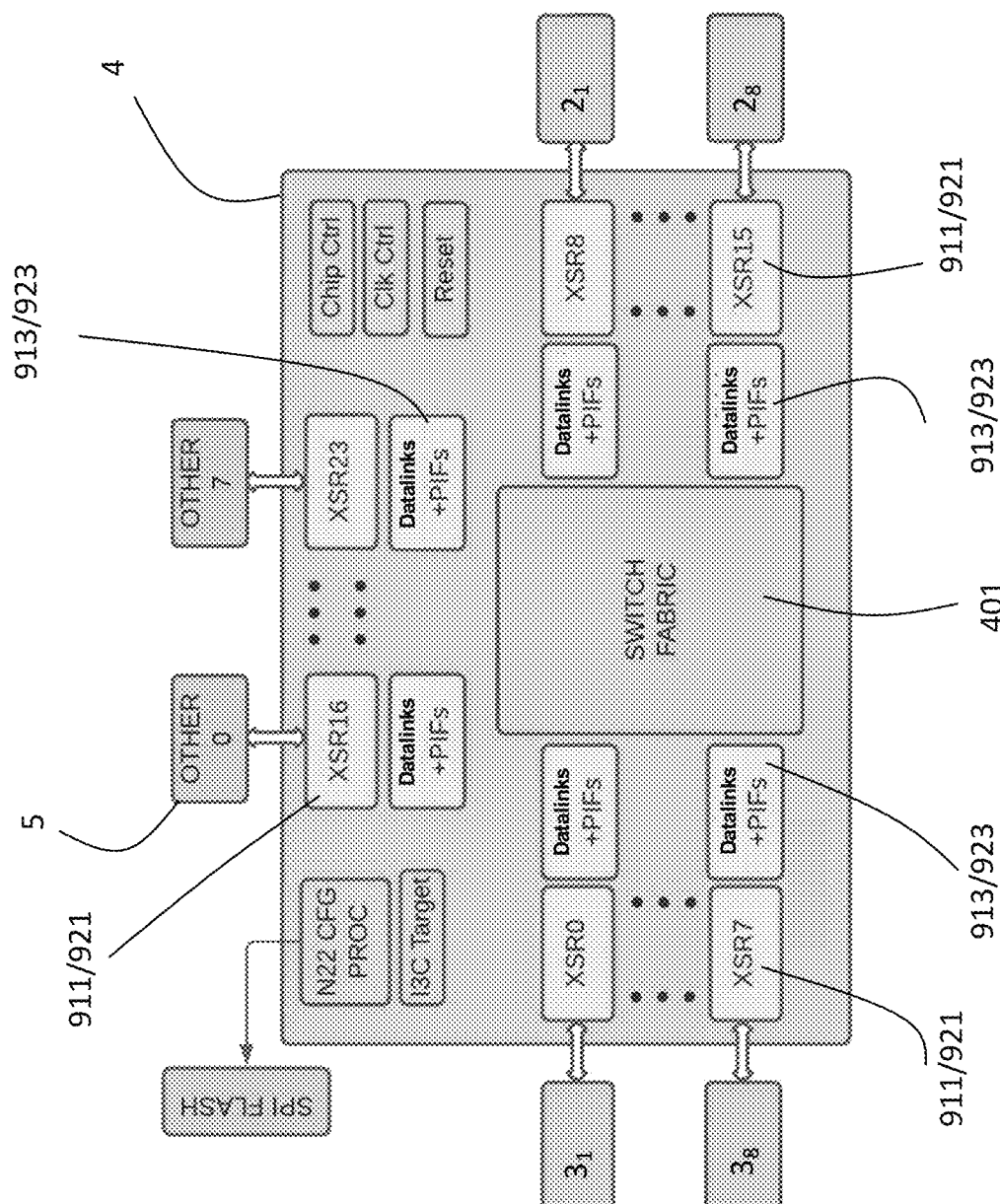
Figure 17:
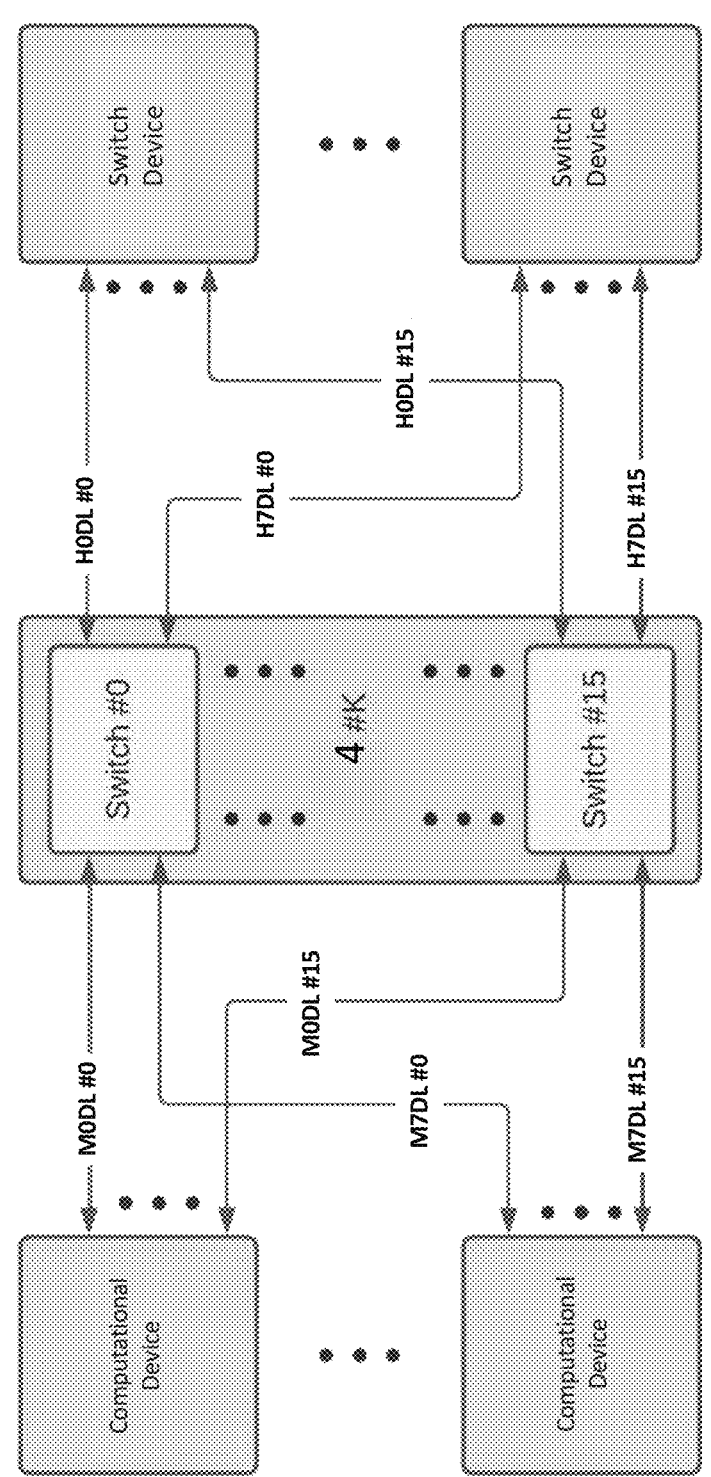
Figure 18:
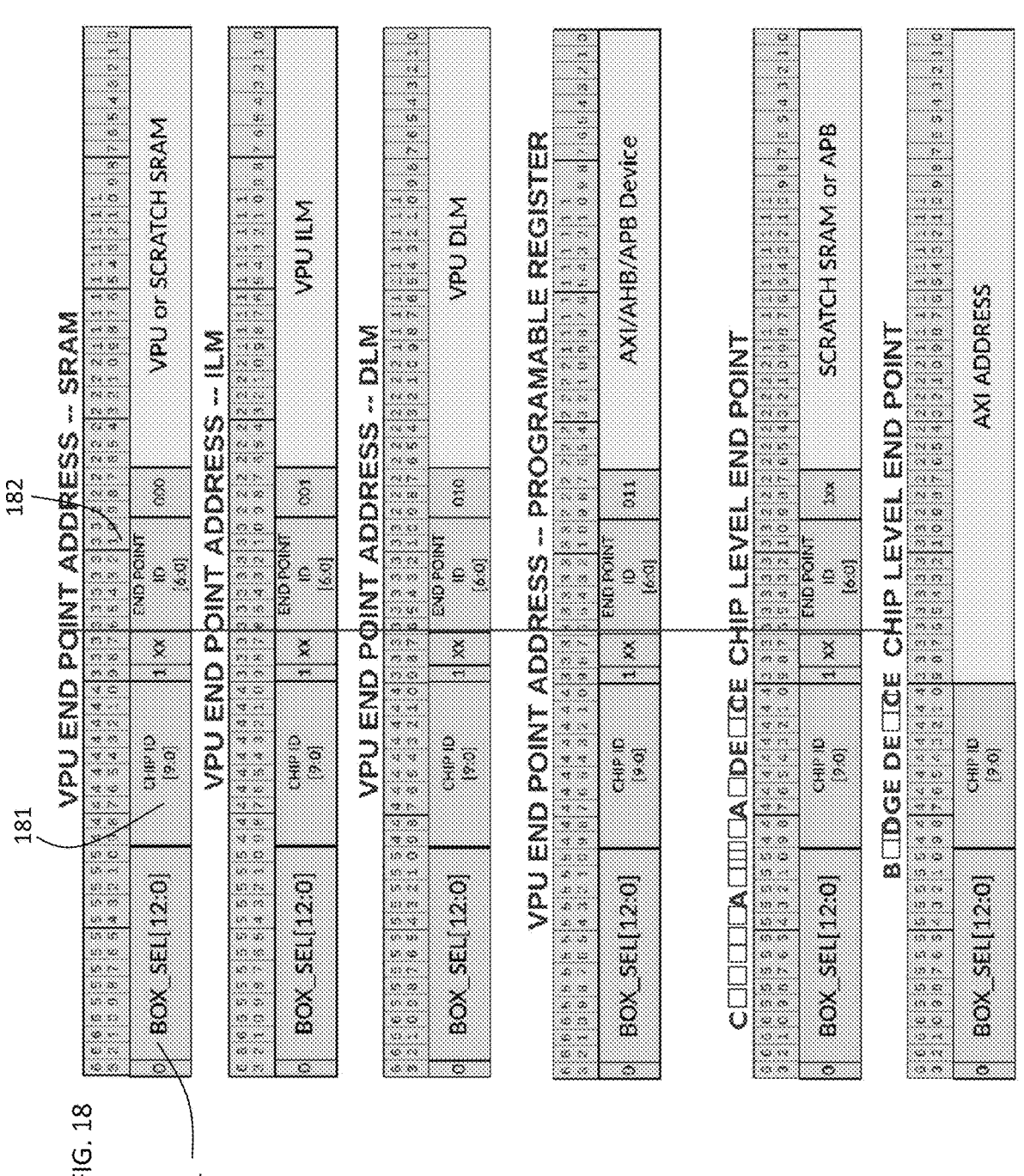
Figure 19:
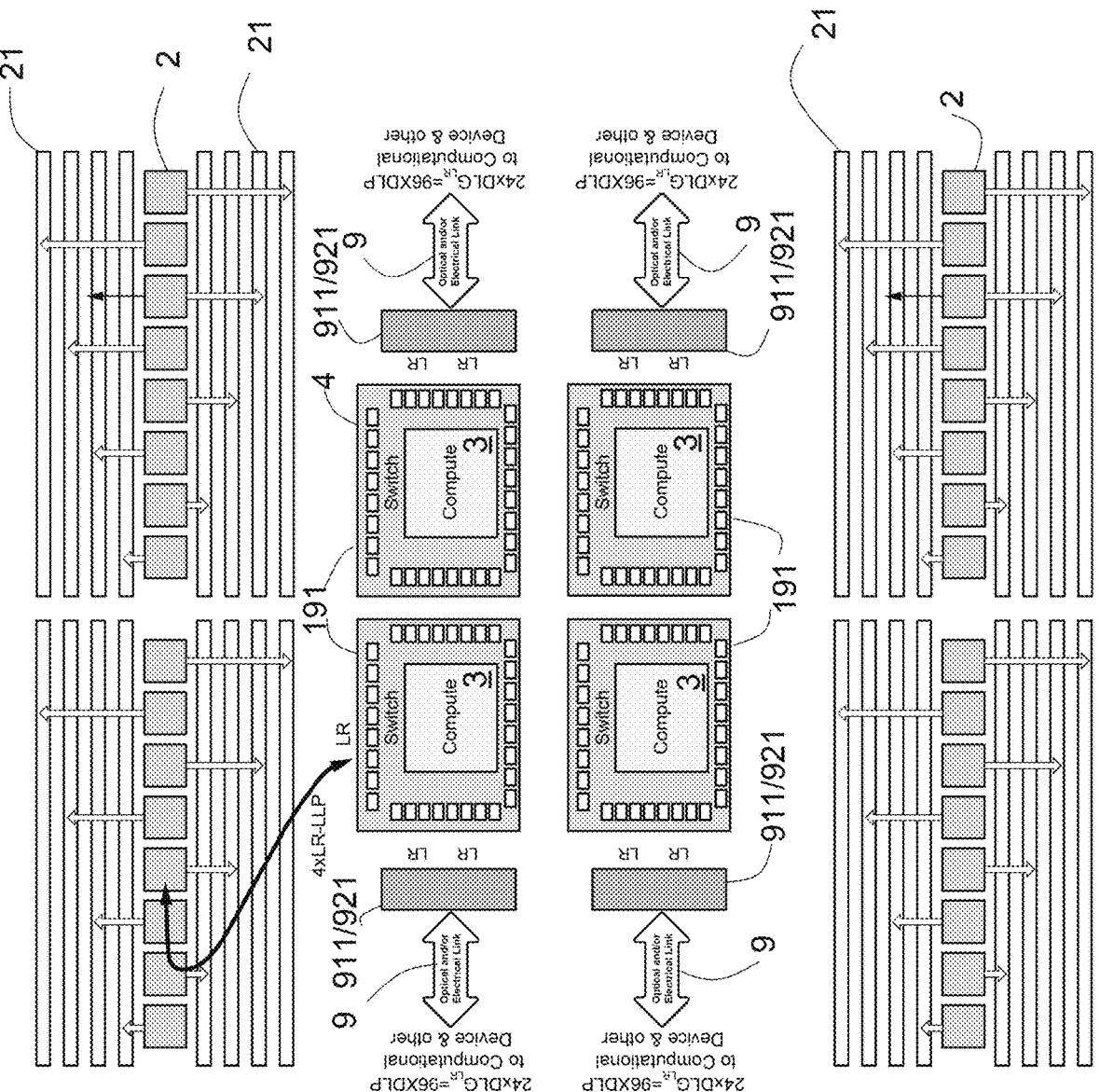
Figure 20:
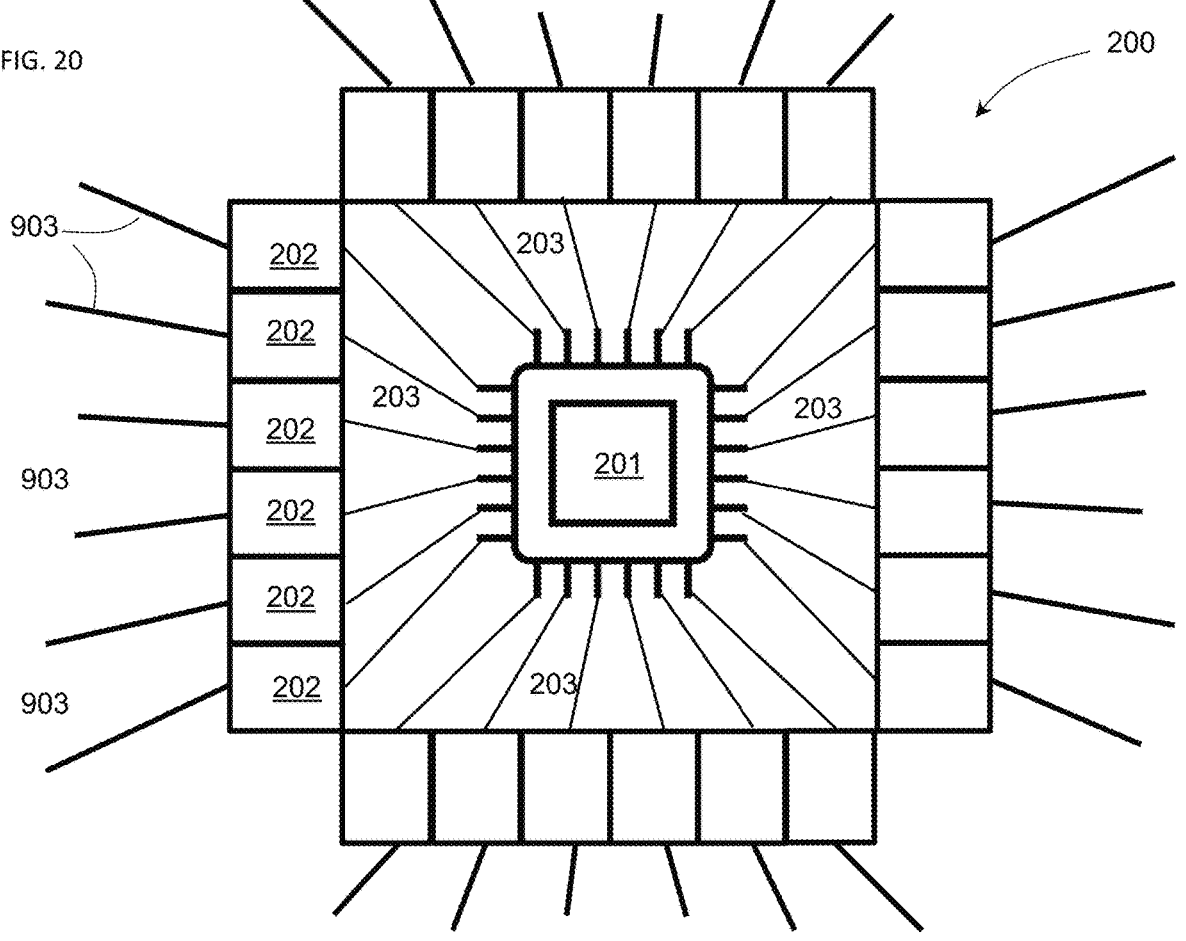
Figures 21A, 21B, 21C, 21D:
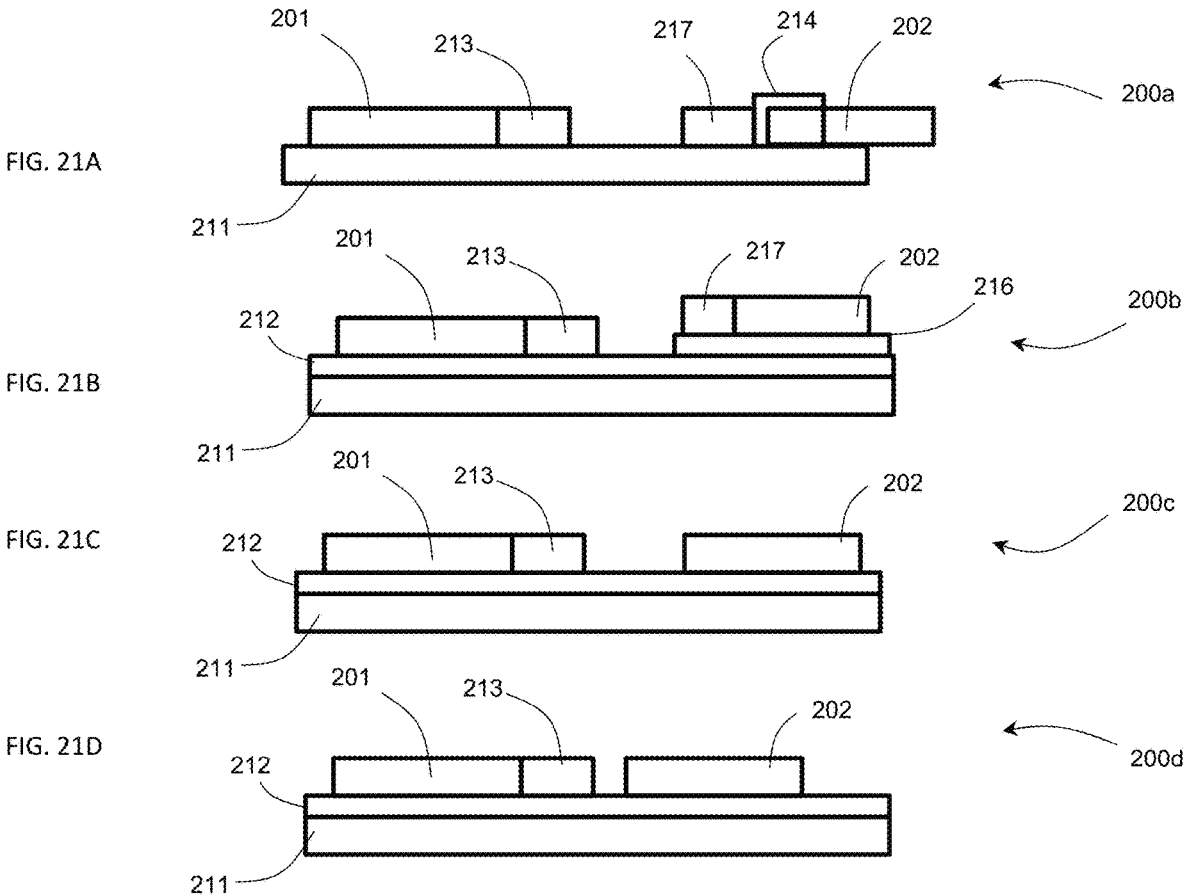
Figure 23:
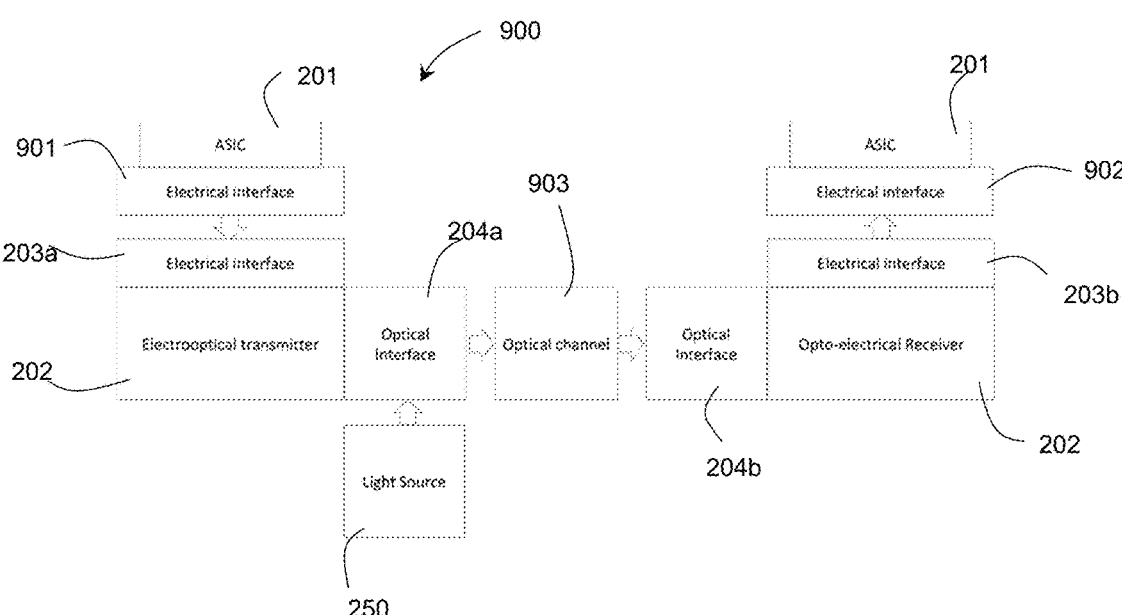
Figure 26:
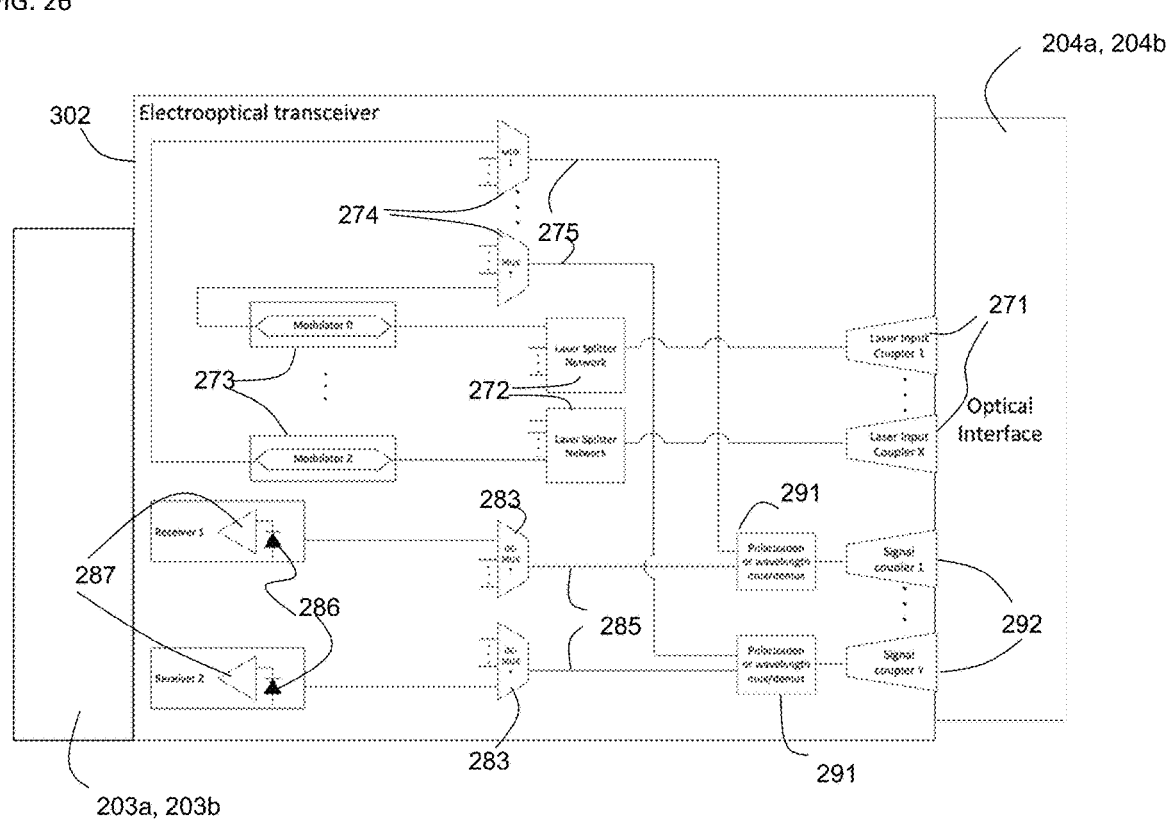
Figure 27:
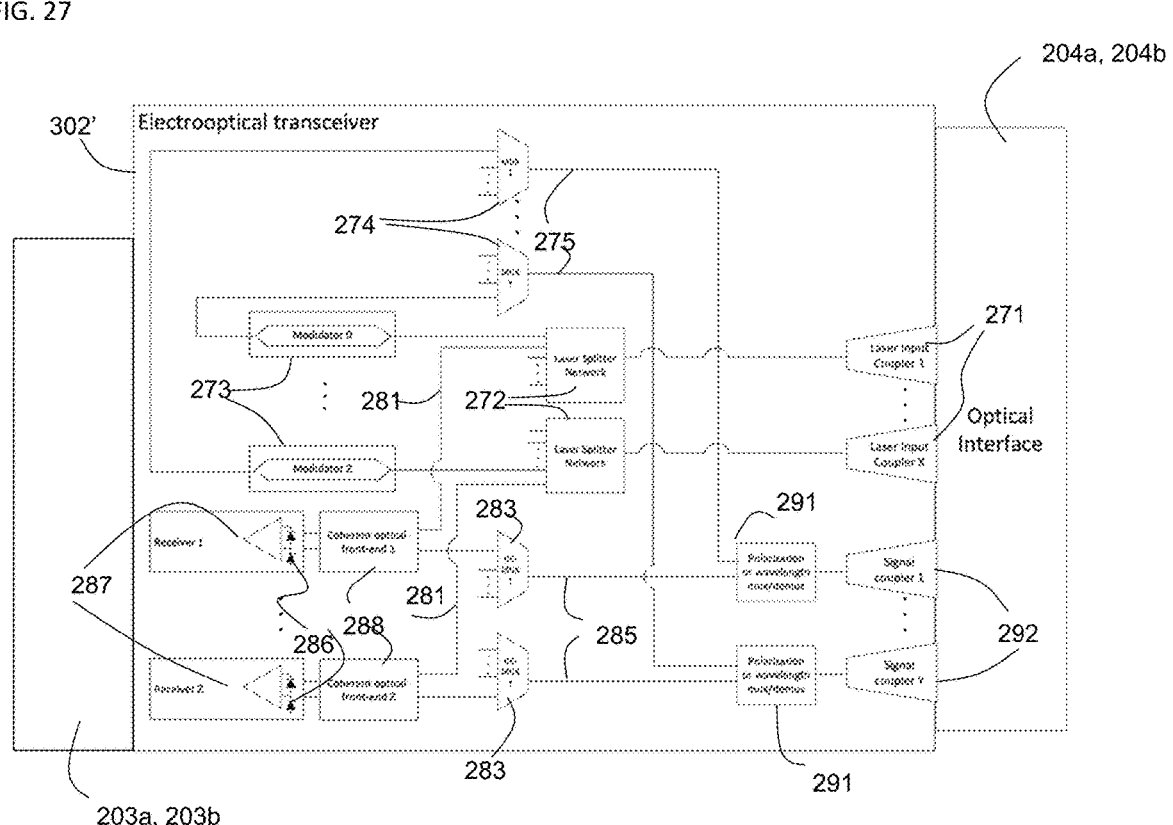
Figure 28A:
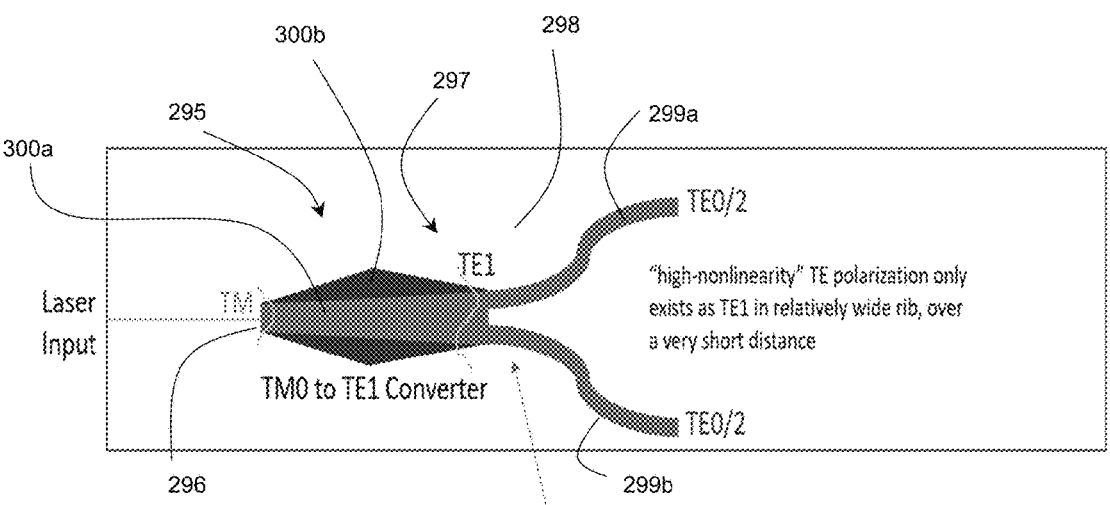
Figure 28B:
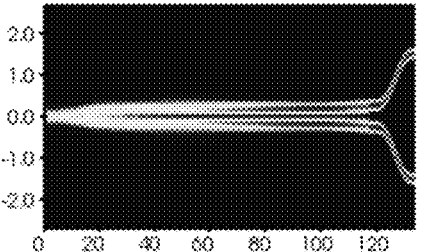
Figure 28B:
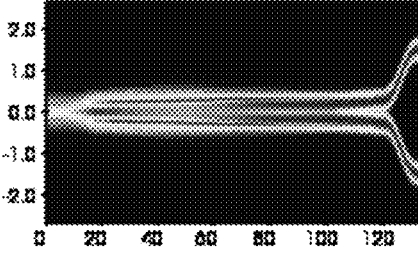
Figure 28B:
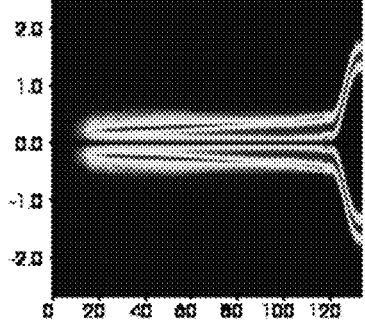
Figure 28B:
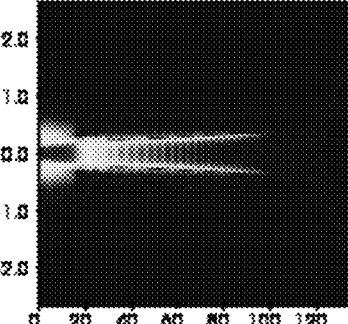
Figure 28C:
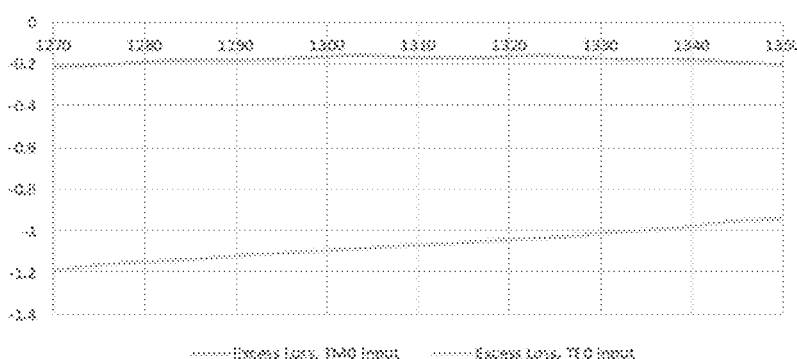
Figure 28D:
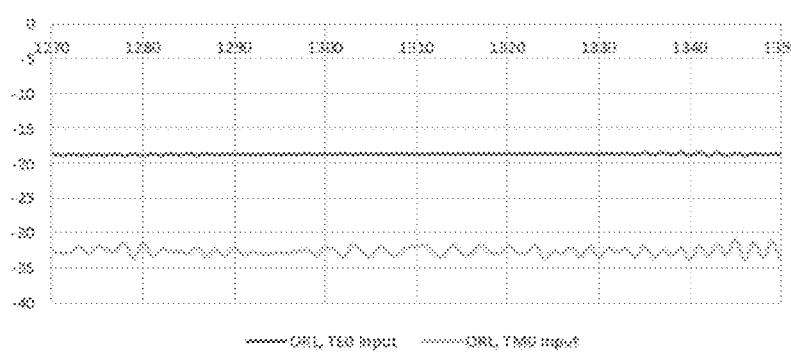
Figure 29:
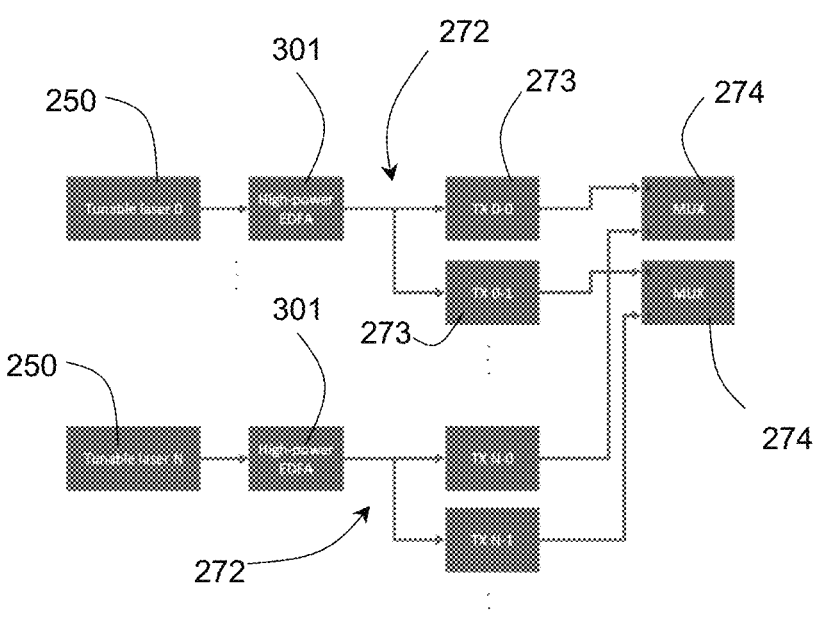
Figure 30:
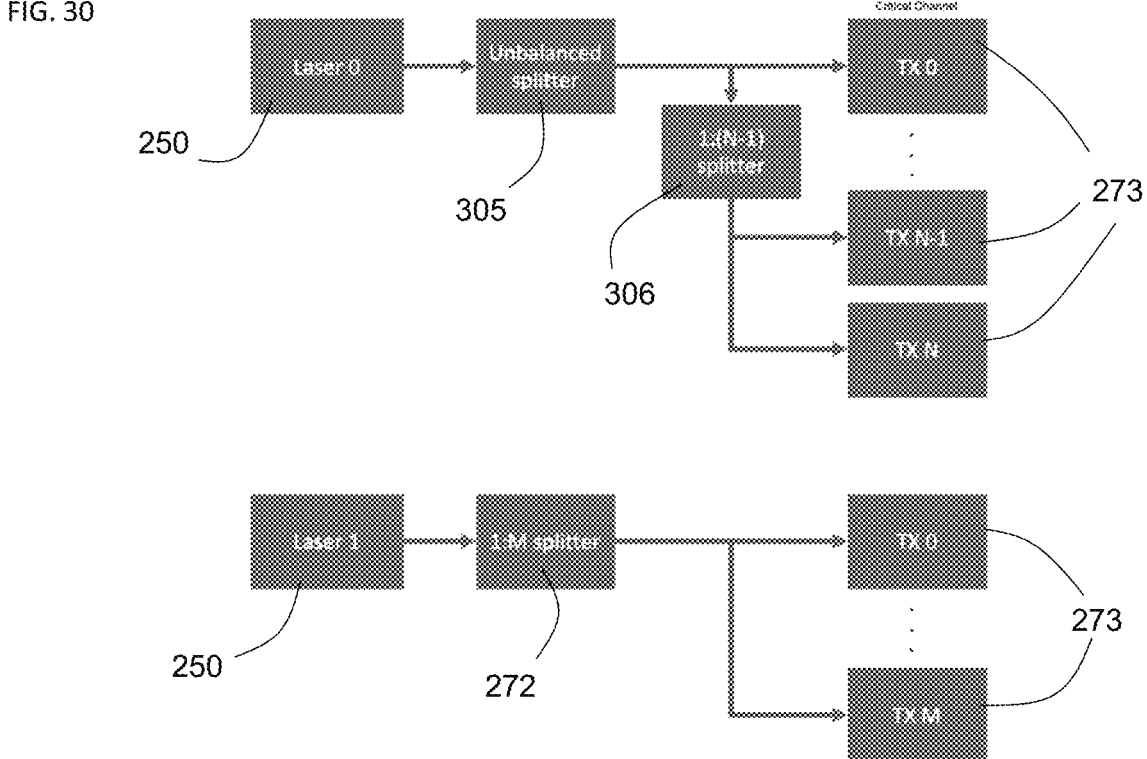
Figure 31:
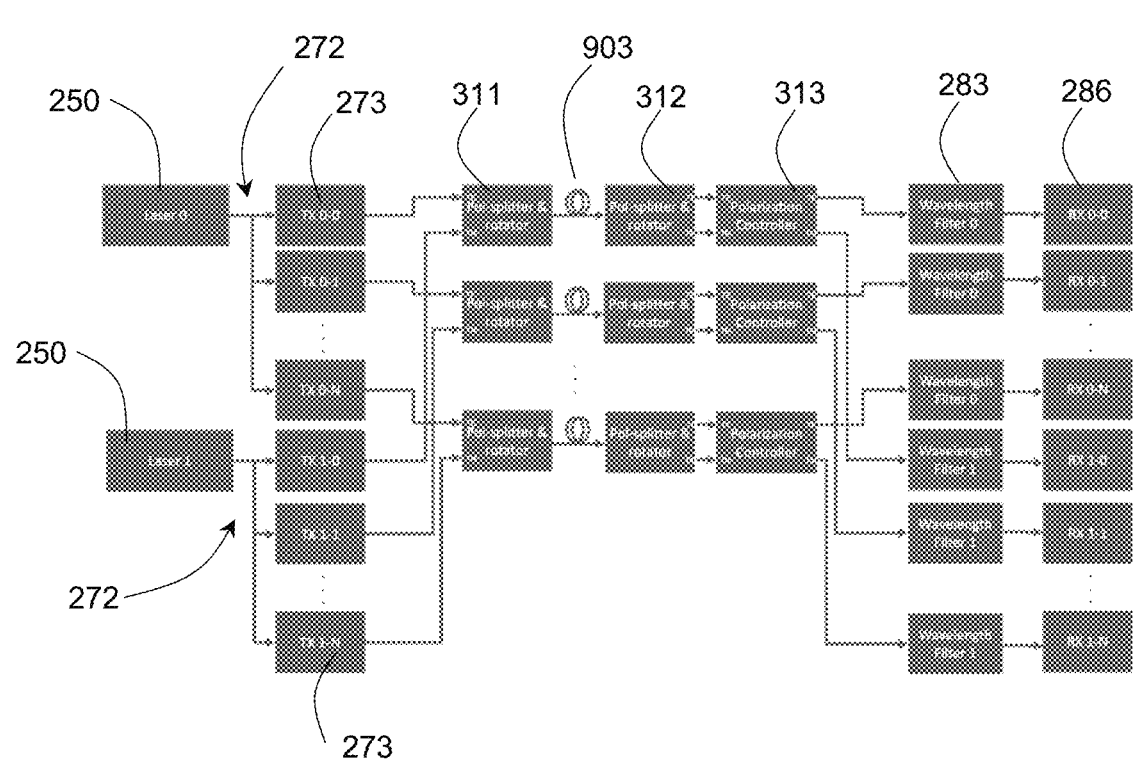
Figure 32:
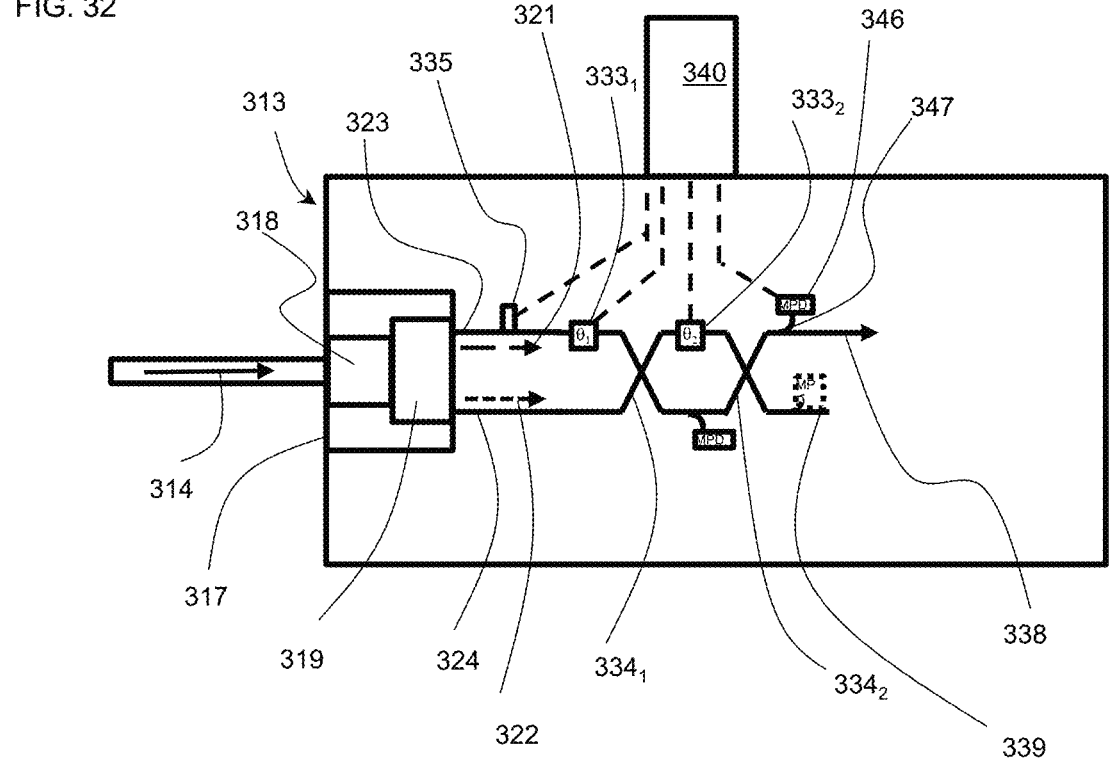
Figure 33:
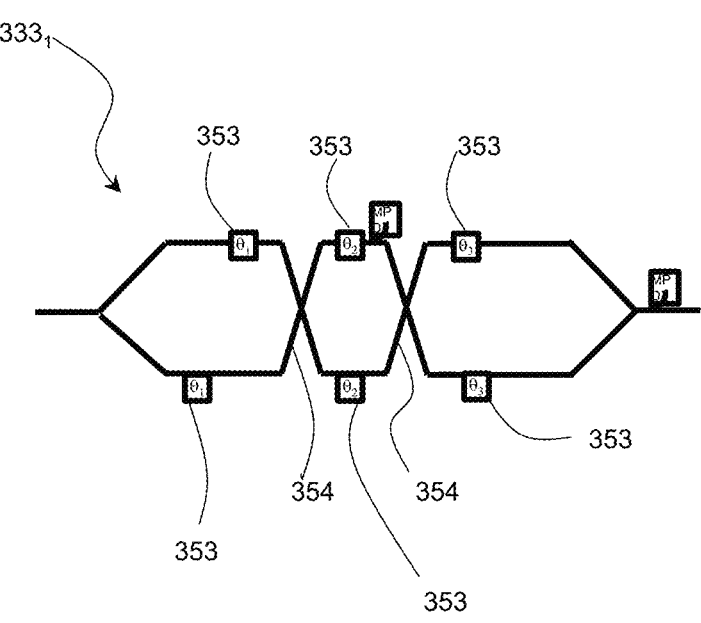
Figure 34:
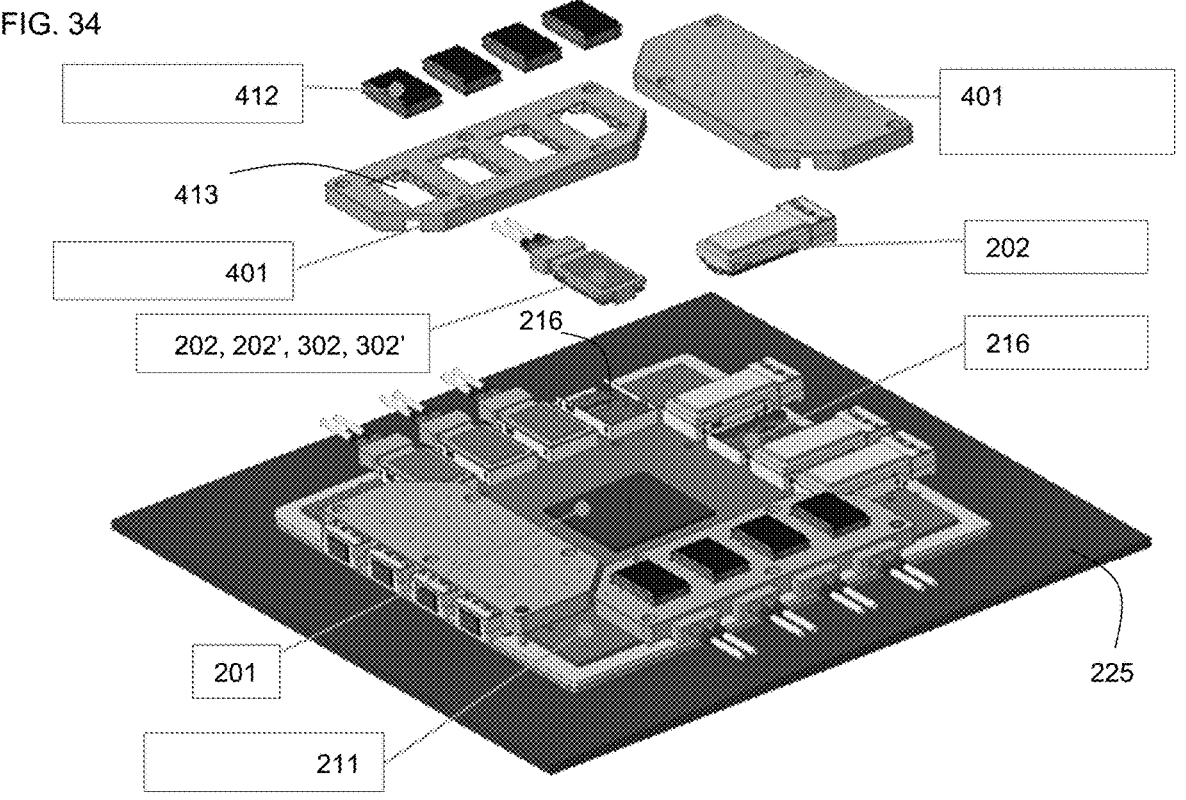
Figure 35:
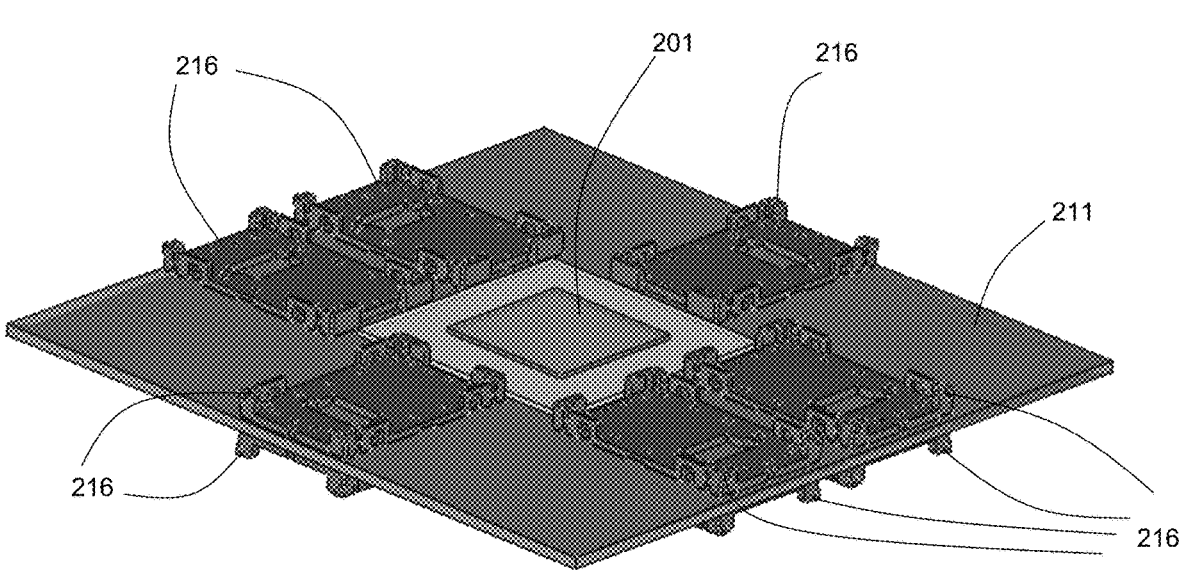
Figure 36:
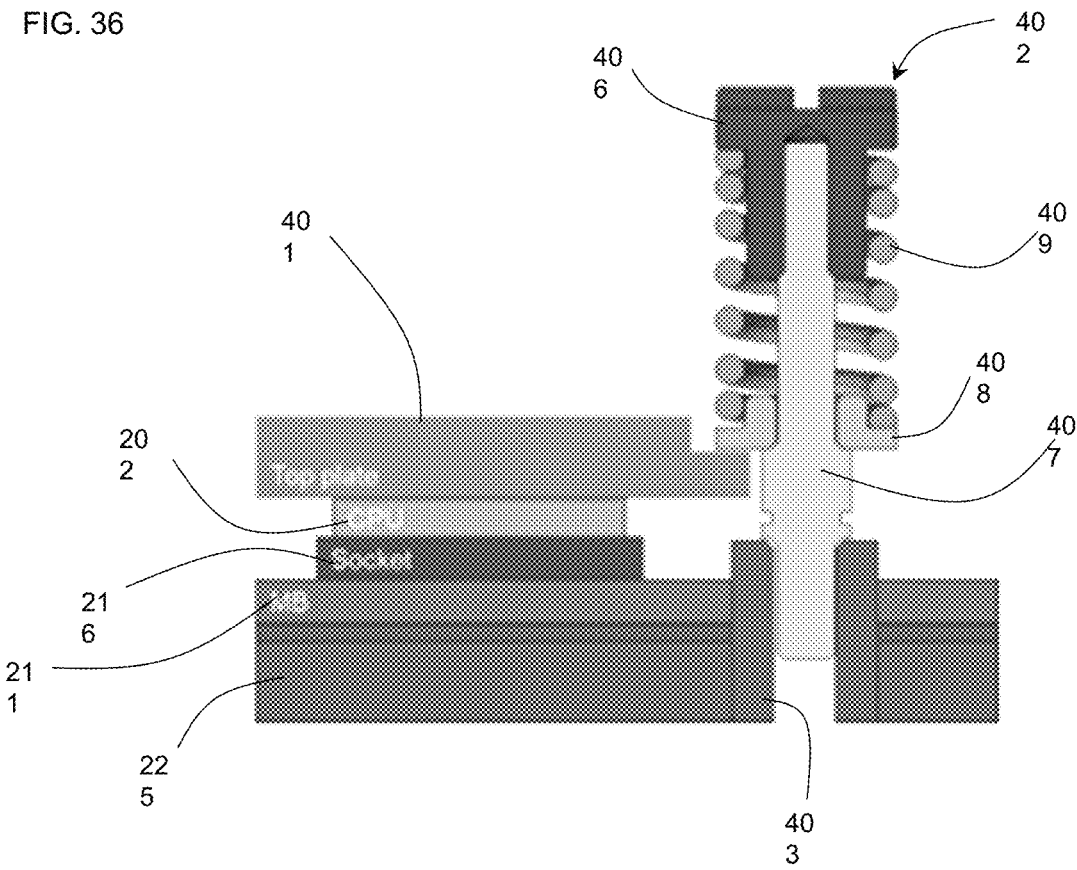
Figure 37:
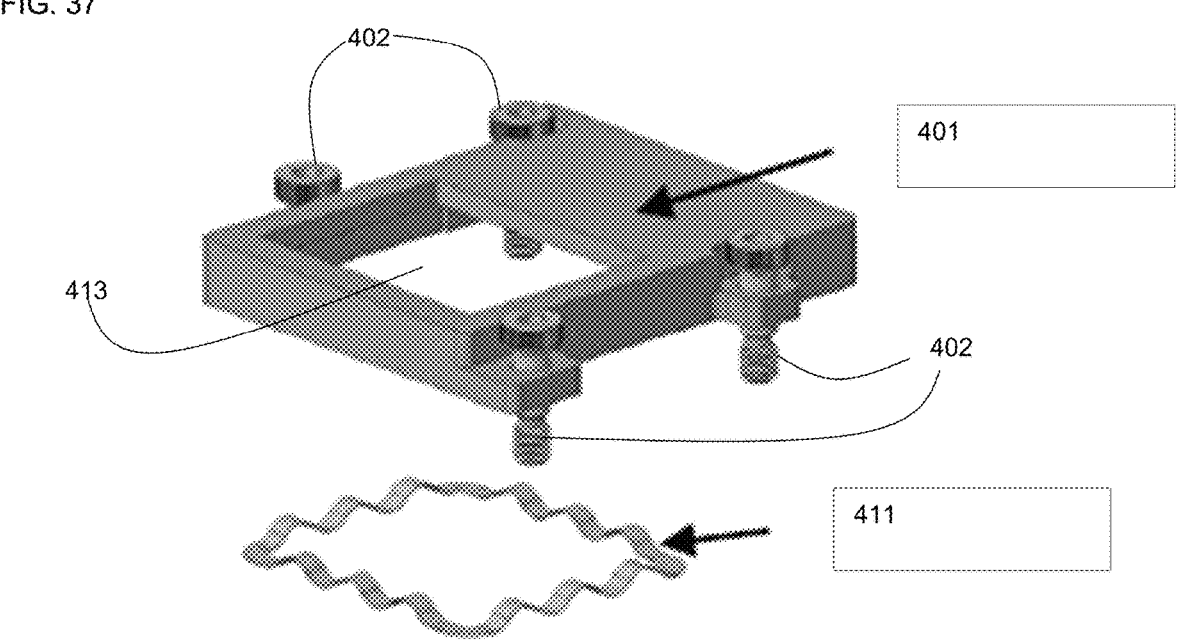
Figure 38:
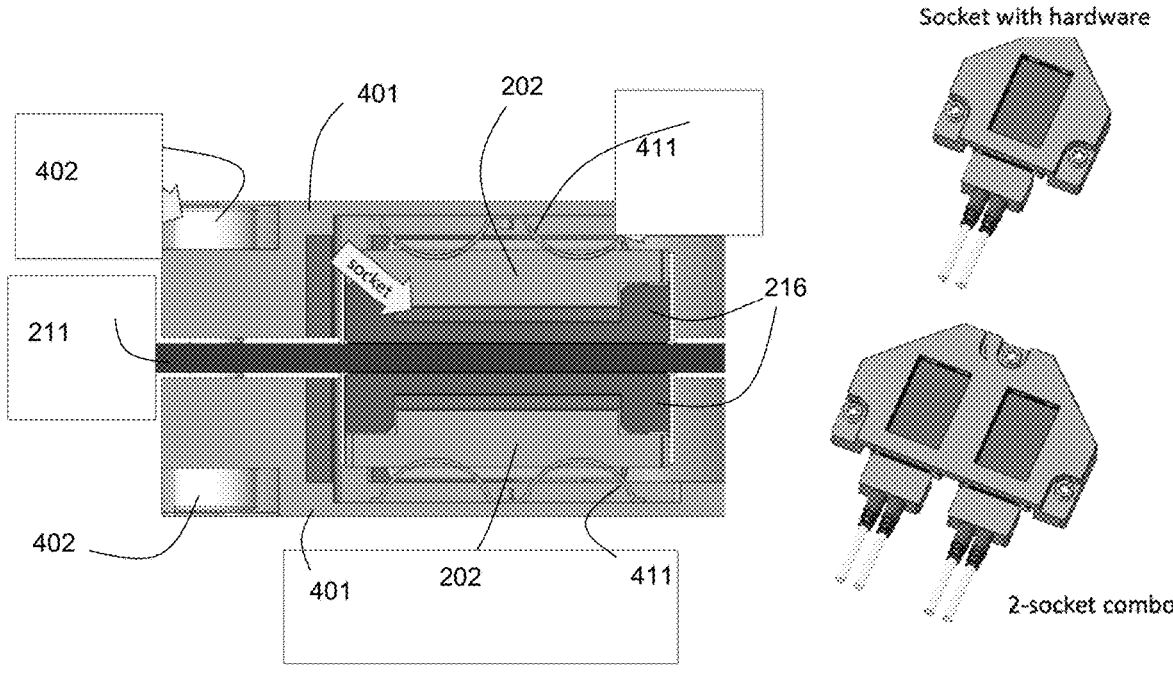
Figure 39:
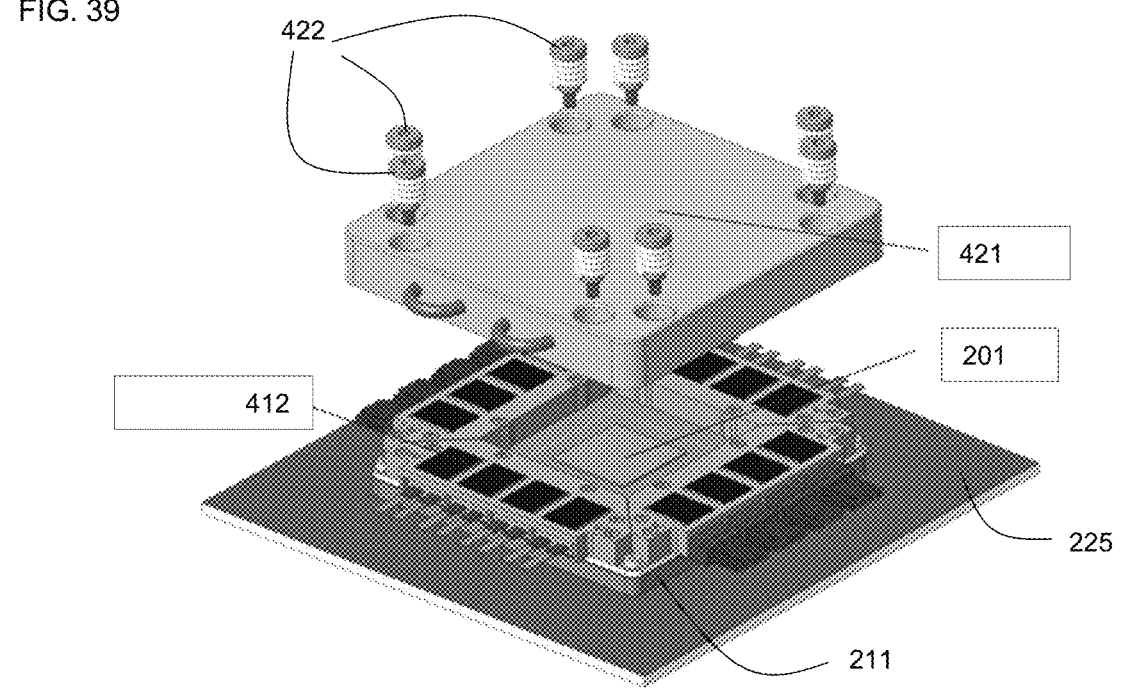
Figure 41:
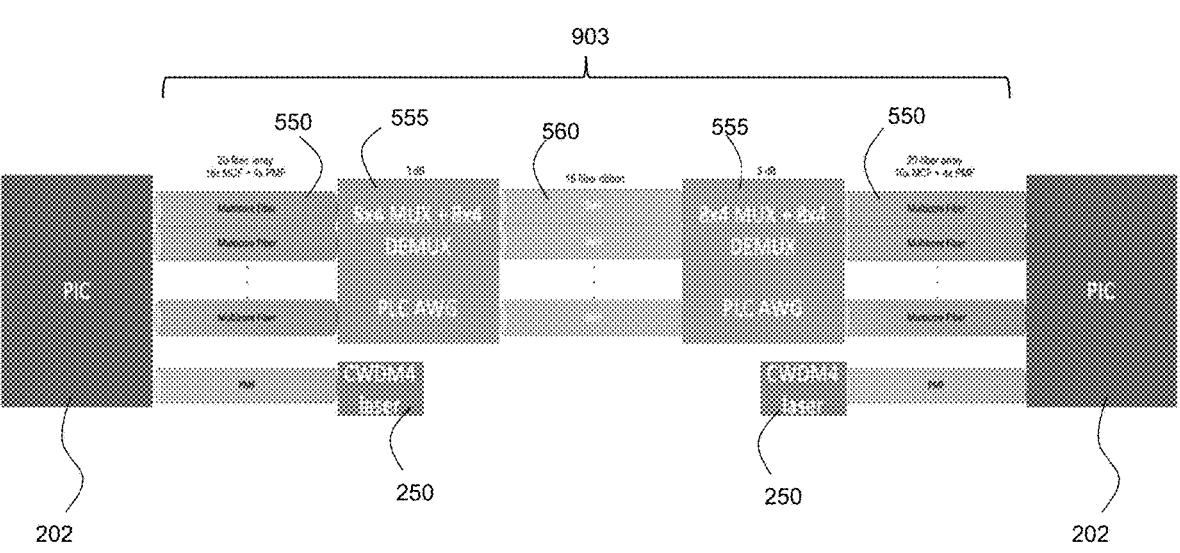
Figure 42:
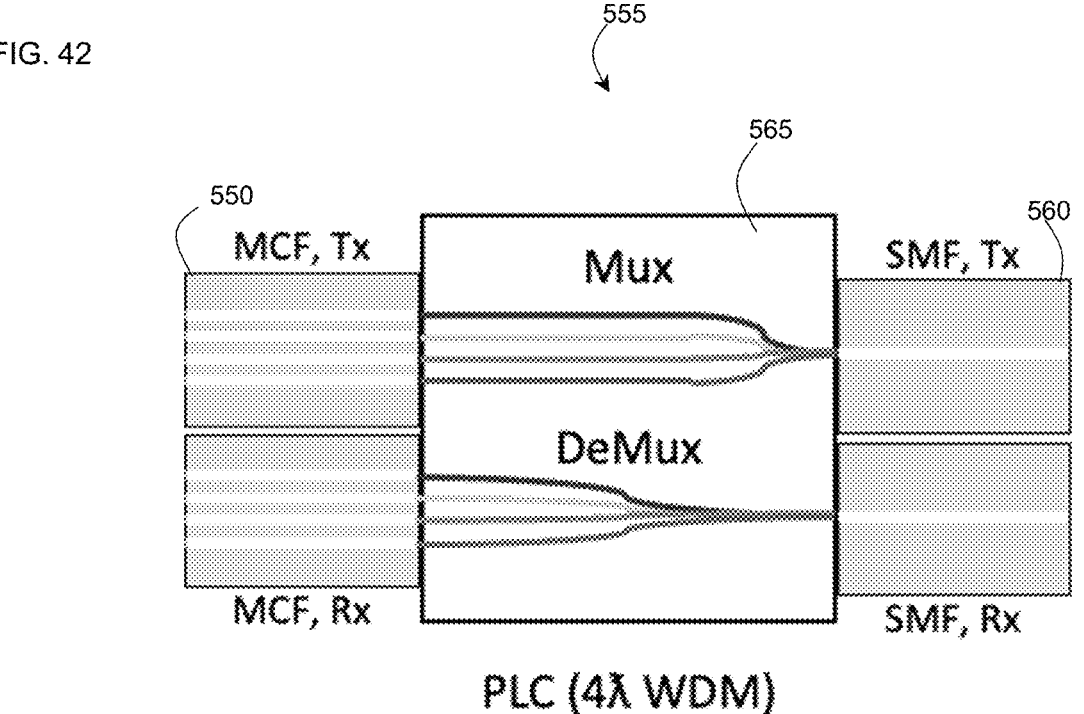
Figure 43:
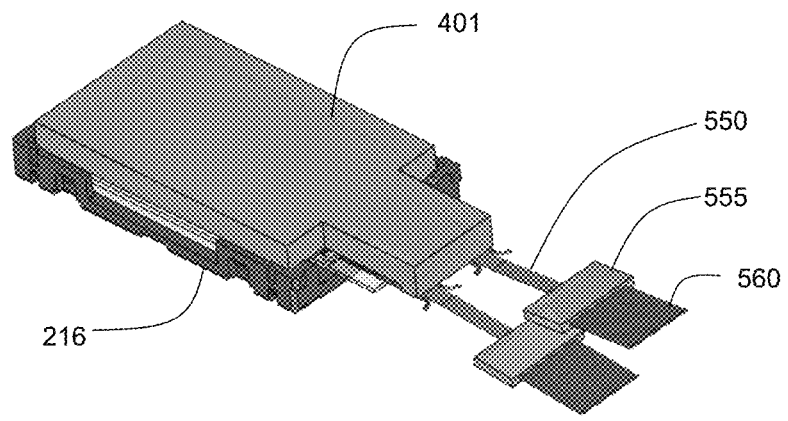
Figure 44A:
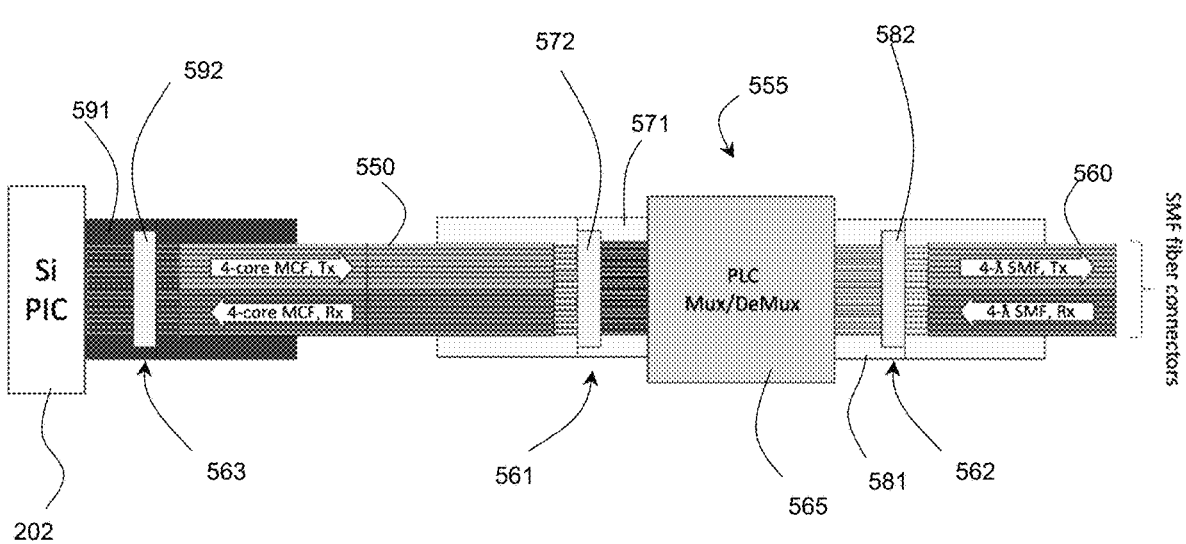
Figure 44B:
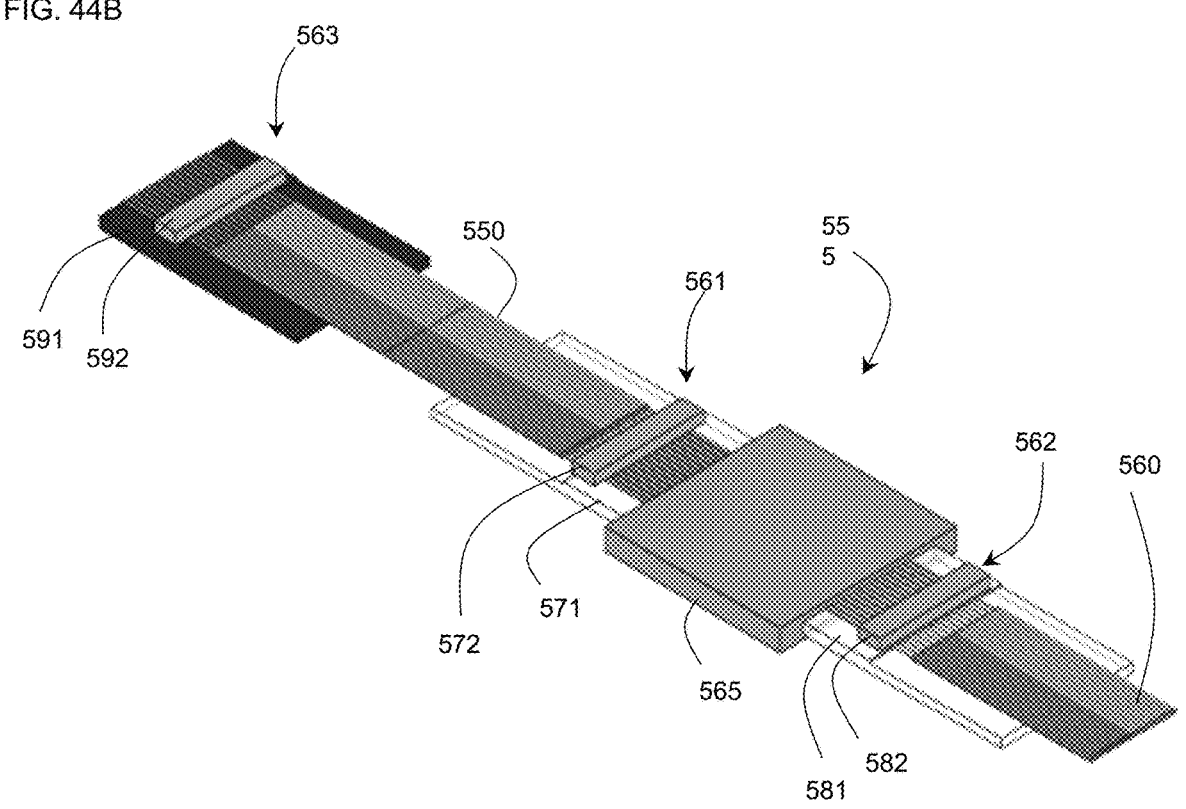
Figures 45A, 45B:
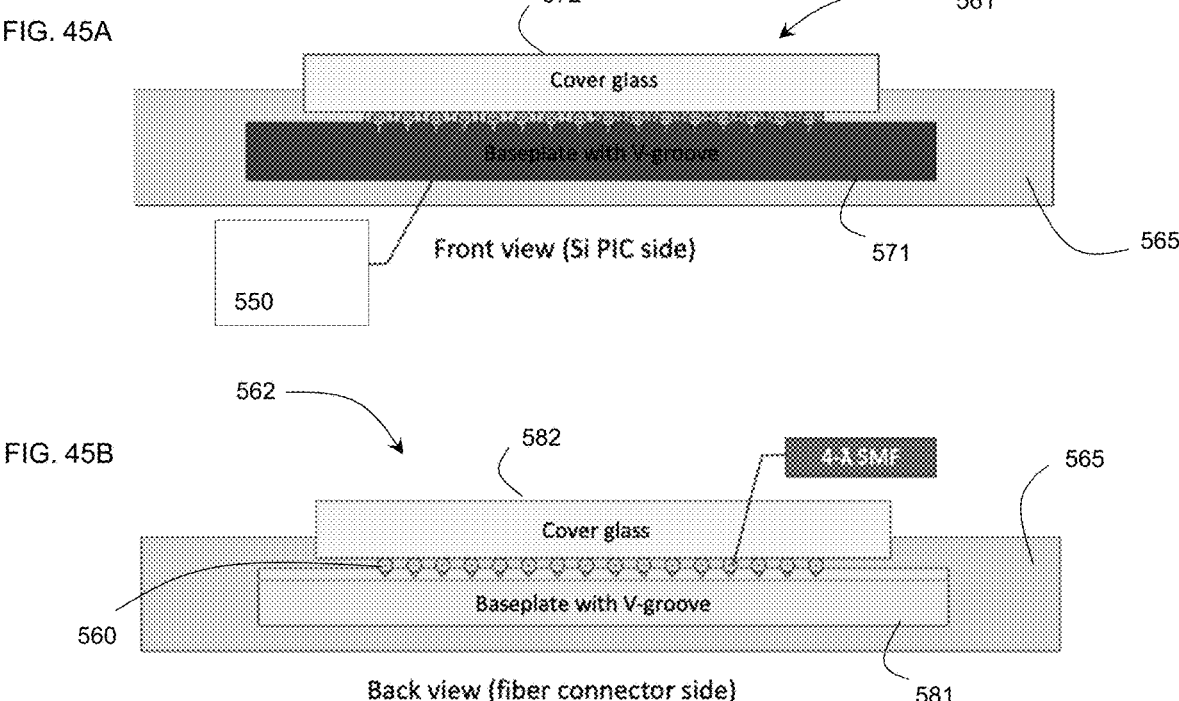
Figure 45C:
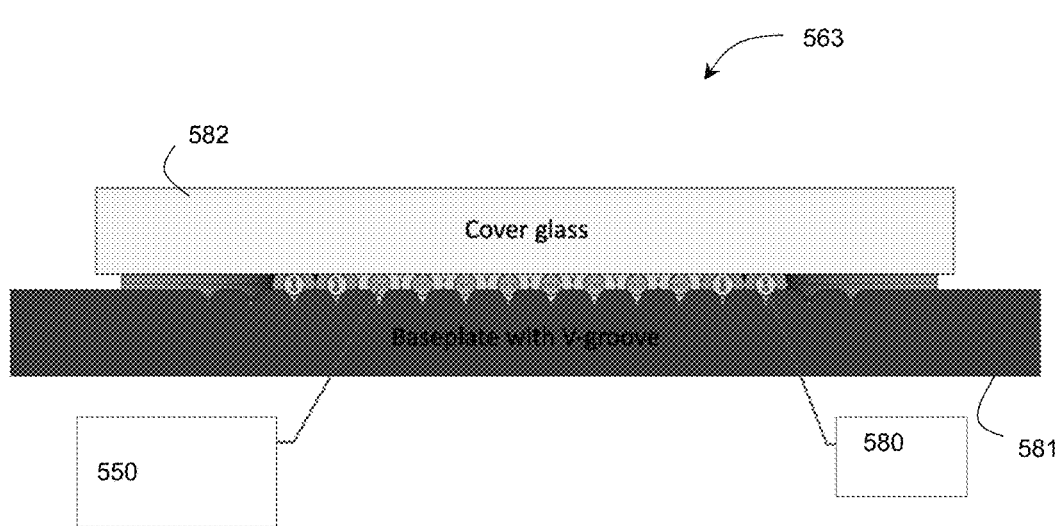
Figure 46:
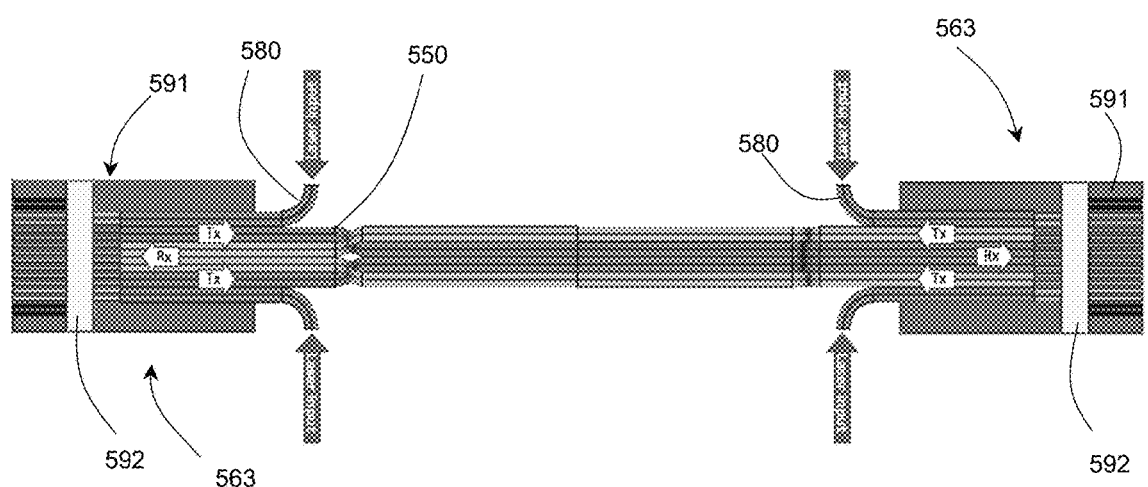

FIG. 10 is a schematic diagram of an exemplary MEMCPY protocol packet in accordance with the present disclosure;

FIG. 11 is a schematic diagram of an exemplary PIF packet transition to a DDR controller address in accordance with the present disclosure;

FIG. 12 is a schematic diagram of an exemplary computational device in accordance with the present disclosure;

FIG. 13 is a schematic diagram of an exemplary computational device in accordance with the present disclosure;

FIG. 14 are schematic diagrams of 32-bit index offsets, e.g. embedding table offsets in large recommendation models, for remote DRAM and local SRAM;

FIG. 15 is a schematic diagram of an exemplary MEMCPY work request packet in accordance with the present disclosure;

FIG. 16 is a schematic diagram of an exemplary switch device in accordance with the present disclosure;

FIG. 17 is a schematic diagram of an exemplary switch plane in accordance with the present disclosure;

FIG. 18 is a schematic diagram of exemplary endpoint address formats in accordance with the present disclosure; and FIG. 19 is a schematic diagram of an exemplary optical computer system in accordance with the present disclosure in which switch devices are integrated on a same combination chip as at least one of the plurality of computational devices;

FIG. 20 is a schematic diagram of an exemplary computer device in the computer system, such as a computational device, a memory aggregation device or a switch device;

FIGS. 21A to 21D are cross-sectional diagrams of different embodiments of the computer device of FIG. 20;

FIG. 22A to 22I are cross-sectional diagrams of different embodiments of the computer device of FIG. 20;

FIG. 23 is a schematic diagram of an optical link between two of the computer devices of FIG. 20;

FIGS. 24 to 27 are schematic diagrams of exemplary embodiments of a transceiver of the computer device of FIG. 20;

FIG. 28A is a schematic diagram of an exemplary polarization converter and rotator of some of the transceiver of FIGS. 24 to 27;

FIG. 28B illustrates light travelling through the polarization converter and rotator of FIG. 28A;

FIG. 28C illustrates excess loss vs wavelength of $TM_0$ and $TE_0$ for the polarization converter and rotator of FIG. 28A;

FIG. 28D illustrates optical return loss vs wavelength of TM0 and TE0 for the polarization converter and rotator of FIG. 28A;

FIG. 29 illustrates an optical transmitter system for the optical links of FIGS. 24 to 27;

FIG. 30 illustrates an optical transmitter system for the optical links of FIGS. 24 to 27;

FIG. 31 illustrates an optical transmitter system for the optical links of FIGS. 24 to 27;

FIG. 32 is a schematic diagram of a polarization controller for some of the transceivers of FIGS. 24 to 27;

FIG. 33 is a schematic diagram of an endless phase shifter of the polarization controller of FIG. 32;

FIG. 34 is an exploded view of an exemplary computer device in the computer system, such as a computational device, a memory aggregation device or a switch device;

FIG. 35 is an isometric view of a portion of a computer device with socket connectors for the transceivers;

FIG. 36 is a cross sectional view of a portion of a computer device illustrating a compression cover;

FIG. 37 is an isometric view of the compression cover of FIG. 36;

FIG. 38 is a side view of a computer device illustrating the compression cover;

FIG. 39 is an isometric view of a computer device illustrating a device cover;

Figure 40:
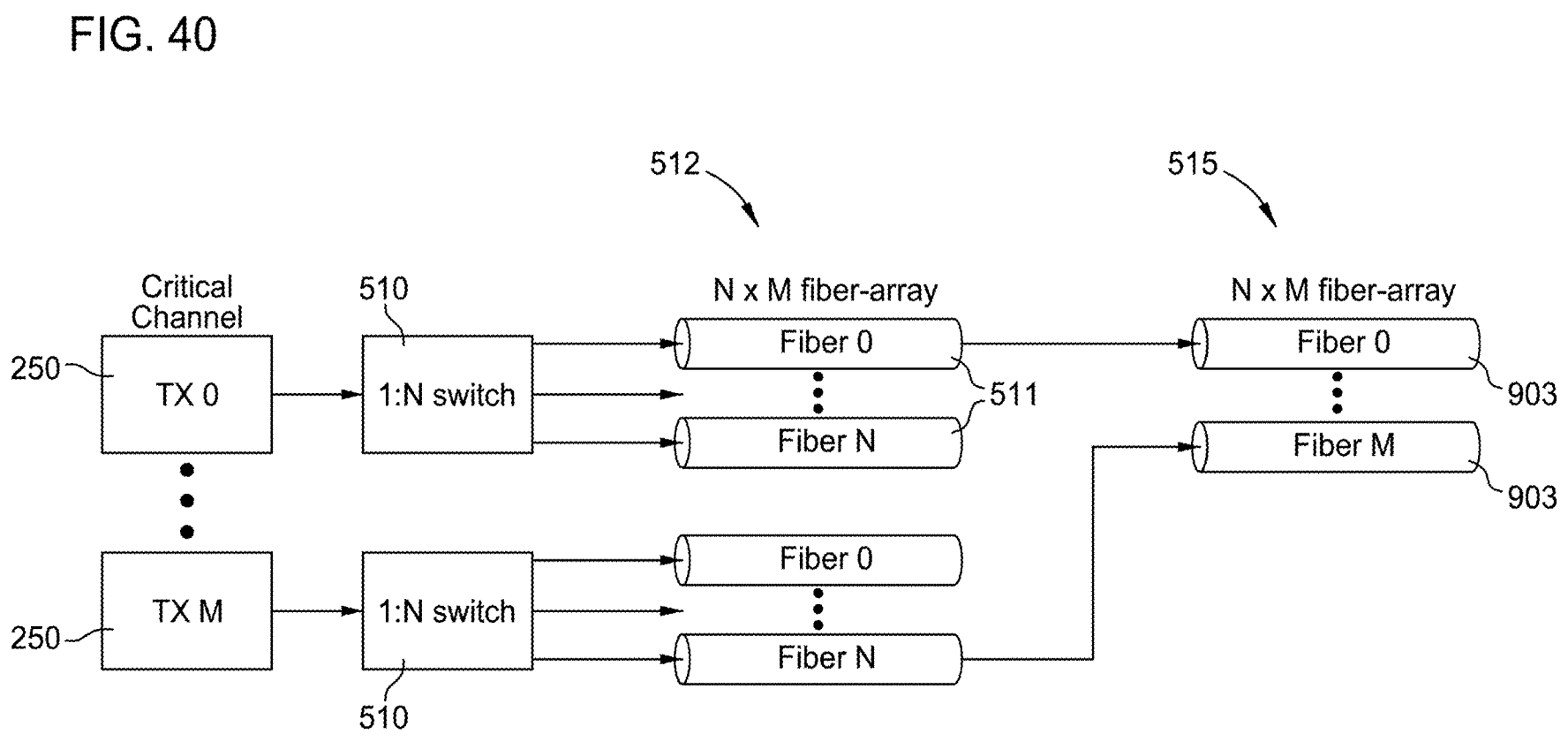

FIG. 40 is a schematic diagram of an exemplary transmitter system of the transceiver of FIGS. 24 to 27;

FIG. 41 is a schematic diagram of an exemplary optical link between computer devices;

FIG. 42 is a schematic diagram of an exemplary interface PLC of the optical link of FIG. 41;

FIG. 43 is an isometric view of a portion of the optical link of FIG. 41;

FIG. 44A is a plan view of a portion of the optical link of FIG. 41;

FIG. 44B is an isometric view of a portion of the optical link of FIG. 41;

FIG. 45A is a cross-sectional view of a MCF FAU of the optical link of FIG. 41;

FIG. 45B is a cross-sectional view of a SMF FAU of the optical link of FIG. 41;

FIG. 45C is a cross-sectional view of a MCF FAU of the optical link of FIG. 41 adjacent the computer device; and FIG. 46 is a schematic diagram of an exemplary optical link between computer devices;

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
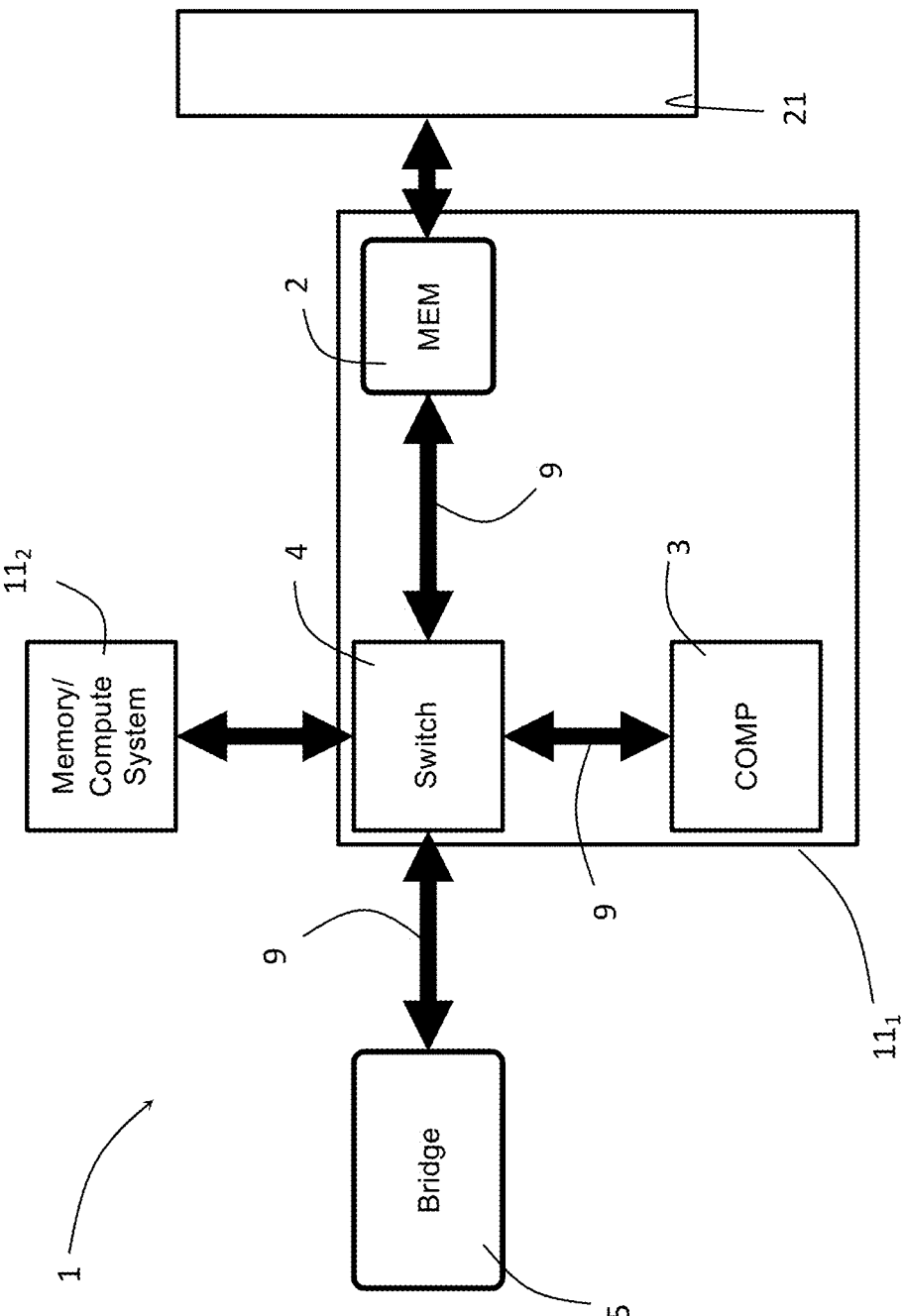
FIG. 1 is a schematic diagram of an exemplary optical computer system in accordance with the present disclosure.

With reference to FIG. 1, an exemplary embodiment of a computer system 1 comprises a first memory rack unit 11₁ including a plurality of, e.g. four or more, digital devices or chips, e.g. memory aggregation devices or chips 2, computational devices or chips 3, a switching system comprising a plurality of switch devices, e.g. switch chips 4, and bridge devices or chips 5. The various devices or chips 2 to 5 are interconnected with very high-performance communication links 9, each communication link 9 may comprise a pair of optical links 900, each optical link 900 comprising one transmitter (TX) optical link interface 901, one receiver (RX) optical link interface 902, and an optical waveguide 903, e.g. 56 GB/s optical fibers, or integrated waveguide, therebetween, as discussed herein with reference to FIG. 4A. Alternatively, the communication links 9 may comprise electronic links or a combination of electronic links and photonic links. One or more of the memory aggregation devices 2, the computational devices 3, some or all of the switching system comprising the plurality of switch devices 4, and the bridge devices 5 may be provided on the same chip or multiple independent chips.

The memory aggregation devices 2 are configured to connect a plurality of memory modules 21, e.g. at least four Double Data Rate 5 (DDR5) Dual In-line Memory Module (DIMMs), to a plurality of the communication links 9, e.g. at least sixteen optical link pairs, extending to the switch system, e.g. the plurality of switch devices 4 forming a unified contiguous memory address space disaggregated from a processing unit.

Each computational device 3 may comprise a memory access engine, namely a memory copy (MEMCPY) engine, that can read and write from local memory with intervention from processors, and a plurality of processors, e.g. 4-64, preferably more than 64, reduced instruction set computer vector (RISC V) processors, along with a plurality of General Matrix Multiply (GEMM) systolic arrays, e.g. 2-8, but preferably more than 8. Alternatively, the computational devices 3 may only comprise only the MEMCPY engine, for example, in the form of a MEMCPY I/O chiplet connected to external processor chiplets. The key thing is that the primary function of the MEMCPY engine is data movement and not mathematical operations.

The MEMCPY engine is a feature of the computer system 1 and enables the computation devices 3 to access all of the plurality of disaggregated memory modules 21 via the memory aggregation devices 2 independently of a processing unit, e.g. central processing unit (CPU) or AI training accelerator, which may or may not be provided in the computation devices 3 or external to the computer system 1. Without the MEMCPY engine, when the processing unit is inputting or outputting data it is typically fully occupied for the entire duration of the read or write operation, and is thus unavailable to perform other tasks. With the MEMCPY engine, the processing unit may first initiate the transfer of the data, then perform other operations while the transfer is in progress. The processing unit may then receive a message from the MEMCPY engine when the transfer is completed.

Accordingly, the plurality of computational devices 3 are configured to read/write multiple read/write requests simultaneously in parallel across the unified contiguous memory address space in the plurality of memory modules 21 via the plurality of memory aggregation devices 2. The MEMCPY engines are configured to access at least ⅔ but preferably substantially all of an available read/write bandwidth of the plurality of random access memory modules 21 in parallel and uniformly.

The switch devices 4 may comprise a plurality of pairs of optical link interfaces 901/902, e.g. up to 368 or more, essentially providing the required any to any switching of optical signals, e.g. packets, between the computational devices 3, the memory aggregation devices 2, and the bridge devices 5, via the communication links 9. The switch devices 4 may also connect the first memory rack unit 11₁ with other memory rack units, e.g. a second memory rack unit 11₂.

The bridge devices 5 are configured to connect the optical computer system including a network of the communication links 9 to a computer motherboard interface, e.g. a PCI express (PCIe) socket, in a host server motherboard or PCIe switch backplane. In some embodiments, some of the bridge device 5 may include a MEMCPY engine, as hereinbefore described.

Accordingly, the computer system 1 is a disaggregated system in which multiple processors 3 share the same memory 21 which may be housed at different distances, including some farther away than others. The computer system 1 may be a uniform system, so that the bandwidth is balanced everywhere, i.e. computational devices 3, memory aggregation devices 2, switch devices 4 via communication, e.g. photonic, links 9. The computer system 1 may be unified and interleaved over a very large scale, which facilitates contention. Moreover, all of the memory 21 is accessible via an integrated on-chip memory engine 75.

Figure 2:
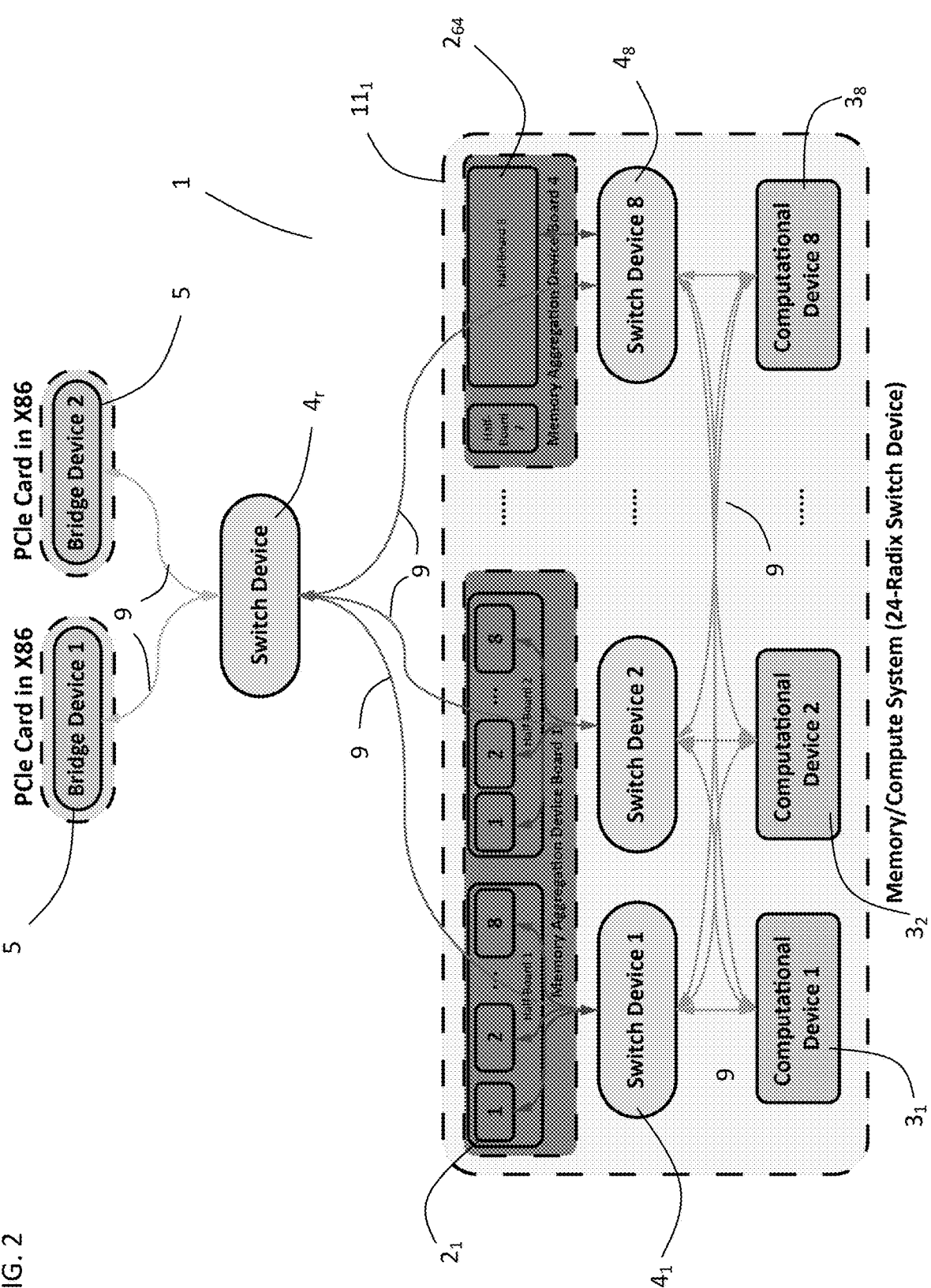
FIG. 2 is a schematic diagram of an exemplary optical computer system in accordance with the present disclosure.

With reference to FIG. 2: an exemplary computer system 1 includes a single first memory rack unit 11₁ comprising: eight computational devices or chips 3₁ to 3₈; eight switch devices or chips 4₁ to 4₈; 64 memory aggregation devices 2₁ to 2₆₄, i.e. eight memory aggregation devices 2 per switch device 4₁ to 4₈, with each memory aggregation device 2 connecting to four memory modules 21, e.g. 256 DDR5 DIMMs; and two bridge devices 5, e.g. PCIe bridge chips, connected via a ninth (optical relay or second tier) switch device $4_r$ to the other 8 switch devices $4_1$ to $4_8$ via communication links 9. Although more or less of each of the device components 2-5 and more memory rack units 21 are possible. Some of the communication links 9 may be photonic links or electronic links, if the device components 2-5 are in close enough proximity.

Figure 3:
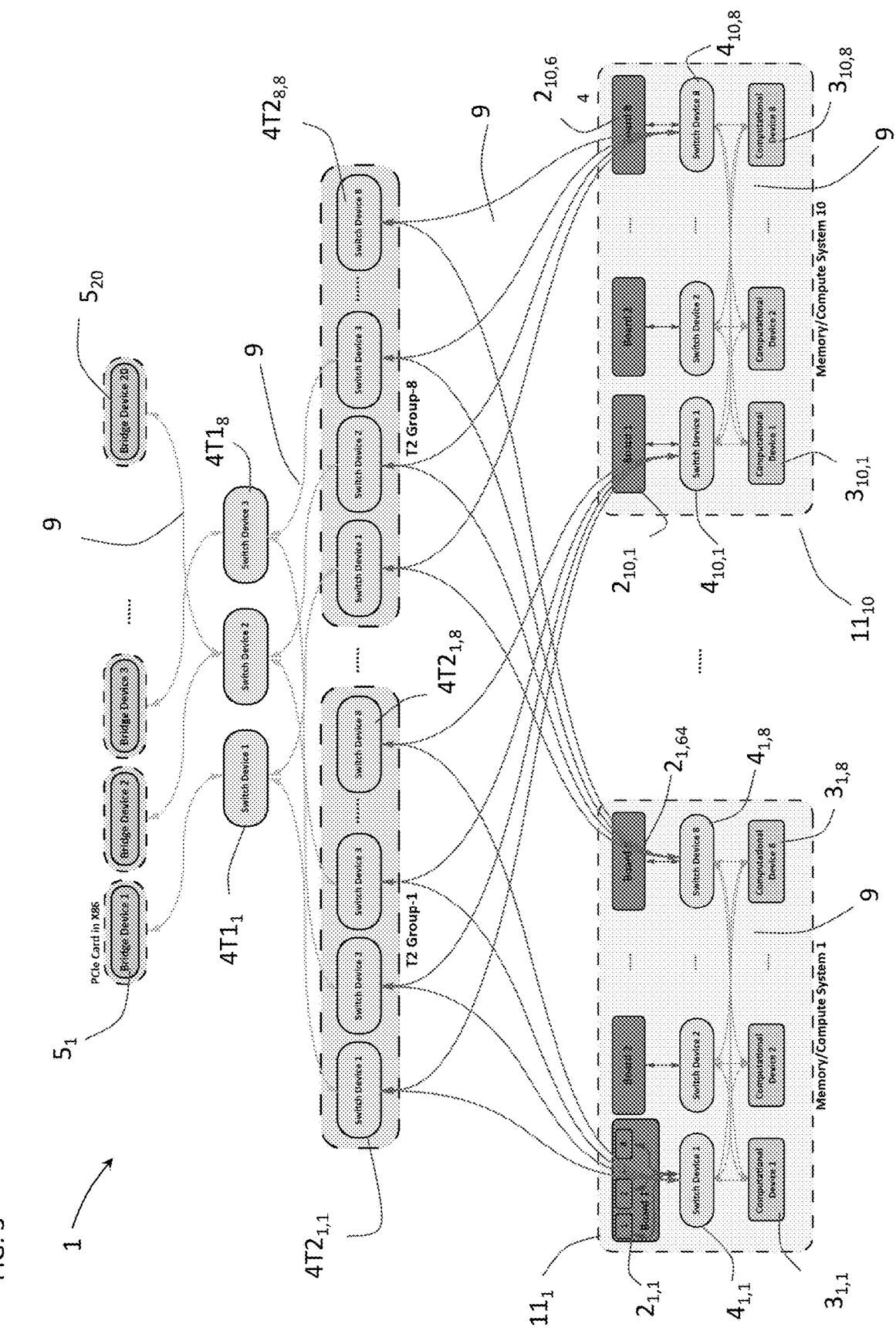
FIG. 3 is a schematic diagram of an exemplary optical computer system in accordance with the present disclosure.

While FIGS. 1 and 2 illustrate exemplary embodiments of the computer system 1 with one memory rack unit $11_1$ (FIG. 2) or two memory rack units $11_1$ and $11_2$ (FIG. 1); FIG. 3 illustrates a more complex exemplary embodiment of the computer system 1 comprising a plurality of memory rack units $11_1$ to $11_n$ (n=10 in the example) connected in a "cluster", with up to eight or more switch devices ($4_{1,1}$ to $4_{10,8}$) and about the same number of, e.g. up to eight or more, computational devices ($3_{1,1}$ to $3_{10,8}$) per memory rack unit $11_1$ to $11_{10}$, and about the same number, e.g. up to eight or more, memory aggregation devices $2_{1,1}$ to $2_{10,64}$ per switch device $4_{1,1}$ to $4_{10,8}$ with each aggregation device $2_{1,1}$ to $2_{10,64}$ connecting to at least four memory modules 21. Each memory rack unit $11_1$ to $11_n$ has a corresponding tier 2 switch group $4T2_1$ to $4T2_8$ with eight switches per switch group $4T2_{1,1}$ to $4T2_{8,8}$. Each computer system 1 has a plurality of tier 1 switches, e.g. $4T1_1$ to $4T1_8$. Moreover, each computer system 1 includes a plurality of bridge devices 5, e.g. $5_1$ to $5_{20}$, connecting the tier 1 switches $4T1_1$ to $4T1_8$ to external computer processors.

Even larger systems are possible thanks to the performance and low power nature of the communication links 9. In prior art, these systems are interconnected with either traditional PCIe or Ethernet, which both limit performance, i.e. via limited bandwidth and latency capability, and blow up costs i.e. via the packaging overhead involved in various cards and interfaces. Even with photonic implementations of ethernet the power is quite large due to the need to run long distances and the bandwidth is largely wasted due to high level TCP/IP protocols, which also greatly increase the latency. Although more accelerator-centric fabrics, such as NVLink, have emerged to address the unique data transport needs of accelerators, they still do not achieve the scale or networking flexibility needed for the largest models. With photonics and the computer system 1 all these limitations are avoided, as all the device components 2-5 are connected with low power high performance-density communication links 9, and a flexible protocol to provide both scale and flexibility. Accordingly, the computer system 1 is configured to enable access to massive, uniform and continuous memory 21 with no access bottleneck, i.e. all computational devices 3 "see" and have access to a huge bank of available memory 21, which is a massive disaggregated, uniform, interleaved, memory bank. The plurality of communication links 9 connected to the plurality of memory aggregation devices 2 provide at least ⅔, but preferably substantially all of an available read/write bandwidth of the plurality of random access memory modules 21 to be accessed simultaneously.

Figure 4A:
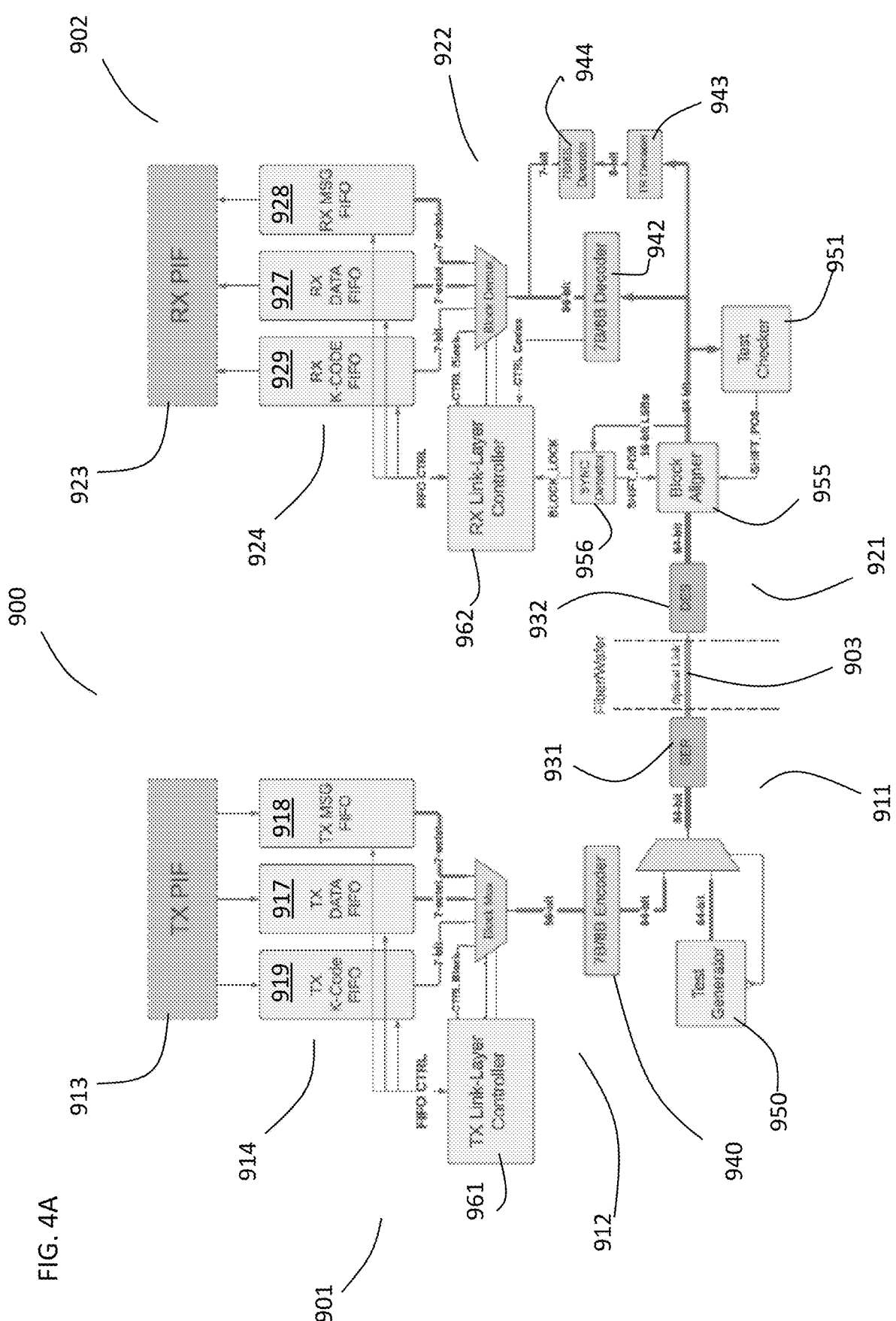
FIG. 4A is a schematic diagram of an exemplary optical link in accordance with the present disclosure.

With reference to FIG. 4A, high-speed data transfer between discrete devices, e.g. the aggregation devices 2, the computation devices 3, the switch devices 4, and the bridge devices 5, within the computer system 1 is implemented using the communication links 9. The communication links 9 may use a combination of photonics or electronics with specialized RF modules, and high-speed digital modules to realize a point-to-point, high-speed interface that can support transfer over a relatively long distance, e.g. 1 m to 100 m, preferably 5 m to 20 m. The TX and RX physical optical link interfaces 901 and 902, respectively, are grouped in pairs (only one of two shown in FIG. 4A) to support high-speed transfers in both directions, e.g. the memory aggregation devices 2 implement 32 pairs of the TX and RX optical link interfaces 901 and 902, which are mainly used to service large memory requests between the computational devices 3 and the memory modules 21 (DRAM). The high-speed digital portions of the TX and RX optical link interfaces 901 and 902 may be implemented within each memory aggregation device 2.

The TX optical link interfaces 901 may comprise three sections: a TX physical layer interface (TX PHY) 911; a TX link layer 912; and a TX packet interface (TX PIF) module 913. The RX optical link interfaces 902 comprise three sections: an RX physical layer interface (RX PHY) 921; an RX link layer 922; and an RX packet interface (RX PIF) module 923.

The TX PHY 911 provides a physical connection to the optical waveguide 903 and the optical computer system 1, e.g. for the memory aggregation devices 2 the TX PHY 911 is optically coupled to one of the computation devices 3 via one of the switch device 4. The TX PHY 911 includes SERDES transceiver including an optical transmitter, e.g. a CW laser configured for generating an input optical signal, an optical modulator configured for converting the input optical signal into a modulated output optical data signal based on a modulated RF electrical data signal, and a serializer 931 configured to transform parallel optical data signals into serial optical data signals for transmission on the optical waveguide 903, and the RX PHY 921 includes a receiver, e.g. photodetectors, and a deserializer 932 portion of a SERDES transceiver configured to transform serial optical or electrical data signals into parallel electrical data signals for the corresponding device component 2-5. The serializer 931 of the TX PHY 911 and the deserializer 932 of the RX PHY 921 may be used with a variety of PHYs, encoding strategies, or speeds, for example: running at 28 Gbps, 32 Gbps, 56 Gbps, 112 Gbps, 224 Gbps, 448 Gbps, with NRZ, PAM4, PAM8, encoding, or over USR, XSR, SR, VSR, MR, LR, or UCIe PHYs, but they may also use PHYs, modulation, encoding strategies, or speeds not listed here. The serializer 931 of the TX PHY 911 and the deserializer 932 of the RX PHY 921 may be using a 56 Gbs protocol or higher, such as a 56 Gbs NRZ protocol over a XSR physical interface. XSR is an extremely short reach, Optical Internetworking Forum (OIF) standard for physical die-to-die serial interconnect. The photonic components, e.g. optical transmitters and optical modulators, may be replaced with electronic components for electronic communication links 9. Such replacement may be advantageous over short distances. A combination of short-distance electrical and longer-distance optical communication links may also be used.

The TX link layer 912 interfaces to the TX PHY 911, and may synchronize with each other, and provides low-level framing and signal recovery. The RX link layer 922 may provide line coding, framing, multiple data channel interleaving, and error checking for the RX optical link interface 902. The RX link layer 922 also interfaces with the RX PIF module 923.

The TX PIF module 913 may provide network layer packetization and error checking and interfaces with the internal chip fabric to retrieve data from the memory modules 21, which is routed to the TX PHY 911. The RX PIF module 923 provides network layer packetization and error checking and interfaces with the internal chip fabric to store data to the memory modules 21, which is routed from the RX PHY 921. The TX link layer 912 may connect to the TX PIF module 913 through a TX buffer 914. The RX link layer 922 may connect to the RX PIF module 923 through an RX buffer 924.

In some exemplary embodiments there are 32 TX/RX pairs of TX and RX optical link interfaces 901 and 902 on each memory aggregation device 2, and 16 pairs are connected to one of two TX PHY 911 and RX PHY 921 (FIGS. 6A and 6B), e.g. Synopsys PCS PHY blocks. Accordingly, the memory modules 21, e.g. DRAM, and the computation logic, i.e. the computational devices 3 can be disaggregated at great distances, e.g. up to 10 m or more, from each other using photonic interconnect technology.

An exemplary embodiment utilizes a DesignWare® USR/XSR PHY IP for 112 Gbps per lane die-to-die connectivity enables high-bandwidth ultra- and extra-short-reach interfaces in multichip modules (MCMs) for hyper-scale data center, AI, and networking applications. The low-latency, low-power, and compact TX PHY 911 and RX PHY 921 supports NRZ and PAM-4 signaling from 2.5-G to 112-G data rates and is compliant with the OIF CEI-112G and CEI-56G standards for ultra-short-reach (USR) and extra-short-reach (XSR) links. The TX PHY 911 and RX PHY 921 offers flexible layout for maximum bandwidth per die-edge by allowing placement of the square macros along all edges of the die. The TX PHY 911 and RX PHY 921 deploys 16-lane transmit and receive macros for optimized segmentation on the multiple dies. The robust DLL-based clock-forwarded architecture enables high energy efficiency while supporting reliable links of up to 50 millimeters for large MCMs. The TX PHY 911 and RX PHY 921 enables multi-die connectivity over organic substrates, which helps reduce packaging costs without requiring advanced interposer-based packaging over shorter distances. The embedded bit error rate (BER) tester and nondestructive 2D eye monitor capability provide on-chip testability and visibility into channel performance. Besides the PMA and PMD, the TX PHY 911 and RX PHY 921 includes a raw-PCS to facilitate the interface with the on-chip network, regardless of the existing networking protocol. The USR/XSR IP is combined with Synopsys' comprehensive routing feasibility analysis, packages substrate guidelines, signal and power integrity models, and crosstalk analysis for fast and reliable integration into SoCs. Other serialization standards and strategies are within the scope of the invention, including other XSR (extreme short reach), MR (medium reach) and LR (long reach) standards for both photonic and electronic communication links 9.

The RX PIF 923 interfaces with the RX link layer 924 and performs data transfers between the RX link layer 924 and the internal components of the memory aggregation device 2. The RX link layer 924 may provide three separate types of data: bulk data; message data; and K-code data. The RX path of the RX link layer 924 and the RX PIF 923 receive data into the memory aggregation device 2 from the optical link 900 via the RX PHY 921. The TX path of the TX link layer 912 and the TX PIF 913 transfer data from the memory aggregation device 2 into the optical link 900 via the TX PHY 911.

A memory copy (MEMCPY) packet structure or a direct memory access (DMA) packet structure may be used to collect the bulk data and transaction information between the TX PIF 913 and the TX link layer 912, and between the RX PIF 923 and the RX link layer 922. Bulk data payloads can be from 1 to 4096 bytes of data. Message data may be sent within a similar packet format but with less transaction information. Message data payloads may be limited to 64 B of data. The message data packets are used for small network layer messages relating to the interface. A PIF interface may be used to send small, 7-bit code with minimal latency between the TX PIF 913 and connected interfaces with the RX PIF 923. These codes are used primarily for bulk data and message transfer acknowledgments.

In some embodiments, the communication link 9 may utilize a block-oriented protocol composed of eight 7b/8b (64-bit) symbols, yielding 7-octet (56-bit) blocks, but other coding and protocols are within the scope of the invention. The control symbols, CTRL and SEP, are arranged in patterns to denote the type and structure of blocks. The redundancy and arrangement of these symbols in the block are chosen to maximize the robustness and resilience of the protocol to errors in the bitstream. The control protocol is designed to be resilient to burst errors at least 8 bits long. Each block is categorized as either data, separator, or control. Data and separator blocks form the framing structure of the protocol. Control blocks manage the state and flow control features of each link. Every control block starts with a 16-bit SYNC sequence. This sequence is unique and does not appear anywhere else in any block. It is used for initial block synchronization and verification at runtime. Data frames consist of data and separator blocks. A separator block is a control block that terminates an active frame.

An encoder 940 in the TX optical link interface 901 encodes every 7 bits of a 56-bit input block into 8-bit symbols of a 64-bit output block. The decoder 942 in the RX optical link interface 902 decodes every 8-bit symbol of a 64-bit input block into 7 bits of a 56-bit output block. The input to the 7b/8b encoder 940 is the current running disparity, a 7-bit data word, and a signal for inserting SEP or CTRL symbols. The output of the encoder 940 is an 8-bit symbol and the next running disparity. The input to the 7b/8b decoder 942 is an 8-bit symbol. The output of the decoder 942 is a 7-bit data word, as well as a signal to indicate reception of SEP or CTRL symbols. The decoder 942 may also have an error signal to indicate that there is no symbol match.

The encoder 940 may comprise eight parallel 7b/8b encoders, which map the 56-bit block payload to the 64-bit serializer payload. The decoder 942 may comprise eight parallel 7b/8b decoders, which map the 64-bit deserializer payload to the 56-bit block payload. A TR decoder 943 in parallel with the 7b/8b decoder 942 includes voting logic configured to decode the TR_CODE fields of the control blocks, which are output through a second 7b/8b decoder 944.

A test system, including a test generator 950 positioned between the serializer 931 and the encoder 940 and a test receiver 951 positioned between the deserializer 932 and the decoder 942, may be provided whereby system operators may drive and observe test patterns through the optical link 900. When active, the test generator 950 may take over full control of the TX optical link interface 901. A pseudo-random binary sequence (PRBS) may be generated using a fully programmable 32-bit LFSR. There will also be a way to push and collect pre-generated test patterns from system SRAM or DRAM directly across the TX optical link interface 901, bypassing the logic in the link-layer 912 entirely. The test generator 950 and the test receiver 951 may be programmable via control and status registers (CSR). In functional mode, the test generator 950 and/or the test receiver 951 may include counters for system functions, such as corrected errors in control blocks, number of control blocks transmitted and received, data frames transmitted and received, and payload octets transmitted and received.

At initial startup the block aligner 955 may use 16-bit SYNC symbols to find the proper block alignment. The 64-bit parallel blocks coming from the SERDES receiver 932 are not necessarily properly aligned with the transmitter in the TX optical link interface 901. A 64-bit block aligner 955, e.g. two-stage barrel shifter, may be provided in some embodiments to enable realignment. A SYNC detector 956 is a receiver module which finds proper realignment of the block stream as they were sent by the transmitter in the TX optical link interface 901. The logic in the test system may control the position of the block aligner 955 in the testing mode, and logic in a SYNC detector 956 may control the position of the block aligner 955 in the functional mode.

An exemplary method of aligning the block streams comprises: during optical link initialization, a SYNC pattern (SYNC-A and SYNC-B) of encoded symbols, e.g. 16-bit 7b/8b patterns, are launched in the optical link 900, and are aligned to the least significant bit (LSB) of the deserializer 932. The SYNC patterns comprise a unique bit sequence that cannot be found in any 16-bit sliding window over any sequence of encoded 7b/8b symbols. The SYNC patterns were found via exhaustive search of the symbol space. This property will be especially important for simplex links, which give limited feedback to the transmitter about the state of the receiver. For this usage scenario, it is important that the receiver in the RX optical link interface 902 can quickly lock with high confidence—and stay locked—to the serializer 931.

In an exemplary embodiment, the TX optical link interface 901 will transmit NOT_READY control blocks, which will force the RX interface 902 to transmit either NOT_READY or IDLE control blocks, each of which contain one of the two SYNC patterns. The block aligner 955 is rotated until the SYNC pattern is detected in the lower 16 bits of the 64-bit deserializer 932. To ensure proper block lock, the SYNC pattern must be detected for a fixed number of sequential blocks, configurable via CSR.

After block lock, the SYNC pattern is used to monitor synchronization. In an effort to detect single bit slips, the SYNC detector 956 may look for shifts in the SYNC pattern one position to the left and to the right, automatically adjusting the block aligner 955 as they occur. Additionally, a watchdog counter in the RX interface 902 tracks the number of cycles since the last SYNC pattern was received. The value of this watchdog is configurable via CSR. If the watchdog counter reaches zero, the controller stops the link and triggers an interrupt.

An optical link controller serves as the topmost part of the link-layer 912 and as the interface to the network-layer. The optical link controller interfaces with one TX optical link interface 901 from one optical link 900 and one RX optical link interface 902 from the second optical link 900 forming the communication link 9. The optical link controller comprises a TX optical link controller 961, which interfaces with one TX optical link interface 901 and an RX optical link controller 962, which interfaces with an RX optical link interface 902, forming a full-duplex photonic link channel. The link-layer protocol transfers data in 56-bit chunks called blocks. Blocks can consist of data and control messages, and each block type has a priority that can change depending on the link state. A series of data blocks composes a frame, in which an upper layer would place packets. Data blocks compose the beginning and body of a frame, and separator blocks denote the end of a frame. Control blocks can be interspersed among data blocks and frames.

After reset is released, the RX optical link controllers 962 on both sides of a communication link 9, i.e. in two separate chips, follow a common protocol to bootstrap themselves from an initial (INIT) state to a ready (READY) state. At startup, the TX and RX optical link controllers 961 and 962 on both sides of a photonic link 9 begin the initialization process by finding block lock on their RX optical interfaces 902, as described above with reference to the SYNC Detector section. During this time, both the TX and the RX optical link controllers 961 and 962 are in the INIT state and transmit NOT_READY blocks on their corresponding TX and RX optical link interfaces 901 and 902. NOT_READY blocks communicate to the TX optical link controller 961 on the opposite end of an optical link 900 that they are not ready to receive data. Once the TX or RX optical link controller 961 or 962 on one side of an optical link 900 has finished initialization, it enters the Wait for Remote (WFR) state and must transmit IDLE blocks until its corresponding optical link partner has finished initialization. While in this state, the RX optical link controller 962 must be prepared to receive any valid data or control block at any time. Once a TX or RX optical link controller 961 or 962 in the WFR state receives blocks other than NOT_READY, it knows that its corresponding optical link partner is either in the WFR or READY state. The TX or RX optical link controller 961 or 962 can now enter the READY state and begin transmitting data. If the TX or RX optical link controllers 961 or 962 enters the FAULT state, the transmitter in the TX optical link interface 901 immediately begins sending NOT_READY blocks communicate to the RX optical link controller 962 on the opposite end of the optical link 900 that they are not ready to receive data.

When a RX optical link controller 962 loses control over its RX optical link interface 902 and requires reset (due to loss of block lock or some other problem), it must immediately begin transmitting NOT_READY blocks so that its link partner knows that it cannot properly receive blocks. Should a TX optical link controller 961 begin receiving NOT_READY blocks, it must immediately transition to the WFR state and transmit IDLE blocks. Once the TX optical link controller 961 begins receiving blocks other than NOT_READY, it may transition back to the READY state and resume transmitting normally.

Figure 4B:
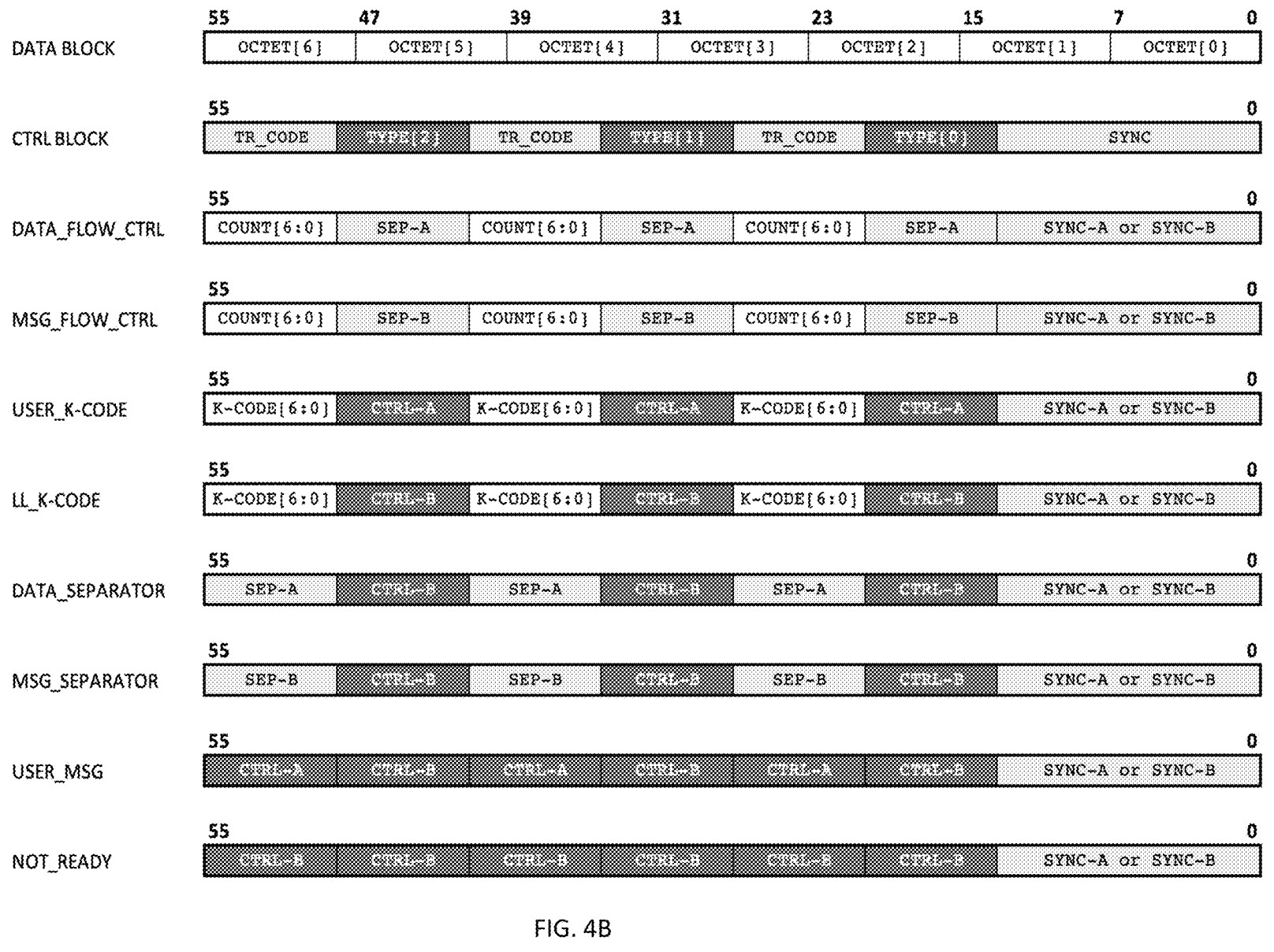

With reference to FIG. 4B, exemplary 56-bit link-layer blocks may be either control or data blocks. Control blocks carry link-layer control messages and indicate frame boundaries. Data blocks carry frame payload. Each 8-bit data symbol of an encoded 64-bit block maps to a 7-bit unencoded data value. CTRL, SEP, and SYNC symbols do not have an unencoded 7-bit representation.

In FIG. 4B, the block diagrams show the blocks unencoded to highlight how data octets fit into an 8×7-bit=56-bit block, the control symbols are highlighted in the 7-bit fields where the encoder 940 inserts the 8-bit control code in place of normal data or control symbols for the 64-bit SERDES transmission block. Likewise, the 16-bit SYNC symbol is inserted during the control block encoding process and does not have a 14-bit unencoded representation.

Control blocks may start with one of the SYNC symbol patterns, SYNC-A or SYNC-B. The choice of either SYNC-A or SYNC-B depends on the current RD in order to maintain signal integrity in the SERDES 931/932. While the 16 bits of SYNC-A and SYNC-B have a total disparity of 0, the first 8 bits of SYNC-A and SYNC-B are biased negative and positive respectively. If RD is negative, then SYNC-B is chosen, to prevent excessive short-term negative bias. If RD is positive, then SYNC-A is chosen, to prevent excessive short-term positive bias.

The next six symbols may consist of three triple-redundant TYPE fields separated by three triple-redundant TR_CODE fields. The SYNC symbol and three TYPE fields form a 2-of-4 code, in which two of the four symbols must be valid to decode a control block. Thus, the control header is resistant to burst errors at least 8 bits long and at most 16-bits long. The TYPE fields decode the type of the control block.

TYPE Field Decode

| TYPE Value | Block Type |
| --- | --- |
| SEP-A | DATA_FLOW_C-TRL |
| SEP-B | MSG_FLOW_CTRL |
| CTRL-A | USER_K-CODE |
| CTRL-B | LL_K-CODE |

If one or two of the TYPE fields are corrupted, the type of the control block can still be determined from the remaining TYPE fields. NOT_READY, USER_MSG, DATA_SEPARATOR, and MSG_SEPARATOR blocks are special LL_K-CODES.

The TR_CODE fields are naturally resistant to burst errors, as they are both redundant and separated spatially. The TR_CODE fields are used for the numerical values of the DATA_FLOW_CTRL, MSG_FLOW_CTRL and K-CODE control blocks. Voting logic before the symbol decoder selects the majority bit value for each of the 8 bits of the three TR_CODE fields.

If a block cannot be decoded as a control block, a DATA block is assumed. DATA and DATA_SEPARATOR blocks form the data frame structure of the link layer protocol. A DATA block may be entirely composed of data symbols, arranged as a sequence of 7 octets, with no SYNC, SEP, or CTRL symbols in it. DATA_SEPARATOR block may have a control block format in which the TYPE fields are filled with CTRL-B symbols, and the TR_CODE fields are filled with SEP-A symbols. Each data frame starts with at least one DATA block, followed by zero or more DATA blocks and then terminated with a DATA_SEPARATOR block.

DATA_FLOW_CTRL and MSG_FLOW_CTRL blocks are used by the TX and RX optical link controllers 961 and 962 to manage the capacity of the TX and RX frame buffers 914 and 924 between the TX and RX link layers 912 and 922 and the network layer, i.e. the TX PIF 913 and the RX PIF 923, respectively.

DATA_FLOW_CTRL blocks instruct the opposing transmitter in the TX optical link interface 901 to enter the DATA_FLOW_CTRL state. MSG_FLOW_CTRL blocks instruct the opposing transmitter in the optical link interfaces 901 to enter the MSG_FLOW_CTRL state. These states push idle blocks to a higher priority than DATA and/or USER_MSG DATA blocks for some number of block cycles, specified by the COUNT field. If a transmitter in the flow control state receives another flow control message, its counter is immediately updated with the new COUNT value. A COUNT value of 0 or an XON K-COD immediately restores the transmitter to the READY state.

The DATA_XOFF or MSG_XOFF K-CODE instructs the transmitter in the optical link interface 901 to immediately cease transmitting all DATA or USER_MSG blocks respectively. The transmitter will transmit IDLE K-CODES when there is nothing of higher priority to transmit.

A DATA_XON or MSG_XON K-CODE immediately releases flow control for data or message blocks. USER_K-CODES and LL_K-CODEs are both 7 bits, supporting up to 128 values. USER_K-CODEs are available to the upper protocol layers for any purpose. The TX and RX link-layer controllers 961 and 962 use LL_K-CODES to manage the link and dataflow. LL_K-CODES have higher priority than USER_K-CODES.

Example Link Layer Control Codes

| TR_Code Value | Name | Description |
| --- | --- | --- |
| 0x00 | IDLE | Transmitter has nothing else to send |
| 0x02 | DATA_XOFF | Request to stop transmitting buffered data blocks |
| 0x03 | DATA_XON | Request to resume transmitting buffered data blocks |
| 0x04 | MSG_XOFF | Request to stop transmitting buffered user msg blocks |
| 0x05 | MSG_XON | Request to resume transmitting buffered user message blocks |

User messages are special frames similar to data frames, but with a higher priority. User message frames may interrupt data frames at any time, even in the middle of a data frame transmission. The internal structure of these frames is determined by the network layer, but is likely to be similar to data frames. User message frames start with a USER_MSG block, followed by one or more DATA blocks, and terminate with an MSG_SEPARATOR block. Following the separator block for a user message frame, data frame blocks return to normal priority and may resume transmission.

Control blocks have built-in error detection and correction. All control blocks are constructed to withstand single burst errors at least 8 bits long. A block that is not decoded as a control block is assumed to be a DATA block.

The SYNC symbol and TYPE fields form a 2-of-4 code, requiring only two of four symbols to be valid. A burst error of at most 8 bits can only corrupt at most two of these symbols. If the SYNC symbol is valid, then only one of the TYPE fields must also be valid. If the SYNC symbol is invalid, then two of the TYPE fields must be valid. If one or two of the TYPE fields are corrupted, the other TYPE fields are used to determine the type of the block.

The TR_CODE fields are triple redundant since they contain arbitrary number values. A TR decoder (voting circuit) 943 decodes the majority value for each bit in this field. The TR decoder 943 is positioned before the second 7b/8b decoder 944 so that it operates on the raw input data from the SERDES deserializer 932.

DATA blocks have no built-in error correction or detection facilities. Error detection and correction is the responsibility of upper layers. Single-bit errors are likely to cause corruption of an entire 7b/8b symbol, so an error detecting/correcting code suited to burst errors, such as CRC or Reed-Solomon, is recommended. Without any guarantee, the link-layer 7b/8b decoder 942 may detect some types of symbol corruption. If detected, the RX link-layer 922 will notify the network layer (RX PIF 923) of these symbol errors.

The TX buffer 914 and the RX buffer 924, which form the interface between the TX and RX link-layers 912 and 922 and the network-layers, i.e. TX PIF 913 and RX PIF 923) for both TX and RX optical interfaces 901 and 902, may each comprise three synchronous or asynchronous buffers. The three buffers for each TX and RX optical link interface 901 and 902 may comprise a data frames buffer 917 or 927, a user message frames 918 or 928, and user K-code buffer 919 or 929, which may be disposed between the link-layers 912 and 923 and the network layer, i.e. TX PIF 913 and RX PIF 924, respectively. The user message buffers 918 and 928 and the data frame buffers 917 and 927 may store 7-octet payload blocks with additional control bits prepended that denote additional information, the start of a frame/packet, and the end of a frame/packet.

The TX link-layer controller 961 may pull one of the 7-octet blocks from the TX buffer 917 when it is ready to transmit data, and the RX link-layer controller 962 will push one of the 7-octet blocks to the RX buffer 927 when it receives data. The RX link-layer controller 962 will manage the capacity of the RX buffer using the flow control mechanism described.

Figure 5:
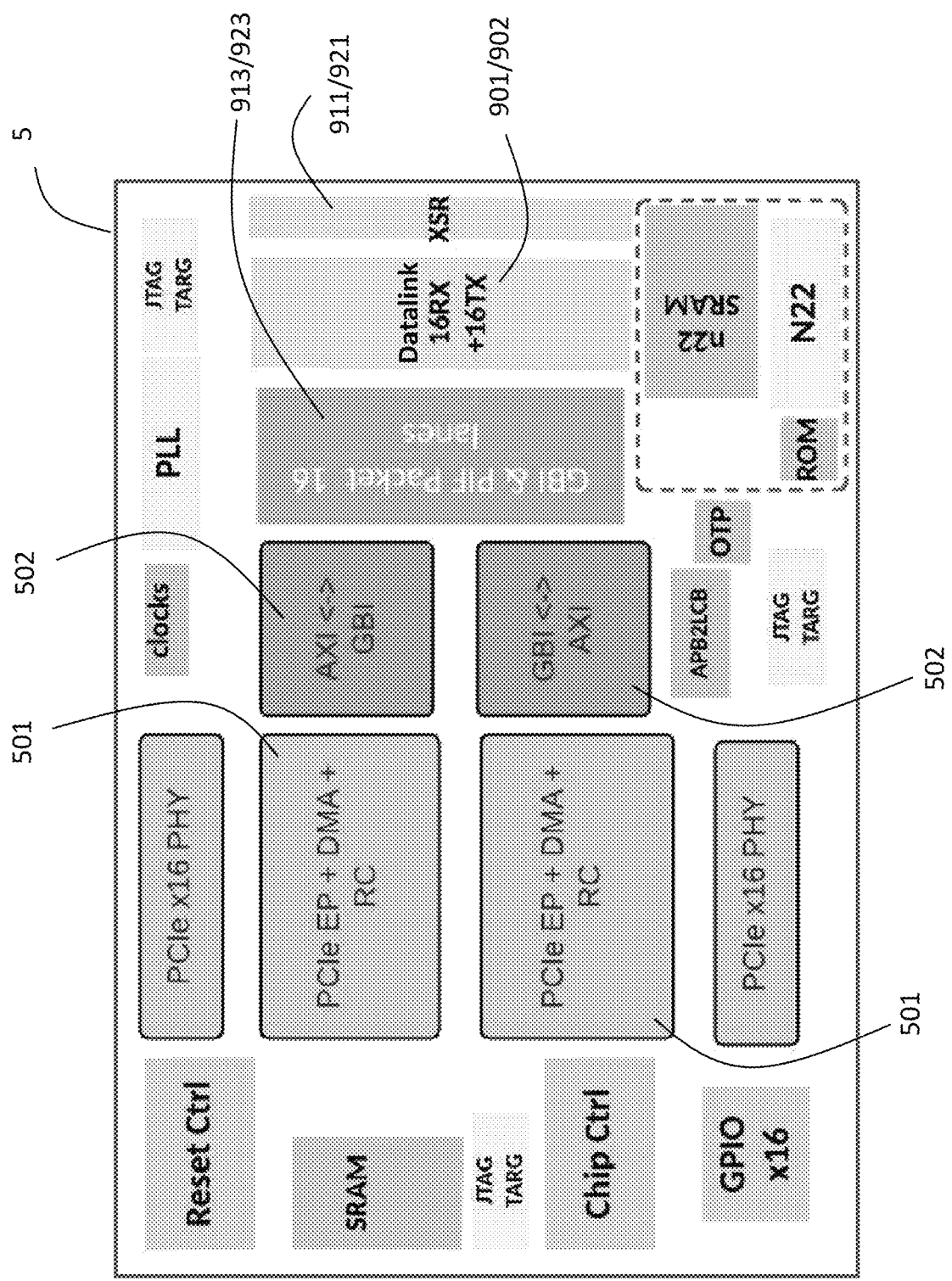
FIG. 5 is a schematic diagram of an exemplary bridge device in accordance with the present disclosure.

With reference to FIG. 5, the bridge device 5 are a bridge between a host computer motherboard and the optical computer system 1, in particular between a peripheral component interconnect (PCI), e.g. PCI express or PCIe-Gen5, and the TX and RX optical link interfaces 901 and 902, which provides a path for programs running on the host computer system, e.g. Linux servers, to copy massive amounts of data to the memory modules 21 or any other destination on the optical computer system 1 and then run their programs on processors in the computational devices 3. Accordingly, the bridge device 5 enables an application to read or write every single byte in the memory rack unit 11 or cluster of memory rack units $11_1$ to $11_n$, including any byte in the peripheral register space of any endpoint in the computation devices 3. In some embodiments, the bridge device 5 guarantees 1.0 Tb of aggregate (bidirectional) throughput over the optical links 900 via the plurality of optical link interfaces 901 and 902 thereon, which is typically limited by the bandwidth of the PCI. To achieve this bit rate, the bridge device 5 includes TX and RX optical link interfaces 901 and 902, each with a serializer 931 of a TX PHY 911 and a deserializer 932 of a RX PHY 921. In mission mode, the bridge device 5 connects to a tier 2 switch device 4 or potentially a higher order T>1 switch device 4 in some configurations. Outside of mission mode, the bridge device 5 can connect directly to the aggregation devices 2.

Each of the bridge devices 5 may connect to one tier, e.g. 2 or 3, (T>1) switch device 4 or each memory rack unit 11 can be configured with a plurality, e.g. four or more, bridge device 5 connected to one tier, e.g. 2 or 3, (T>1) switch device 4. The limit is on the host computer server, not on the optical computer system 1. Likewise, a cluster of memory rack units $11_1$ to $11_m$ can be configured with at least 8 or 16 bridge devices 5. The limitation on the host computer server may be one of PCI sockets in the motherboard. For example, four bridge devices 5 on four PCIe cards using four ×16 slots with 1×PCIe Gen5.

One exemplary configuration includes: 2×PCIe Gen5, 1×XSR NRZ or PAM-4.

PCIe bandwidth for one bridge device 5:

1×Gen5: 16 lanes*2 direction*32 GT/s=1024 Gb/s

2×Gen5: 32 lanes*2 direction*32 GT/s=2048 Gb/s

Optical link bandwidth for one bridge device 5:

16 lanes*2 direction*56 Gb/s (NRZ)*⅞=1568 Gb/s on communication, e.g. photonic, link 9

16 lanes*2 directions*112 Gb/s (PAM4 RAW)*⅞=3136 Gb/s on communication, e.g. photonic, link 9

16 lanes*2 directions*90 Gb/s (PAM4 Realized Peak)*⅞=2520 Gb/s.

The bandwidth for one bridge device 5 is limited by the slowest path, i.e. PCI or photonic link 9, which is 512 Gb/s each way for an aggregate of 1024 Gb/s. As such, the limit for a four bridge devices 5 is system is 4*16 PCI lanes*32 GT/s*2=4096 Gb/s of aggregate PCI bandwidth. Because of the relatively low bandwidth of PCIe GEN 5 interfaces, the optical link connections between one bridge device 5 and one Tier 2 switch device 2 can be run at speeds down to PAM-4 at 28-G baud without impacting performance. Even NRZ at 28-GBaud is nearly as performant.

The bridge device 5 is a bridge device that in some embodiments connects a PCIe fabric on one side with the optical link fabric on the other. A bridge device 5 may include a PCI endpoint controller 501, e.g. a PCIe endpoint controller, a plurality, e.g. 16, of TX optical link interface 901, each including a TX PIF 913 and a TX PHY 911, and a plurality, e.g. 16, of RX optical link interface 901, each including an RX PIF 923 and an RX PHY 921, plus some logic to bridge the PCI to optical link connection, e.g. to bridge the PCIe controller's AXI buses and the TX and RX PIFs 911 and 913.

The bridge device 5 includes hardware necessary to support the bidirectional flow of commands and responses between the host system's memory space and addresses in optical computer system 1. The command/response flow not only enables access to the memory modules 21 (DRAM) in the aggregation devices 2, but also enables access from CPUs to the host, interrupts to the host, and internal chip communications. Control and status registers support performance measurement, securing of the platform, and system reliability.

The bridge device 5 is configured to transfer data between the host computer's physical address space and the physical address space of the optical computer system 1. The bridge device 5 does so by being configured for converting electrical signals in the form of packets, e.g. transaction layer packets (TLP), from the host computer into optical signals in the form of packets, e.g. MEMCPY or DMA protocol packets, compatible with the optical computer system 1 and vice versa. The TLP packet format is well documented in the PCIe world, for example: the TLP comprises a header, an optional data payload, and an optional TLP digest.

The packet conversion is implemented in a combination of a TX and RX PIF 913/923 and a corresponding GBI (Generic bus interface) block 502. The GBI block 502 is a module attached to the internal port of the TX and RF PIF 913/923 that converts between PIF transactions and the system on chip (SoC) specific fabric protocol, e.g. TLP packets to MEMCPY packets. The GBI block 502 may include an AXI initiator on an AXI bus connecting it to the TX and RX PIF 913/923. The MEMCPY packets may be generated as initial read requests or write requests. The latter also contains a write data payload. The MEMCPY packets, may be PIF (packet interface) packets that flow over the TX and RX optical link interfaces 901 and 902.

Figure 6A:
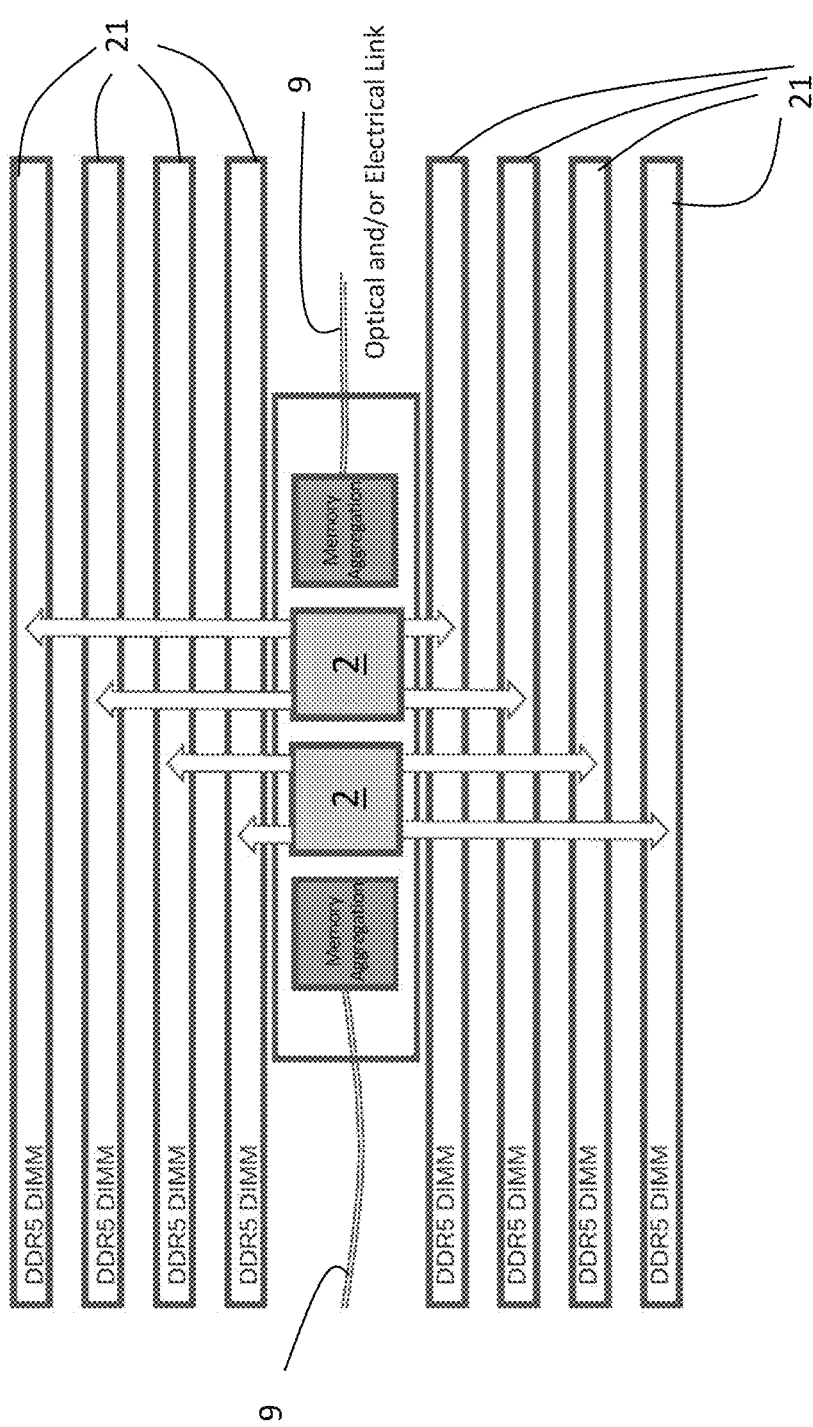
FIG. 6A is a schematic diagram of an exemplary memory aggregation device in accordance with the present disclosure.

FIG. 6A illustrates an exemplary memory aggregation device 2 in a memory rack unit 11. The memory aggregation device 2 is the intermediary between photonic links 9 and a plurality of memory modules 21, e.g. 2-8 DDR5 DIMMs, preferably 4-8 memory modules 21 per memory aggregation device 2. The memory modules 21 may contain up to 64 GBytes (or more) of memory and up to 256 GBytes (or more) of DRAM memory, only limited by the current technology generation of DRAM DIMMs. With 256 DIMMs in the computer system 1, then a single memory rack unit 11 can contain from 16 TBytes to 64 TBytes of DDR5 DRAM, and a single cluster comprising ten memory rack units $11_1$ to $11_{10}$ can contain 160 TBytes to 640 TBytes of DDR5 DRAM. Just two clusters or ten memory rack units $11_1$ to $11_{10}$ can contain more than 1 PByte of DDR5 DRAM and a full 240 memory rack unit system can contain more than 61 PBytes of DDR5 DRAM. This is a phenomenal amount of working storage for systems, such as the world's largest and fastest AI supercomputer. This vast DRAM complex is comparable to the fastest HBM DRAM configurations, without the severe capacity limitations incurred by HBM.

Figure 6B:
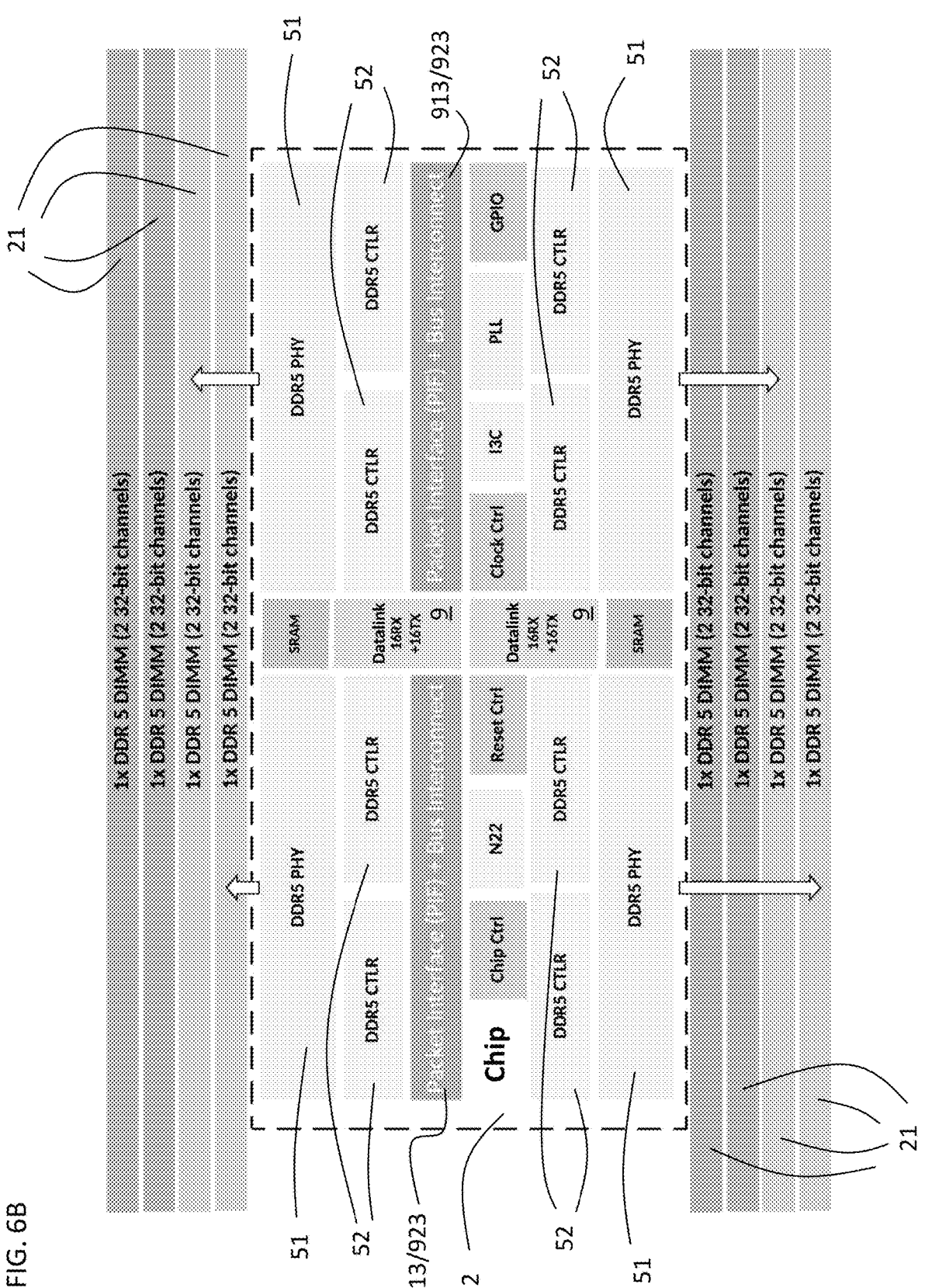
FIG. 6B is a schematic diagram of an exemplary memory aggregation device in accordance with the present disclosure.

With reference to FIG. 6B, in an exemplary arrangement, each memory aggregation device 2, connects to the plurality of memory modules 21 via memory module physical layer (PHY) internet protocol (IP) connector 51, one for each memory module 21, e.g. DIMM. The PHY connector 51 may be an electronic circuit, e.g. an integrated circuit, required to implement physical layer functions of the OSI model in a memory controller 52. The PHY connectors 51 connects the memory modules 21 to the TX and RX optical link interfaces 901 and 902. In addition, there may be two memory controllers 52, e.g. DRAM controllers, for each memory module 21 for a total of 8 memory (DRAM) controllers 52 on each memory aggregation device 2. Each (DDR5 DRAM DIMM) memory module 21 may contain two channels, both of which may be connected to the same DRAM PHY IP connector 51. Each memory controller 52 may be connected to exactly one channel, whereby the memory module 21 behind one channel may be completely independent from the memory module 21 behind the other channel. Thus, both memory controllers 52 can cycle their part of the memory on the memory module 21 in parallel with each other.

Figure 6C:
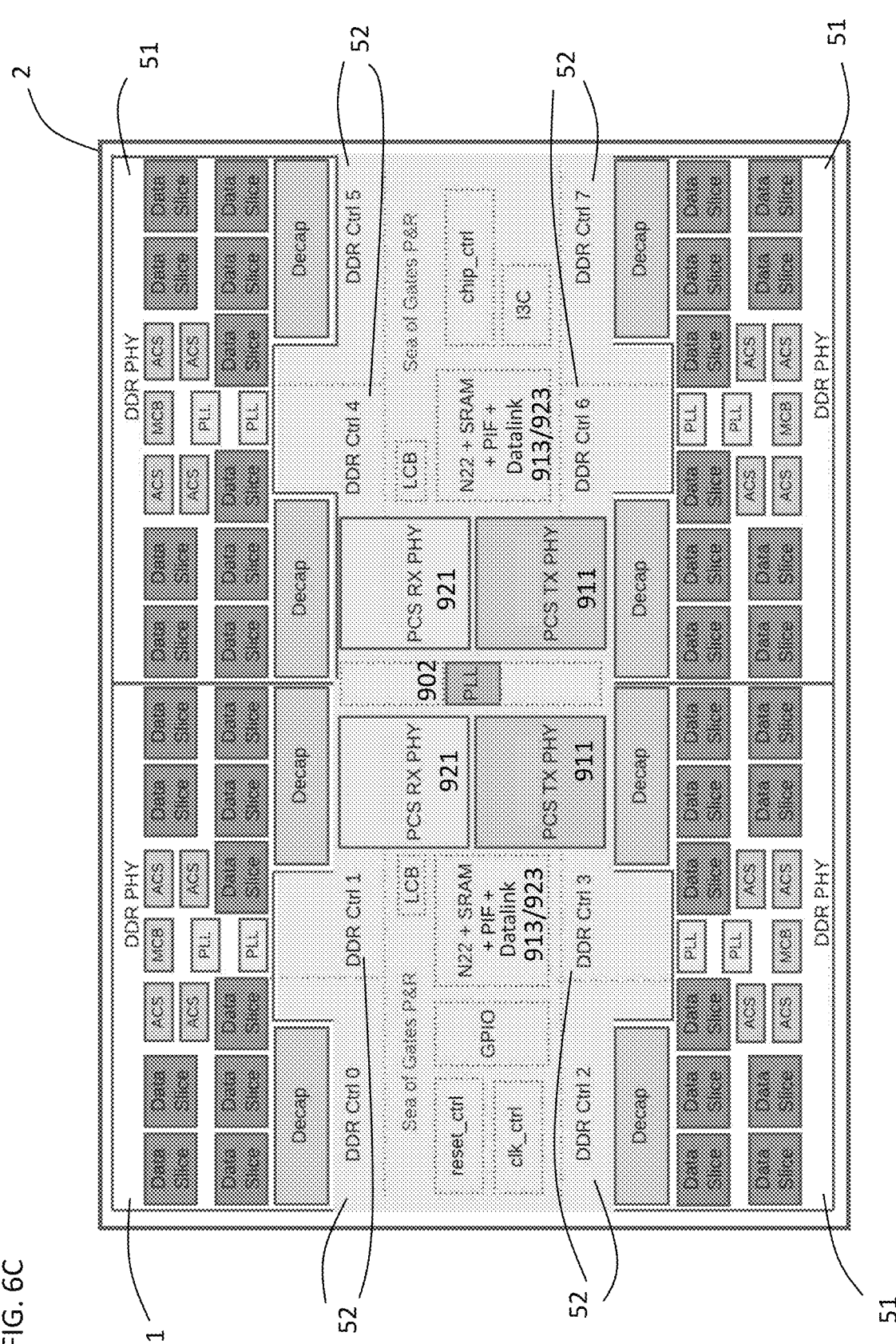
FIG. 6C is a schematic diagram of an exemplary memory aggregation device in accordance with the present disclosure.

With reference to FIG. 6C, in addition to the four PHY connectors 51 on each memory aggregation device 2, there may be two pairs of TX and RX PHY's 911 and 921, respectively, each including the corresponding SERDES component, e.g. serializer 931 or deserializer 932, e.g. XSR SERDES block. Each SERDES may support a plurality, e.g. up to 16 or more, transmitter (TX) and a plurality, e.g. up to 16 or more, receiver (RX) optical link interfaces 901 and 902. Each of the pairs of TX and RX optical link interfaces 901 and 902 may operate completely independently from the others. They may or may not be bonded together in any way. Each one conveys a memory copy (MEMCPY) packet that is described in more detail below. Thus at least 16 or more substantially simultaneous read requests can be issued to each memory aggregation device 2 at once over the plurality, e.g. 16, RX lanes of the pairs of optical links 900. Meanwhile the read data packets serving the plurality, e.g. up to 16 or more, substantially simultaneous read requests can be transmitted at once over the plurality, e.g. up to 16 or more, TX lanes of the pairs of optical links 900. Accordingly, for example up to 4 (or more) Kbyte read data packets can be emitted at once from each TX lane on each memory aggregation device 2 or 16×4 Kbyte packets of read data can be sent in parallel, which means that traffic from all eight memory controllers 52 can flood the optical links 900 in parallel.

FIG. 6C illustrates an exemplary memory aggregation device 2 in which there may actually be two TX PHY 911 and two RX PHY 921, i.e. two SERDES 931/921, on each memory aggregation device 2, two transmit (TX) serializers 931 and two receiver (RX) deserializers 932. Thus, each memory aggregation device 2 may be actually serviced by up to 32 TX optical link interfaces 901 and up to 32 RX optical link interfaces 902. There are a number of other blocks shown in this floor plan, but we will ignore them for now and focus only upon the memory interfaces and the optical link interfaces 901 and 902. Accordingly, each memory aggregation device 2 offers extremely high-capacity support for the memory modules 21 in an extremely fast and highly parallel fashion. It does this while taking extreme advantage of the interleaving possibilities inherent in the computer system 1.

In the example above, the four memory modules 21, e.g. DDR5 banks, connected to the memory aggregation device 2 are interleaved on 4 KB boundaries. A controller bit in an address map above the 4 KB boundary picks one of the two memory controllers 52 associated with the memory module 21, e.g. DDR5 DIMM memory bank. Each memory controller 52 in the memory aggregation device 2 may have up to eight (or more) AXI interface ports, each of which is independent of the others. Half, e.g. four, of the ports may be connected to an AXI interface of one TX and RX PIFs 913 and 923, and half, e.g. four, may be connected to the AXI interface of a separate TX and RX PIFs 913 and 923. The AXI interfaces between the two TX and RX PIFs 913 and 923 are not connected in any way. The TX and RX PIFs 913 and 923 may only have the capability to execute AXI transactions to only the two memory controllers 52 connected to it, thereby greatly simplifying the interconnect.

Overall, the TX and RX PIFs 913 and 923 within the memory aggregation devices 2 may perform one or more of the following services:

1. Receiving, validating, and processing endpoint MEMCPY or DMA packets from the TX and RX optical link interface 901 or 902. Supported commands within the MEMCPY or DMA packets include write operations (WRITE and WRITE WITH ACK) and complete read request operations.
2. Generating MEMCPY or DMA packets for read data and WRITE ACKs and transmitting these back through the TX and RX optical link interface 901 and 902.
3. Provide routing of the optical link transactions between the TX and RX optical interfaces 901 and 902 as needed for support of bypass functions.
4. Providing debug and POST functions through the generation of MEMCPY or DMA packets and associated commands.

Each TX PIF 913 and RX PIF 923 may contain a device-specific interface module called the GBI (Generic Bus Interface) which is used to connect to the internal fabric of each device, e.g. device 2, 3, 4 and 5. The GBI module is customized per device to match the internal protocol. For the memory aggregation devices 2, the memory controllers 52 may be the only target devices connected to the TX PIF 913 and the RX PIF 923. In some embodiments the memory controllers 52 may implement an AXI4 bus protocol, so the TX PIF 913 and the RX PIF 923 use a GBI module called PIF_AXI_GBI The PIF_AXI_GBI module is the device initiator on the AXI bus and supports read and write operations as needed to complete the incoming commands. The version of the PIF_AXI_GBI using the memory aggregation devices 2 supports two separate target devices without the need for additional interconnect logic.

The MEMCPY transaction system address sent within the bulk data packets is modified when used for the AXI address to the memory controller 52. The system address contains a number of bit fields selecting the final board, system, and route for the packet. This information may be removed from the final address presented to the memory controller 52. The current addressing of 40 bits allows each memory controller 52 to support up to 1 TByte of locally connected memory.

Figure 7:
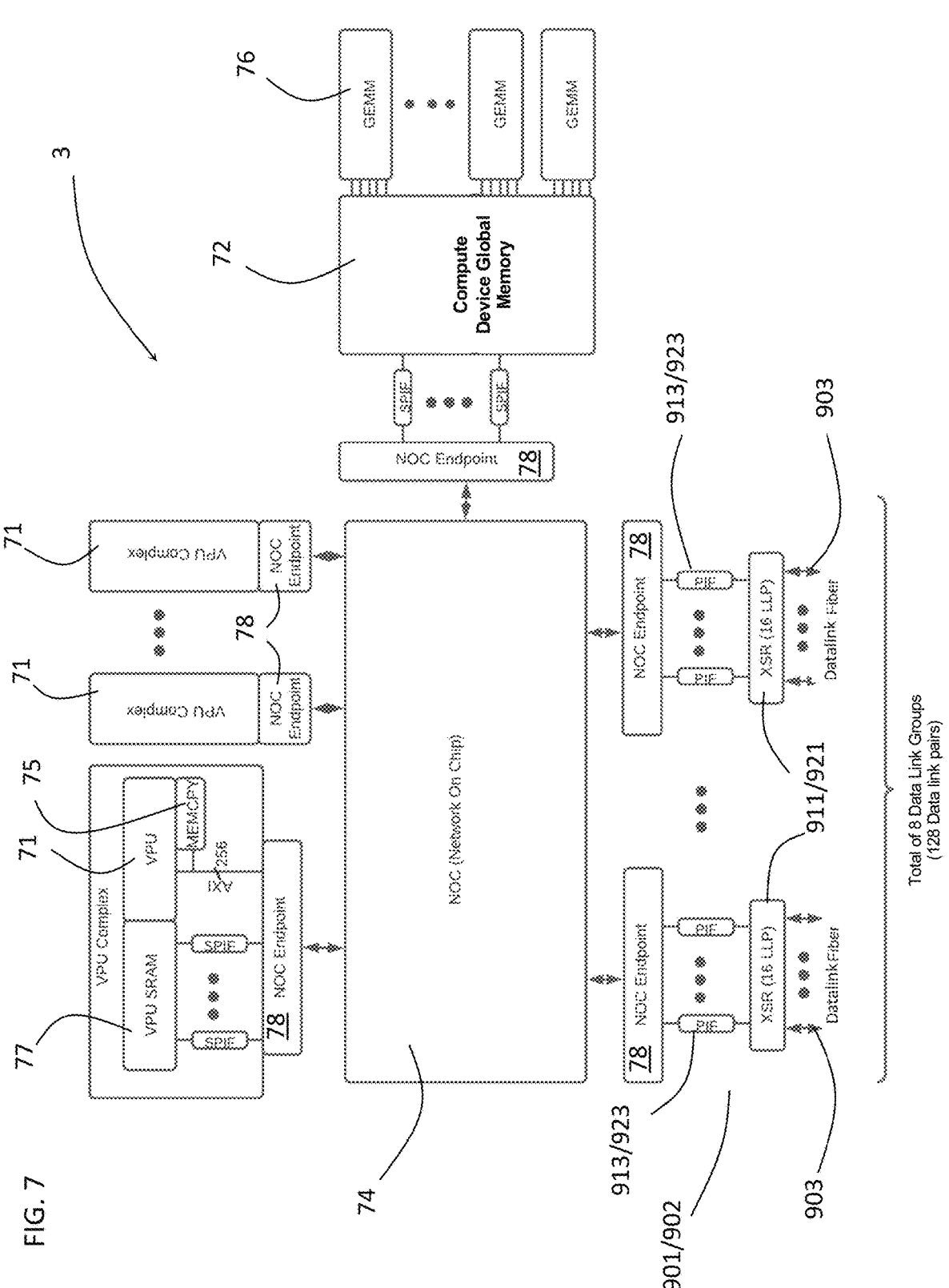
FIG. 7 is a schematic diagram of an exemplary computational device in accordance with the present disclosure.

FIG. 7 illustrates the top-level block diagram of the computational device 3, in which there may be four major areas: one or more vector processing units 71, a global memory (GM) 72, TX and RX optical link interfaces 901 and 902, and a network on chip (NOC) 74. A general matrix multiplication (GEMM) matrix 76 may be coupled to the GM 72. Each of the other areas may be connected to the NOC 74 via NOC endpoints 78.

There may be a plurality, e.g. up to 128 or more, of pairs or optical links 900 connecting each computational device 3 to the rest of the computer system 1 via the TX and RX optical link interfaces 901 and 902. For example: sixteen communication links 9, i.e. pairs of optical links 900, may be connected from each of the eight switch devices 4. Each of the, e.g. 128, pairs of optical links 900 may be completely independent from the other pairs of optical links 900. Accordingly, a plurality, e.g. 128, of memory read requests or write transactions to the memory modules 21 via the memory aggregation devices 2 and the switch devices 4 may be launched in parallel from a single computational device 3, whereby when the total of the number of computational devices 3, e.g. 8, in a memory rack unit 11 multiplied by the number of communication links 9, e.g. pairs of optical links 900, e.g. 128, results in a large number, e.g. up to 1024 or more, simultaneous memory request transactions can be emitted from the computational device 3 for each memory rack unit 11. For example, the 64 memory aggregation devices 2 in a memory rack unit 11 can have 16 pairs of optical links 900 and can receive up to 1024 memory request transactions at the same time. Each computational device 3 may include a memory copy, e.g. MEMCPY, engine 75 as part of each vector processing unit (VPU) 71, described below, which can flood all, e.g. 128, of the communication links 9, e.g. the TX optical links 900, on a computational device 3 with read requests or write transactions for up 4K (or more) data payloads each. At 90 Gbps effective bandwidth for a single communication link 9 this amounts to more than 1.4 Tbps per computational device 3 per direction or more than 115 Tbps for the computational devices 3 in a single memory rack unit 11. With all 240 memory rack units 11 operating at peak bandwidth, the bandwidths on the TX lanes can be 2.8 Pbps and the same in the RX direction simultaneously. This is for traffic that stays strictly within the memory rack unit 11. How all these computational device 3 transactions can leave a memory rack unit 11 and move data freely between memory rack units 11 is described below.

The memory copy engine 75 and the plurality of communication links 9, e.g. pairs of optical links 900, up to 128 (or more), can be used to move data back and forth between the computational device 3 and the memory modules 21, e.g. DRAM DIMMs, simultaneously in parallel. The optical links 900 may also be able to freely support computational device 3 to computational device 3 transfers. Each computational device 3 includes the large, shared global memory (GM) 72. The memory copy engine 75 can move data between the GMs 72 on two or more computational devices 3. This is particularly useful when sharing intermediate results from calculations from the VPU 71 or the GEMM matrix 76, e.g. ALL REDUCE. In addition, the source or destination of the memory copy engine 75 can target any of the memory modules 21 or the SRAMs 77 that are tightly coupled to the VPUs 71. Thus the memory copy engine 75 can orchestrate data movement over the pairs of optical links 900 from any memory in any of the four device types 2-5 to anywhere in the computer system 1. To that end, all physical memory addresses used for work in the memory copy engine 75 requests are a full 64-bits. These addresses are divided between memory (DRAM) addresses and all other endpoints including the GMs 72 and the VPU SRAMs 77.

The computer system 1 is optimized for fast, large-block transfers between external memory modules 21 (DDR) connected to the memory aggregation devices 2 and the compute subsystem contained within the computational devices 3. The block sizes used within the system are generally multiple megabytes. The memory copy engine 75 performs the job of breaking the large data transfers into smaller, e.g. MEMCPY or DMA, packet-sized operations, e.g. as many MEMCPY transactions as there are communication links 9, e.g. TX and RX optical link interfaces 901 or 902, on the computational device 3 which can be put into operation nearly simultaneously, that are then dispatched over multiple TX and RX optical link interfaces 901 or 902 and transferred in parallel. A memory copy engine on the bridge device 5 performs a similar function to the memory copy engine 75 on the computational device 3.

The MEMCPY or DMA is actually implemented in a combination of the TX PIF 913 or RX PIF 923 and its corresponding "personality defining" GBI (Generic bus interface) block. The GBI block is a module attached to the internal port of a PIF instance that converts PIF transactions into the SoC-specific fabric protocol. In the case of memory aggregation devices 2, this personality may be that of an AXI initiator on the AXI bus connecting it to the (DDR5 DRAM) controller 52. In the case of the computational devices 3 or the bridge devices 5, the MEMCPY packets are generated as initial read requests or write requests. The latter also contains a write data payload. The MEMCPY packets, may be PIF (packet interface) packets that flow over the TX and RX optical link interfaces 901 or 902. It is easier to conceptualize the MEMCPY packets at the higher level of a MEMCPY or DMA transaction than at the subparts, such as PIF protocol decomposition and composition or its associated optical link interface flow mechanisms. This use of the term "DMA" to characterize what happens in a PIF and GBI interface within a chip helps with the understanding of the operations in the PIF/GBI. This usage of the term DMA is different and distinct from the term "DMA" as used in discussions involving the higher order functions of a PCIe DMA. The DMA data transfers are referred to as bulk data transfers, but in some embodiments, the maximum size of any of the DMA or bulk data transfers may be 4 KB.

All of the MEMCPY packets in the computer system 1 may work in push mode. In the case of a read operation, a read request packet is first "pushed" to the target optical link interface, e.g. the RX optical link interface 902 of the memory aggregation device 2. The RX optical link interface 902 performs the read and then creates a "push" transaction containing the read data in the form of MEMCPY packets. The packet header contains return address information as well as transaction tagging via a JOIN field.

The MEMCPY or DMA packet can also be routed intact through any RX optical link interface 921 such on the switch device 4. DMA or MEMCPY packet routing through any RX optical link interface 921 is needed when the connected device is not the target endpoint for the MEMCPY or DMA transaction and the transaction must pass through the device to reach the target endpoint. Such is the case for a switch device 4. The RX PIF 923 uses the passthrough path or mode for these operations and mixes the passthrough MEMCPY or DMA packets with the other MEMCPY or DMA packets through the same RX optical link interface 902. Each MEMCPY or DMA packet contains a return address that is used by the end point, such as a memory aggregation device 2, to select a link for returning read data packets or write acknowledgment packets. Similarly, the return address is used by a computational device 3 and a bridge device 5 to forward read data or write acknowledgement packets back to a specific link.

The MEMCPY or DMA packet may be processed within a device, e.g. the memory aggregation device 2, the computational device 3, the switch device 4 or the bridge device 5, in one of three ways:

The MEMCPY or DMA packets can be processed by the endpoint device, such as the memory aggregation device 2. Read and write transactions that arrive on the RX optical link interfaces 921 of the memory aggregation device 2 will be directed by the memory aggregation device 2 to the memory modules 21, e.g. DDR5 DRAM, ending up either as a write transaction to the memory module 21 or processed as a read request. Then the memory aggregation device 2 is configured to generate a matching read data MEMCPY or DMA packet and sends it back to the originator.

The MEMCPY or DMA packet can be routed through a device via a passthrough path, such as when the MEMCPY or DMA packet is sent through one of the switch device 4. The switch device 4 will transfer the MEMCPY or DMA packet from one of the RX optical link interfaces 921 to one of the TX optical link interfaces. No processing will be done on or by the MEMCPY or DMA packet itself.

The MEMCPY or DMA packet can be created as a result of processing the higher level memory copy transaction. A memory copy, e.g. MEMCPY, command is decomposed into one or more individual MEMCPY or DMA packets and dispatched into the optical computer system 1. The results are then collected to finish the memory copy, e.g. MEMCPY, operation. Normally, when one of the MEMCPY or DMA operations is created from a programmer's memory copy request, it is the computational device 3 that creates the operations. The bridge devices 5 may not contain a memory copy engine 75 itself. Instead, the bridge devices 5 may use a standard PCIe-style MEMCPY or DMA controller on the PCIe side to generate and distribute packets across all of the channels of the optical links 900. The bridge devices 5 may use the JOIN field for credit posting back to the host.

Every single transaction on any optical link 900 may look as if a burst-oriented parallel memory request bus was extruded through one optical link 900. One packet on one optical link 900 is an independent transaction from all other transactions on all other optical links 900 connected to a device, even if they are directed to the same memory module 21, i.e. DRAM bank, on one of the memory aggregation devices 2.

For the switch devices 4 described herein, the switch fabric is simply a pathway for MEMCPY or DMA packets coming from one endpoint, for example one of the memory aggregation devices 2, to another endpoint, for example, bridge devices 5, e.g. PCIe bridge chip or one or the computational devices 3, i.e. they pass through unmodified.

The general matrix multiplication (GEMM) engine 76 in the computational device 3 may include a plurality, e.g. 128 by 128, of systolic arrays that have a large enough capacity to satisfy the plurality, e.g. 128, of communication links 9, e.g. pairs of optical links 900. The memory copy engines 75 and the pairs of optical links 900 are kept very busy moving input tensors from the memory modules 21 or from other computational devices 3 into the GM 72 for further processing by the GEMM engine 76. The GM 72 also serves as a landing buffer for embedding table lookups, which are also accelerated by the memory copy engine 75, as further described hereinafter.

Each computational device 3 may include the sophisticated Network On Chip (NOC) 74. The NOC 74 is an extension of the communication links 9, e.g. the optical links 900, onto and within the computational device 3. The same MEMCPY or DMA packets that flow on each optical link

900 may also flow, unmodified, on the NOC 74 to their final destination on the computational device 3 or from their original source on the computational device 3.

Figure 8:
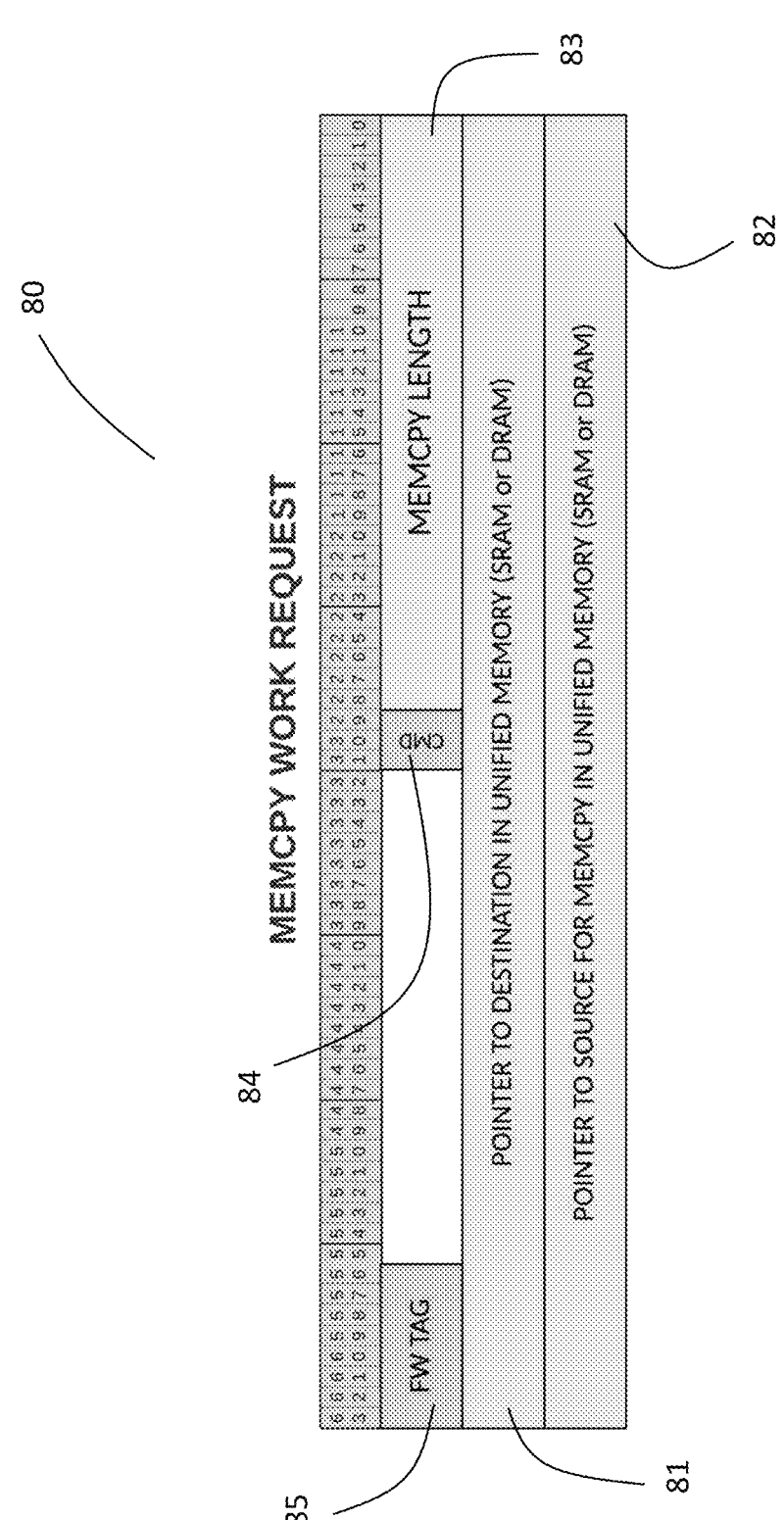
FIG. 8 is a schematic diagram of an exemplary MEMCPY work request packet in accordance with the present disclosure.

Firmware may generate work requests by writing a structure in the VPU SRAM 77. An exemplary basic structure for a work request 80 is shown in FIG. 8. The memory copy engine 75 can orchestrate both simple data movement operations as well as accelerated embedding table lookups. For simple data movement requests, the work request 80 may contain one or more of the following fields: a destination pointer 81 to a, e.g. 64-bit, physical destination address; a source pointer 82 to a, e.g. 64-bit, physical source address; a length field 83; a command field 84 (MEMCPY vs embedding lookups); and a firmware tag field 85 to facilitate interrupt processing.

When a work request 80 is handed off to the memory copy engine 75 in the VPU 71, the memory copy engine 75 may break it up into a plurality of MEMCPY or DMA request packets, e.g. 4K Bytes each, on a plurality, e.g. up to 128, of TX lanes, and then sends out read or write requests to move the requisite data. Firmware can request a work request 80 to move, e.g. 4 MBytes of data, from the memory modules 21 to the GM 72. To process this, the memory copy engine 75 may construct a plurality, e.g. 512 to 2048×2 KByte to 5 Kbyte, preferably 1024×4 KByte, MEMCPY or DMA request packets and drops them onto the NOC 74. The MEMCPY or DMA request packets are transmitted to the TX optical link interfaces 913 and are launched onto the optical links 900. To process the 1024×4 KByte transfers, the plurality of, e.g. 128, pairs of optical links 900 may each handle the plurality, e.g. up to 8 (or more) of the MEMCPY or DMA request packets and the corresponding plurality of, e.g. up to 8 (or more), read data packets coming back from the memory aggregation devices 2 and associated memory modules 21. Because of the switch devices 4 and the, e.g. 512-way, interleaving on all of the memory controllers 52 on the memory aggregation chips 2, the MEMCPY or DMA request packets, e.g. 512, will be sent to a different interleave in the (DRAM) memory modules 21. Then the second, e.g. 512, MEMCPY or DMA requests packets will be sent into the multi-way, e.g. 512, interleave. This means that as fast as the memory copy engine 75 can launch packets they will launch read requests in the, e.g. 64, memory aggregation devices 2. The latency of the optical links 900 is incredibly small, but when the data passes through the SERDES 931/932 and into a digital clock domain then unfortunate synchronizing clock delays happen which slow down the latency slightly. In addition, Forward Error Correction (FEC) on the optical links 900 and uncorrectable error management for the optical links 900 slow down the latency a bit more. Then there is the latency associated with the access to the memory modules 21 itself, i.e. the optical links 900 are not latency free in actual use. The optical computer system 1 may be designed to work around these latency issues, as described below.

As described previously, there can be up to ten or even more than ten memory rack units 11, in a cluster, and even up to 240 or more than 240 memory rack units 11 in the optical computer system 1. To facilitate this, all physical addresses, e.g. 32-128 bit, preferably 64-bit, may contain an identification, e.g. (BOX_SEL or BOX ID) field 91. The identification field 91 may uniquely identify a memory rack unit 11 or a cluster of memory rack units 11. Thus, any byte of DRAM anywhere in the cluster of memory rack units 11 or any byte of computational device VPU SRAM 77 anywhere in cluster of rack units 11 or the SRAM on hundreds of the bridge devices 5 can be addressed as either a source or a destination for a memory copy operation. This includes
the peripheral registers in the VPUs 71 or the bridge devices
5. The physical address in the optical computer system 1
may be truly a unified memory address. The compiler
generated executables or any other program running in a
VPU 71 or through a bridge device 5 all see exactly the same
physical address.

Figure 9:
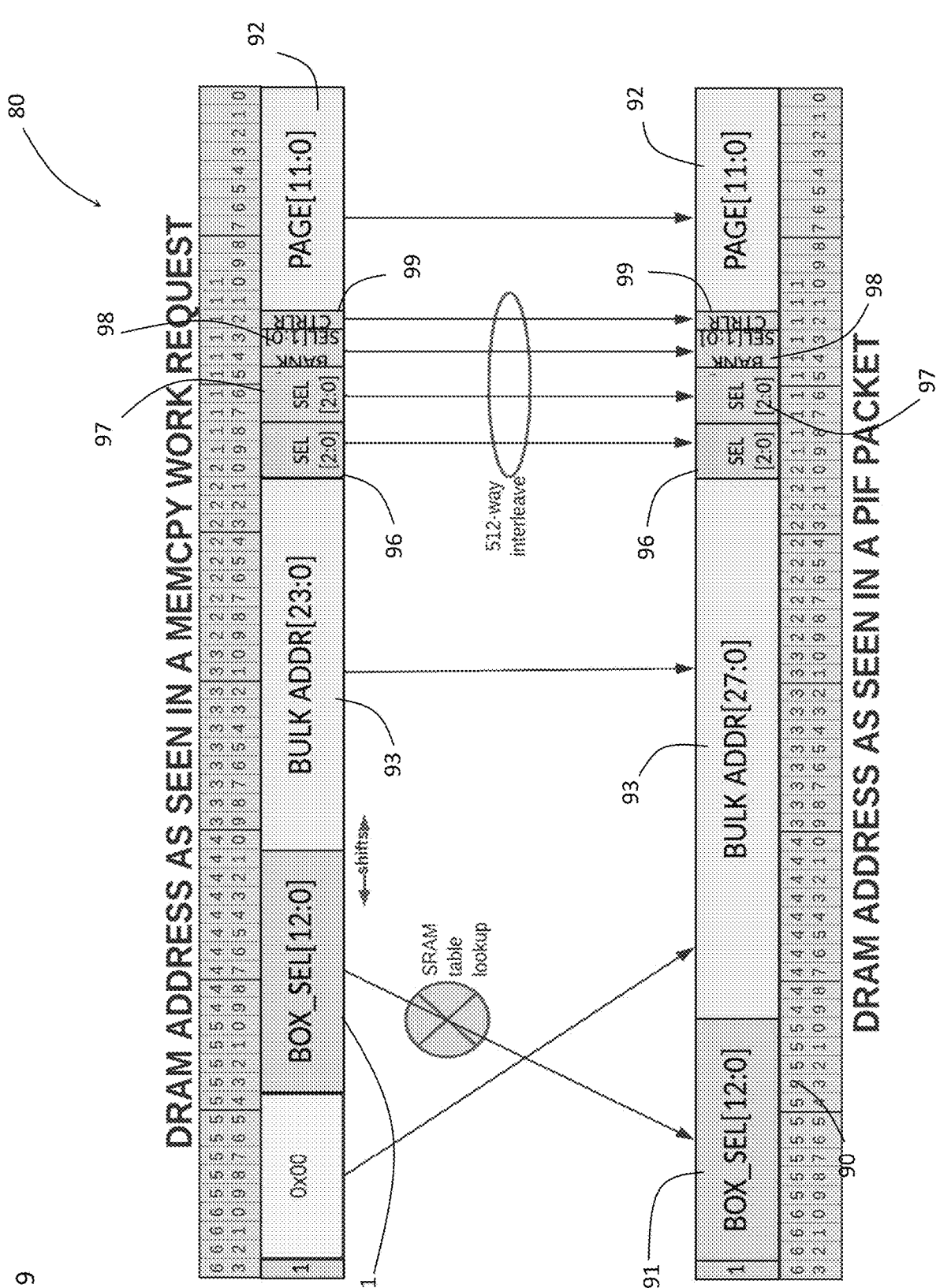
FIG. 9 is a schematic diagram of an exemplary MEMCPY work request packet transition to a PIF packet in accordance with the present disclosure.

With reference to FIG. 9, there may be a mapping step
between the addresses supplied to the memory copy engine
75, i.e. the work request 80, and to the physical address
translation step of the bridge device 5, i.e. PIF Packet 90. It
is highly desirable for the compiler and software developers
to see a contiguous DRAM address space across all the
memory rack units 11 making up the computer system 1. As
mentioned previously, the memory modules 21, e.g. DDR5
DIMMs, can be purchased in different capacities, e.g. 64
GB/DIMM or 256 GB/DIMM or multiples thereof, and
possibly others. In looking at the addressing shown in FIG.
9, the address of the memory module 21 may be broken into
two parts. The first field part 92 is the bits, e.g. 12 bits,
addressing the bytes within a 4 KByte page. The second field
part 93 is the BULK address which may allow the selection
of any 4 KByte page within a selected memory module 21.
Because the capacity of the memory modules 21 can vary,
the number of bits in the BULK address field 93 can vary.
The identification field 91 may be placed above all other
fields so that, if a memory rack unit 11 fails, it can easily be
removed from use. But this means the identification field 91
moves up or down in the, e.g. 64-bit, physical address
depending on the number of bits in the BULK address field
93. A programmable shift amount may be applied to the
addresses of the work request 80 and within the address
translation (PIF Packet) 90 for the bridge device 5. Once the
target sequential identification field 91 is extracted from the
work request 80 it is looked up in a translation table. The
result is the strictly contiguous address for a memory
module 21 across all memory rack units 11 in the computer
system 1 can be translated to discontinuous identification
fields 91 in all of the memory rack units 11. This is a great
simplification for all software running anywhere in the
computer system 1, including in a, e.g. X86, host processor.

With further reference to FIG. 9, memory, e.g. DRAM,
interleaving may be conducted between, e.g. 4K, pages in
memory, e.g. DRAM, addresses. The work request 80 and
the packet interface (PIF) packet 90 may also include a, e.g.
3 bit, switch device select field 96, a, e.g. 3 bit, a memory
aggregation device select field 97, a, e.g. 2 bit, memory, e.g.
DIMM, select field 98 and a, e.g. one bit, memory controller
select field 99. The, e.g. 9 bits, form an, e.g. 512 way,
interleave between the, e.g. 4K Byte, pages. Two sequential
pages in the physical address may go to different memory,
e.g. DRAM, controllers 52 and potentially to different
memory modules 21, e.g. DIMMs, and potentially even to
different memory aggregation devices 2. Considering the
4M Byte transfer example from above, all 512 sequential
page requests are gone through before requesting a second
4K Byte page transfer from the same memory controller 52.
For this example, each memory controller 52 handles
exactly and only two 4K Byte page read requests, e.g. out of
1024 read requests total. Thus, the transfer time is essentially
the time to transmit two 4K Byte pages. With this mecha-
nism 4 MBytes of sequential data have been transferred in
one read request 80. This is a phenomenal amount of data
bandwidth, and it is thanks to the communication links 9,
e.g. the pairs of optical links 900 and to the memory
architecture. Also, the latency for transferring this huge data
block is actually very small. The time to make a request and the time to get the first word from memory modules 21 via
the memory aggregation device 2 back to the VPU 71 of the
computational devices 3 is negligible compared to the 8
KByte transfer time. Thus, a completely uniform address
space is provided as well. The 9-bits of switch device select
field 96, the memory aggregation device select field 97, the
memory select field 98 and the memory controller select
field 99 are looked up in a translation table in the bridge
device 5 and the computational device 3 so that interleaving
can be optimized for both small or large data transfers or
both.

The computer system 1 may define the format of all
MEMCPY or DMA packets transferred over the communi-
cation links 9, e.g. the optical links 900. Each computational
device 3 and each memory aggregation device 2 may
include a plurality of the RX PIF modules 923, which
receive, e.g. 56-bit, words from the communication links 9,
e.g. the optical links 900, and translates them into data
transfers for up to 4 (or more) KByte page transfers, i.e. for
either read or write transactions. In essence, what flows in
the packets on an optical link 900 is as if one took a 64-bit
address/64-bit data memory bus and serialized it down the
single bit lane of an optical link 900. That is essentially what
the memory request packets look like that flow through the
RF PIF modules 923. The RX PIF modules 923 may also
manage error recovery if the FEC of the RX link layer 922
is unsuccessful. Inside each memory aggregation device 2,
the RX PIF modules 923 may connect to an AXI bus which
is connected to the two memory controllers 52 in each PHY
connector 51. Recall that there may be four PHY connectors
51 in each memory aggregation device 2 and sixteen optical
links 900 connected to each switch device 4. The eight
communication links 9, e.g. pairs of optical links 900, may
be divided between the 4 TX and RX PHY connectors 911
and 921 for simplicity. Accordingly, a first four communi-
cation links 9, e.g. optical links 900, may connect only to a
first DRAM controller 52 on a first RX PHY connector 921,
while a second four communication links 9, e.g. optical links
900, may connect only to a second PHY connector 921. This
means that a switch may not be needed inside each memory
aggregation device 2 to provide on-chip any to any connec-
tion, which is a huge simplification. Four communication
links 9, e.g. optical links 900, are slightly faster than the two
memory controllers 52 on one memory module 21 so
performance is not degraded by this simplification.

Recall that a 4M Byte work request 80 can generate 1024
4 KByte page requests on the communication link 9, e.g. the
optical links 900. The memory copy engine 75 may need to
know when all of the 4 MBytes have been read or written,
and may track this using the information in a JOIN field 100
of a memory protocol packet 101, as seen in FIG. 10. The
contents of the join field 100 in requests are generated from
the memory copy engine 75. When a READ DATA packet
or a WRITE ACKNOWLEDGMENT packet is received by
a communication link 9, e.g. a pair of optical links 900, the
information from the JOIN field 100 may be forwarded to
the memory copy engine 75 that launched it. Data may be
carried in the payload of either a READ DATA packet or a
WRITE REQUEST packet. The cyclic redundancy check
(CRC) may be any suitable format, e.g. from CRC-32 to
CRC-56 as different link error rate behaviors could get by
with smaller CRCs.

With reference to FIG. 11, when a destination/target
address is received by a memory aggregation device 2 in a
PIF packet 90, the destination/target address may be con-
verted to a full memory, e.g. DRAM, address 110 for the
memory controller 52 by dropping the interleaving fields, e.g. 96-99, out of the middle, see FIG. 9. To one skilled in the art, moving the physical location of the interleaving fields to any location in a destination or return address field makes no difference, as long as the physical interleaving occurs on the appropriate page boundary. In this specific case, that page boundary is set at 4 Kbytes.

With reference to FIG. 12, the memory copy engine 75, may connect to two busses within each VPU complex in each computational chip 3: the AXI bus 121 which gives the memory copy engine 75 direct access to the VPU SRAM 77 on that same AXI bus; and the APB peripheral bus 122 within the VPU complex. The VPU 71 reads and writes semaphore and other registers within the memory copy engine 75 over the APB bus 122.

With reference to FIG. 13, most of the information needed by the memory copy engine 75 comes in the form of work requests 80 which are read from the VPU SRAM 77.

When firmware in the VPU 71 wants to issue a work request 80 to the memory copy engine 75, the VPU 71 may first construct the work request structure in the command circular buffer in the VPU SRAM 77. Then the VPU 71 may simply increment a hardware semaphore in the APB interface 122 to the memory copy engine 75. If the memory copy engine 75 is idle or when it finishes a previous work request 80, the memory copy engine 75 may read the contents of the new work request 80 and load the new work request 80 into various internal working registers. As the memory copy engine 75 processes the new work request 80, the memory copy engine 75 may first translate the programmers view of the physical address to the optical link packet view. Next the memory copy engine 75 may break the work request 80 up into page boundary sized, e.g. 4K Byte, requests being careful to honor the necessary alignments. This means the first and last packets could be shorter than the page boundary, e.g. 4K Bytes. Then the memory copy engine 75 generates a plurality of packets and issues them to the NOC 74. Depending on the source of the data (WRITE request or READ request) the packets may travel to other on-chip destinations on the NOC 74, or they leave the computational device 3 through one of the TX lanes or the optical links 900. After each packet is emitted, the memory copy engine 75 increments the optical link addresses by the size of the previous packet and formats a new request. The memory copy engine 75 transmits the new request to the appropriate NOC target. For the 4 MB example from above, the memory copy engine 75 generates 3-word request packets as fast as it can and sends them over the NOC 74 to the appropriate one of the 128 optical link end points. The memory copy engine 75 can generate packets much faster than the on-chip SRAM 77 or external memory module 21, e.g. DRAM, can process the requests so the memory copy engine 75 can go idle waiting for completion. The memory copy engine 75 has a large bit vector which tracks completion of all outstanding optical link request packets. As join fields start coming in, the memory copy engine 75 resets the designated bit in the tracking bit vector. When they are all accounted for, the memory copy engine 75 sends an interrupt back to the VPU 71 and moves on to the next work request 80. There may be a plurality, e.g. 32, of VPUs 71 on a computational device 3 and each one has a memory copy engine 75. Even without VPU-VPU cooperation, there can be a never-ending flow of data to or from the optical links 900.

The memory copy engine 75 and the extremely high bandwidth of the optical links 900 enables tremendous lookup performance of embedding table rows. The memory copy engine 75 can process the offset (index) table directly and copy embedding table rows from random locations in the memory modules 21 (DRAM) into the on-chip Global Memory (GM) 72 in sequential order. Consider an embedding table lookup with 16K Entries in its offset table. The memory copy engine 75 of one VPU 71 can read a portion of that offset table by launching a single request packet 80 for each row in the embedding table offset array and reading its portion thereof. Consider the 32-bit embedding table offsets in FIG. 14. Each offset is an index into a very large embedding table. The memory copy engine 75 can provide a mode in which it follows the embedding table offset array and reads embedding data row by randomly addressed row into a sequential array in the GM 72. With reference to an operation where the embedding table rows are 128 FP32 values (512 bytes), In order to copy a 512-byte row from one of the memory modules 21 (DRAM), a 64-bit physical address is required. The memory copy engine 75, generates the physical address by reading a base address from the memcpy work request pointer 82 (FIG. 15), which is used as the base physical address for the embedding table itself. Each offset is added to the physical address to get the absolute address of the embedding table row, from some random location in the memory module 21 (DRAM). Then a 512 byte work request 80 is launched by the memory copy engine 75 to that location in the memory module 21 and set the target to the next sequential location in the GM 72. This can go on for as long as there is space in the GM 72 or the work request 80 requires it. Some lookups are only a few rows while many are very large and have to be spread across many or all of the computational devices 3. The most significant bit (MSB) of an offset entry can be used to select one of two base addresses to use for the lookup. As a result, some rows can be sourced from the GM 72 itself or the VPU SRAM 77, while most are sourced from the memory modules 21 (DRAM), which may be beneficial for a very skewed or power law distribution of indices.

With reference to FIG. 15, which illustrates the structure of a VPU work request 80 for performing embedding lookups. Many fields may be essentially the same as a simple work request 80, which has a different command that says it is looking up embedding table entries. That command makes more fields available. The length field 83 may indicate the size of the embedding table row to be looked up. The number of embedding table indices is shown in the first word of the VPU work request 80. The standard destination pointer 81 is used but it is incremented by the length 83 as each MEMCPY or DMA packet is transmitted to the NOC 74. The second pointer 82 (source) may point to the location of the embedding table indices (offsets) somewhere in unified memory. The third pointer (memory) 153 may point to the location of the embedding table in the memory module 21, e.g. DRAM, although it could be anywhere in unified memory. The fourth pointer (computational) 154 can be used to implement a software cache in the GM 72 or VPU SRAMs 77. When the MSB of the offset entry is zero, then the first pointer 81 is used as a base. When the MSB of the offset entry is one, then the second pointer 82 is used as the base. It should be obvious to one skilled in the art, that alternative methods for identifying software cached embedding table rows can be indicated by using a comparator on offset indices and reserving the first N offset index values as cached offsets. In this case, one artificially adjusts the DRAM embedding table pointer, 153, to account for the N reserved indices for embedding table rows that are cached. Other approaches are equally viable, including the use of other markers with an offset to indicate additional base address values that could be provided within the mempcy work request 80. Finally other ways to indicate the size of the indices might be included in the CMD field 84 or other fields within the memcpy work request 80. This would allow different data types for the indices themselves, e.g 8-bit, 16-bit, 32-bit or. 64-bit. "Very small embedding tables do not need 64-bit indices while extremely large embedding tables may require 64-bit indices".

With reference to FIG. 16, at a tier 1 position, i.e. within each memory rack unit 11, each switch device 4 connects to every computational devices 3 (8×), and to a fraction, e.g. one eighth (8×) of the aggregation devices 2. When there is a switch device 4 at the tier N position, where N>1, i.e. outside the memory rack units 11, all of the plurality, e.g. 384, of pairs of optical links 900 can be connected between the tier 1 memory devices 4 and the bridge devices 5 that enable all of the memory rack units 11 to connect to a standard data center LAN and SAN.

In the embodiment illustrated in FIG. 2, each switch device 4 connects to 8 memory aggregation devices 2. The 8 memory aggregation devices 2 occupy ½ of a DRAM board in the memory rack-unit 11. Accordingly, there can be 8 switch devices 4 and 8 half aggregation boards in a memory rack unit 11, i.e. 8 memory aggregation devices 2 per switch device 4. Accordingly, there may be 64 memory aggregation devices 2 and 8 switch devices 4 in one memory rack unit 11.

In multi-tier clusters of memory rack units 11, eight independent networks provide connectivity between eight Tier 1 switch devices 4 of every memory rack unit 11. Inside each memory rack unit 11, each computational device 3 is connected to every switch device 4 and each switch device 4 is connected to a specific memory aggregation device 2 board, i.e. 8 memory aggregation devices 2. To extend this connectivity beyond memory rack unit 11, it is sufficient for the switch devices 4 of the same tier to provide full band-width connectivity across multiple memory rack units 11.

FIG. 3 shows the Network plane-1 connecting all Tier 1 switch devices 4 through one-to-one connection to Tier 2 group-1 of switch devices 4. Each Tier 2 group comprises eight switch devices 4 connecting to every Tier 1 switch device 4 of the same rank in all memory rack units 11. Similarly, to extend Network plane-1 of 24 clusters of memory rack units 11 to three tiers, Tier 2 Group-1 of every cluster is connected through a Tier 3-Group 1 of switch devices 4. A total of 80 switch devices 4 in each T3-Group provide full connectivity and bandwidth support across 24 clusters of 10 memory rack units 11, for a total of 240 memory rack units 11.

Standalone two-tier clusters can have up to 23 memory rack units 11. The number of switch devices 4 in each Tier 2 group thereof depends on the number of memory rack units 11 they connect. To support full connectivity for each network, the switch devices 4 in one Tier 2 group should connect to all eight upstream photonic links 9 of each switch devices 4 of every memory rack unit 11 of their rank. Assuming that we have N memory rack units 11, the Tier 2 Group should support N*8 communication links 9. To provide bridge devices 5 access to every computation device 3 and memory aggregation device 2 in all memory rack units 11, one or more switch devices 4 connect the bridge devices 5 to every network by connecting them to one switch device 4 in every Tier 2 group of switch devices 4.

The rule of 16 states that all 16 pairs of optical links 900 emanating from one TX PHY 911 or received into an RX PHY 921 must come from exactly one other chip. One cannot connect eight pairs of optical links 900 from one PHY 911 or 921 to chip A and the other eight pairs to chip B. The rule of 16 is a hard restriction in the PHY receiver clock recovery. When all chips in the system are connected to their respective switch device 4, their individual optical links 900 must maintain a strict end-to-end order. For example, lane 0 from the TX optical link interface 901 at one end of the optical waveguide 903 always connects to lane 0 on the RX optical link interface 902 at the other end. Lane 1 connects to lane 1 and so on through lane 15. The rule of 16 applies to specific constraints with the SERDES 931/932 for the optical links 900. If one bases the links on a different SERDES protocol one might need to enforce a rule of only 8 or 4 or perhaps a rule of 32 might apply to some SERDES environments. In other embodiments, the rule of sixteen may not necessarily hold. For example, it may be possible to use smaller switch devices 4 that support less total bandwidth, provided that the switch radix remains large enough to support connectivity between various computational device 3, processors, various memory aggregation devices 2, and connectivity to other switch devices 4. For example, a switch device 4 supporting a total of 24×56 Gbps NRZ channels, or 1.34 Tbps of bandwidth (counted one way), can support the present embodiment described herein, provided that each channel can be directed to a different device.

FIG. 16 illustrates a top-level block diagram for an exemplary switch device 4 in which 24 pairs of TX PHY 911 and RX PHY 921 connect to other devices in the optical computer system 1. The switch device 4 provides any-to-any switching between any of the 24 devices connected to it. For example: the switch device 4 in tier 1 connects to: 8× computational devices 3; 8× memory aggregation devices 2; and up to 8× tier 2 switch devices 4 in a cluster of memory rack units 11. The switch device 4 in higher tiers, e.g. tier N (N>1), connects to: switch devices 4 in lower, e.g. N−1, tiers, or higher, e.g. N+1, tiers; and up to 16× bridge devices 5. In an exemplary memory rack unit 11, there are 8 switch devices 4 at tier 1 and one or more switch devices 4 at tier 2. The bridge device 5 can connect to the tier 2 switch devices 4.

The memory protocol packets 101 (FIG. 10) are trans-mitted serially over the photonic link 9. After, e.g. 7B/8B, encoding on the photonic link 9, only 56 bits (7 bytes) may remain of the usable data on each photonic link clock (1.75 GHz). Effectively, one 8-bit byte's worth of each 64-bit word at the SERDES 931 may be lost due to the line-encoding protocol; accordingly, a memory protocol packet 101 may arrive at the switch device 4 in 56-bit-wide words that the SERDES 932 is delivering or receiving, e.g. at 1.75 GHz. The 56-bit words are what are switched through the switch device 4. The packets are delivered to an egress port intact. That is, there is no preemption in the middle of the packet as it traverses the switch device 4 or leaves the egress port. Consequently, once the path is determined from ingress to egress, one packet flows in an uninterrupted fashion from ingress to egress. However, arbitration within the switch device 4 determines which packet gets the path to an egress port for the duration of one packet. Thus, the FSTART and FEND markers are passed through the TX PIF 913 and the RX PIF 923 and are used by the switch device 4 itself.

As described, each switch device 4 includes a plurality, e.g. 16, of switch planes. Each switch plane independently handles traffic from the plurality of, e.g. 25, ingress ports and routes that traffic to the plurality of, e.g. 25, egress ports. Each switch plane may contain a non-blocking switch fabric.

Ideally, the switch device 4 is configured to provide more connectivity than is necessary to provide the full any-to-any connectivity across all of the, e.g. 384, pairs of optical links 900. A switch-plane architecture as shown in FIG. 17, ensures that one photonic link 9, e.g. lane #0, of every computational device 3, memory aggregation device 2, and "other" devices, e.g. bridge device 5, is connected to a single (first) switch-plane, shown as Switch #0. Similarly, one photonic link 9 from each of the 24 devices connects to a second (and each of the other) switch-plane that would be labeled Switch #1. Finally, one photonic link 9, e.g. lane #15, from each of the 24 devices connects to the switch-plane labeled Switch #15. Preferably, no connection exists between any pair of switch-planes. The switch-plane architecture reduces a huge, e.g. 384×384, any-to-any switching problem to sixteen 24×24 switching problems. FIG. 17 illustrates switch-plane #7 in detail as a specific example, but the other 15 switch-planes look effectively the same, i.e. each of the computational devices 3 and each of the memory aggregation devices 2 supplies one of its 16 optical links 900 to switch-plane #7. Another optical link 900 may extend to each switch plane from a bridge device 5 directly or via a higher tier switch device 4.

One switch-plane is reduced to 24+1 ingress ports, each 56 bits wide, and 24+1 egress ports, also 56 bits wide. The packets that come in from an optical link 900 may be passed through the associated switch-plane and out of the subsequent egress port of the RX PIF 923 completely unchanged. Even the CRC32 of each packet may be unmodified as it passes through the switch device 4. At the working clock rates, the interface from the TX PIF 913 and RX PIF 923 in passthrough mode may be 224 bits wide, encompassing four of the 56-bit-wide data blocks.

Each switch plane from each switch device 4 may include an extra ingress port and an extra egress port, resulting in a total of 25 ingress ports and 25 egress ports. The 25th ports, i.e. the redundant ports, are not connected to the TX PHY 911 or the RX PHY 921 of the optical links 900. Instead, the extra ports provide for very limited switch-plan to-switch-plane redundant routing paths. These redundant ports are not intended for performance estimation and planning. They are there to provide alternate paths in the face of failing optical links 900. If during system test, it is discovered that two optical links 900 are failing in a multitier cluster or system such that some memory modules 21 is unreachable, then traffic can bypass the failing path. The interconnection scheme to the switch-planes is highly restricted. The redundant ingress port for switch-plane N is connected solely to the redundant egress port on switch-plane (N-1). Thus, traffic from a failing ingress port on switch-plane 7 can be routed to switch-plane 8 in this switch device 4 and then back to its normal path in the switch device 4 one tier above.

When a memory or work request packet 80 arrives at a switch device 4 from a photonic link 9, it contains two addresses: a destination address; and a return or source address. These addresses are unified memory addresses covering all of the optical computer system 1, e.g. up to 8192 memory rack units 11. The addresses can also be endpoint addresses, which allow access to VPU local SRAM 77 and peripherals or to components in the computational devices 3, e.g. scratch SRAM, computational-level peripherals, and the GEMM 76 itself.

When a packet arrives at an ingress port of the switch device 4, the switch device 4 needs to determine the egress port to which the message should be sent. Each ingress port uses simple logic (comparison) and three lookup tables to determine the egress port based on the destination address of the packet. The resulting value is integrated into either a switch header word on the front of the memory packet or a side channel on the flow. The switch header can contain other info, but basically it is a number between 0 and 24, inclusively, that tells the switch device 4 how to route the memory packet.

There is a common 13-bit box identification field 91 (FIG. 9) in any address that flows across a photonic link 9. It is the first thing examined by the switch device 4 to determine whether the packet is addressed to the memory rack unit 11 containing this switch device 4 or not. If not, the switch device 4 finds an egress port and sends the packet on to another switch device 4, e.g. in a higher tier, in the optical computer system 1. The switch device 4 is configured for looking up the BOX ID identification field 91 in its routing SRAM and prepending or attaching a switch header word on the front of the packet. The switch header can contain other info but basically it is a number between 0 and 24, inclusive that tells the switch device 4 how to route the packet.

The bridge devices 5 do not need to be associated with a specific memory rack unit 11 and its BOX ID identification field 91. A unique BOX ID identification field 91 may be assigned to each switch device 4 and use a CHIP ID to address all the bridge devices 5 connected to the same switch device 4. For non-endpoint switch devices 4 (Tier N switch devices 4, N>1), a BOX ID identification field 91 may be assigned that never matches any system address, such as a sequence of 1s. This way the switch device 4 uses BOX ID identification field 91 to route the packet to the correct port based on the destination BOX ID identification field 91.

When there is a BOX ID identification field 91 match for switch device 4 connected to end-points, i.e. Tier 1 switch device 4 or Tier 2 switch device 4, then the address points to something inside the memory rack unit 11 or a connected bridge device 5 and all such destinations or sources are reachable over this switch device 4.

For intra-memory rack unit and intra-cluster packets, often more than one path is available. For example: Tier 1 switch device 4 can go through any of the 8 Tier 2 switches device 4 in the Tier 2-Group and Tier 2 switch devices 4 can go through any of the 10 connected switch devices 4 in Tier 3-Group. To simplify the routing, a fixed routing approach may be implemented whereby each ingress port uses a specific egress port to send data upstream (out of the cluster). For example, packets received from a computational device 3 or a memory aggregation device 2 only take a first upstream egress port to send data upstream. This may be handled within the table lookup mechanisms, which are unique to each ingress port. Recall that packets are only routed up if their BOX ID identification field 91 mismatches the tier 1 box id number.

Connectivity among bridge devices 5 may not be required. Bridge devices 5 that connect to the same tier of switch devices 4 are connected and can route using existing routing mechanisms, but different tiers of switch devices 4 may be connected and can route using existing routing mechanisms, but different switch devices 4 in the same cluster have limited connectivity. If all to all connectivity is desired, the cluster's switch devices 4 may be connected with point-to-point photonic links 9 as they are currently overprovisioned and have unused ports. As each switch device 4 has a unique BOX ID identification field 91, the existing routing can support routing intra/inter cluster bridge device 5 to bridge device 5 packets.

If the packet is addressed to a particular memory rack unit 11, the MSB of the destination address is examined by the switch device 4, e.g. bit [63]. If the MSB is a one, then the request is for a memory (DRAM) transaction. All memory (DRAM) transactions are mediated by the memory aggregation devices 2. So, in this case the request has to pass to an egress port connected to a memory aggregation device 2 from this switch device 4. As shown in FIG. 9, a memory address contains a memory aggregation device select field 97. These 3 bits are the only thing this tier 1 switch device 4 has to consider in making an egress port selection, that is, when the BOX ID identification field 91 match and the MSB=1. For redundancy reasons, the memory aggregation 2 lookup table address concatenates the 3-bit switch device select field 96 and the 3-bit memory aggregation select field 97. The lookup result provides the egress port to the memory aggregation 2 and may also specify that the memory aggregation select field 97 is over written. By the time a packet arrives at a switch device 4, a computational device 3 or a bridge device 5 has already determined to which tier 1 switch device 4 it goes upon leaving.

When software wants to use a load or store instruction to modify a single word somewhere out in the unified memory (DRAM) space, it uses exactly the same representation that it would use to format a work request 80.

All throughout the software running on the optical computer system 1, the memory module (DRAM) addresses are viewed such that the memory modules 21 (DRAM) in all memory rack units 11 roll sequentially/contiguously throughout. Since the memory modules 21, e.g. DIMMs, come in various capacities, for example, 16 GB/DIMM, 64 GB/DIMM, or 256 GB/DIMM, then the BOX ID identification field 91 has to shift upward when a memory module (DRAM) address in a work request 80 is converted to a photonic link PIF packet address 90. In every case, the memory module (DRAM) addresses in a photonic link PIF packet 90 always have the BOX ID identification field 91 bits in the most significant bits of the address.

A tier 1 switch device 4 uses the three switch device SELECT bits 96, the three memory aggregation SELECT bits 97, and the two memory module (DIMM) select bits 98 in the PIF packet address 92 to pick an egress port to reach the desired memory aggregation device 2. Once the address is confirmed to be to one of the memory modules 21 (DRAM), then these bits may look up an egress port number in the memory aggregation lookup table, which in an exemplary embodiment is a 256-word-by-8-bit register file that is programmed at configuration time. Some of the bits are used in an operation that substitutes a redundant memory unit 21 (DIMM) and/or memory aggregation device 2 for a failing one. If a redundant memory module 21 (DIMM) is to be selected (lookup [7]) then a replacement memory aggregation select bit field 97 is substituted into the outbound packet.

The mapping of programmer viewed addresses to PIF packet formats may be performed by either initiators of the bridge device 5 or initiators of the computational device 3. Accordingly, by the time a packet reaches any switch device 4 it may already have been converted to the PIF packet format.

In an exemplary embodiment, after matching the BOX ID identification field 91, if the MSB of the destination address is a zero, then the packet is destined either for a computation device 3 attached to the Tier 1 switch device 4, or a bridge device 5 chip connected to an upper tire switch device 4. In either case, the switch device 4 looks at the CHIP ID field 181 to determine which egress ports need to be utilized to forward this packet off of the current switch device 4. See the six potential non-DRAM address formats in FIG. 18, all have their CHIP ID field 181 in the same bits.

Accordingly, the switch device 4 does not have to consider the address bits [39:0] in making this decision. At this point, the BOX ID identification fields 91 have been matched, so the switch device 4 can be configured to look up the 10-bit CHIP ID 181 from bits [49:40] in the chip routing table. This mechanism allows the switch device 4 to pass bridge device addresses out the appropriate upward-facing egress ports.

In order to route a packet through tier 1 switch devices 4, each ingress port may contain a routing table RAM that is indexed by one of the following: the switch device select field [2:0] 96, the memory aggregation select field [2:0] 97 and the memory module (DIMM) select field [1:0] field 98 for DRAM addresses; the CHIP ID [9:0] field 181 for endpoint addresses; and the BOX ID [12:0] identification field 91, if it is not for this memory rack unit 11. The table may contain, among other things, the egress port number to switch to; a selected memory aggregation redundancy mode; and which redundant memory module 21 (DIMM) to select. The "endpoint" address subfield 182 may be used on either a computation device 3 or a bridge device 5 once the packet has been delivered to that device.

In some exemplary embodiments, there may be exactly 25 egress ports from which to select a route off of a switch device 4. Thus the routing tables at an ingress port need to produce a 5-bit value that selects the egress port. So for box routing, an SRAM of 5 bits by 8192 words is needed or one of 20 bit by 2048 word SRAM. The CHIP ID lookup can be performed in parallel with a separate 5-bit×1024 or 20-bit× 256 SRAM or register file.

Similarly, when a packet arrives at an upper tier switch device 4 with a matching BOX ID 91, CHIP ID 181 lookup will provide the correct port that routes the message to the target bridge device 5.

Finally, selections of memory aggregation devices 2 can be performed in parallel by a, e.g. 8-bit-by-256-word, register file. Two of the 8-bit word addresses may come from the memory module (DIMM) select field 98 in a DRAM address 80, three may come from the memory aggregation device select field 97, and three more may come from the switch device select field 96. The decode rules enable a single memory module 21 (DIMM) to be replaced by a redundant memory aggregation device 2 and memory module 21 (DIMM) connected to this switch device 4. Five of the read data bits may select the egress port. Finally, the eighth bit may select the use of the redundant memory aggregation device 2.

In this exemplary embodiment, the remaining two bits may replace the memory module (DIMM) select field 98 in the memory module (DRAM) address forwarded to the egress port. When redundancy is selected, the memory aggregation device select field 97 is set to a redundancy setting, e.g. 3'b110. It is expected that the redundant memory aggregation device 2 will be connected to the bypass port on the memory aggregation device, e.g. number 7, on this switch device 4. That way, the memory aggregation device 2, e.g. number 7, can select the bypass port since its memory aggregation device target will be set to 7, but it will see a memory module (DRAM) address with something other than its target address.

Note that when an upper tier switch device 4 receives a packet destined to a memory module (DRAM) address, it needs to be routed to the appropriate network plane where it reaches the correct switch device 4 in the destination memory rack unit 11. This may be done similar to memory aggregation device selection at Tier 1, by using the switch device select field 96, the memory aggregation select field 97 and the memory module (DIMM) select field 98 to lookup the routing table.

With reference to FIG. 19, the chips with the switch devices 4 in the computer system 1 tend to be perimeter or "shoreline" limited, which means a switch chip cannot get any smaller than a certain perimeter because of features that are at the edge of the switch chip or must be placed near the edges of the switch chip. This contrasts with a chip that is core limited, i.e. one that has so much interior logic and memory that the size of the chip is no longer determined by the size of features that must be placed at the shoreline. For example, a switch device 4 by its nature has a lot of connections to other chips. Each one of those connections must go to a switch or switch plane which is an any-to-any connection from ingress ports to egress ports. For very large numbers of discrete channel connections, these tend to be serial connections. To support these serial connections, a serializer/deserializer (SERDES) block 931/932 is connected to a physical interface block (PHY) 911/921. Each SERDES/PHY pair is typically placed at the edge or second or third ranked from an edge of the chip. Since the SERDES/PHY pairs tend to be very large features in a chip, and since they must be placed at or near the edge of the chip, then the area of these pairs defines the length of the shoreline of the chip. Also, for a typical switch device 4, any ingress port, e.g. RX PHY 921, must be able to send a packet to any egress port, e.g. TX PHY 911.

The number of cross connections grows as the product of the number of ingress and egress ports 921/911. Consider a switch chip for a switching device 4 with 384 ingress ports and 384 egress ports this requires 384*384=147,456 cross connections. This is referred to as a radix 384 switch. With the memory copy architecture of the computation devices 3 and the memory aggregation devices 2 and the 64-bit unified address space, the switching device 4 can be split into, e.g. 16, switch planes, i.e. using the rule of, e.g. 16, PHYs. Each switch plan only requires a radix 24 switch to implement all required connections. Accordingly, the, e.g. 147,456, cross connection requirement drops, e.g. to 576 cross connections, in each switch plane and, e.g. a total of 9,216 cross connections for all 16 switch planes. The wiring complexity is proportional to the square of the radix.

Since each ingress port, e.g. RX PHY 921, only needs to connect to exactly 23 other egress ports, e.g. TX PHY 911, it is practical to just bus the ingress port data in one long source clocked data bus that runs around the periphery of the switch chip, whereby no paths cross through the middle of the switch chip. Accordingly, a big "donut" of routing is provided around the shoreline of each switch chip with a big hole in the middle thereof, i.e. white space. For a conventional any to any cross bar or NOC implementation, a lot of wiring in the 147,456 cross connections would have to cross through the middle of the chip eating up that white space.

For a typical chip for a switch device 4, with switch planes instead of a massive any-to-any cross bar the total area of SERDES/PHY pairs is larger than the area of the switch or switch plane logic and on-chip memory, thus these chips tend to have very empty centers. This empty space, sometimes called "white space", is unused in a switch, but the area it consumes must still be purchased as part of a wafer. For the most part this is just wasted space.

In contrast, chips for the computational devices 3 tend to be core limited since they have a very large logic and on-chip memory content and comparatively little interconnect requirement. Also, a stand-alone chip for a computational device 3 would typically connect to some kind of stand-alone switch chip for a switch device 4. One can see that there are significant advantages to combining these two chips into one combination chip 191, a switch device chip 4 plus a computational device chip 3, whereby the incoming and outgoing data is bussed in one source clocked data bus that runs around a periphery of each combination chip 191, whereby no paths cross through the middle of the combination chip 191.

This is true whether one is building switch+compute combination chips 191 or switch+compute combination chiplets, and the switch plane architecture of the switch device 4 makes the combination possible.

Combining the functions of the switch device 4 and the computational device 3 into one combination chip 191 provides extreme performance possibilities since every switch node in the system is also a compute node, whether it has chips/chiplets for memory aggregation devices 2 directly attached or not. In a lot of distributed computation systems, especially ones targeted at machine-learning-training applications, the data needed for the next processing step might be resident in the on-chip memory (SRAM or other) in a compute element (chip/chiplet). Thus, it is very likely that some of the input data will be coming from some place other than the memory aggregation devices 2. In this scenario, combining computational device 3 into a switch device 4 chip/chiplet is an extremely powerful architectural choice. The data flow graph for computation can be freely distributed across the network of switch+compute combination chips. When a processing sequence starts for a given model layer operation, its input data is simply copied across the network from the switch+compute combination chip 191 on which it resides. For most of these operations, data does not need to be written to memory aggregation chips 2, e.g. memory module 21 (DRAM) chips. Therefore, it doesn't have to be copied from a smaller number of high-density memory chips for the aggregation devices 2.

In addition, operators that require massive sharing of data from a single layer, e.g. all-gather, soft-max, batch-norm, all require the sharing of data that has just been created across all or most of the computing nodes. Having the computational device 3 directly connected to the first level of the switching device 4 allows the data to be sent in a very parallel form around the computational network of the computational device 3.

The high-density memory aggregation chips 2 provide storage for massive training data tables, embedding tables and other less frequently accessed but extremely large data sets. Having computation buried within the network itself, i.e. inside the very switch chips of the switching device 4 themselves means that model layer processing is literally free to move about the network of switch+compute combination chips 191.

The arguments above were made in favor of reclaiming unused area inside of a switch chip of the switching device 4, however, combining computation and network switching in the same node (or chip) is so powerful that one could readily choose to make such a chip even larger than the shoreline limitation outlined for switch chips above. That is to say, one may make switch+compute combination chips 191 that are intentionally larger than switch chips alone because of the network performance advantages of doing so. Even this combination is only realistic in an integrated switch+compute combination chip 191.

High bandwidth and high speed, e.g. AI, computer systems 1 are unique not because factors, such as optimizing performance/watt and optimizing performance/$ are important, but because the above factors have a direct impact on the overall performance of the computer system. The first key optimization in reducing system power consumption, i.e. performance/watt, is to reduce the quantity and energy consumption of electrical digital signal processors (DSPs) and re-timer integrated circuits in the electrical-optical-electrical (E-O-E) links.

There are several factors that must be optimized against one another for performance/$, such as: a) labor and materials for optical packaging, e.g. glass arrays of optical fibers, time it takes for a manufacturing technician to assemble the parts, yield; b) labor and materials for electrical packaging, e.g. electrical sockets, substrates, heat sinks, flip-chip assembly, yield, and so on; c) the fiber plant within the AI compute system 1, e.g. optical fiber connectors, quantity and type of optical fibers, maintenance costs for service; d) the silicon ICs, e.g. photonic IC, analog & mixed-signal ICs, re-timer/DSP chip; and e) the laser sources.

Accordingly, objects of the present disclosure relate to: i) reducing the overall form-factor to enable the physical placement of the electro-optical devices near the core digital IC; ii) reducing the required laser power consumption by improving receiver sensitivity or by improving the transmitter efficiency; and iii) operating the modulator and/or receiver as NRZ devices to utilize more power-efficient electro-optic nonlinear devices, because high-order modulation traditionally requires more power-hungry modulator-drivers and TIAs.

With reference to FIG. 20, each device 200 in the computer system 1, e.g. the memory aggregation device 2, the computational device 3, the switch device 4 and the bridge device 5, includes an application specific integrated circuit (ASIC) 201, which has some radio frequency (RF) input/output (I/O) density in terms of bandwidth/perimeter around the device 200 and bandwidth/area on the device 200. Each device 200 in the computer system 1 has a plurality of very high-performance communication links 9 extending therefrom, each communication link 9 may comprise a pair of optical links 900, each optical link 900 comprising one transmitter (TX) optical link interface 901, one receiver (RX) optical link interface 902, and an optical waveguide 903, e.g. 56 GB/s optical fibers, or integrated waveguide, therebetween, as discussed herein with reference to FIG. 4A. Each optical link 9 may include one or more transceivers 202 mounted on or extending from one or more sides of each device 200. The transceiver 202 has a different density of RF I/O by the same metrics. Each transceiver 202 is electrically connected to the ASIC 201 via a plurality of electrical traces leads 203 extending therebetween, and each transceiver 202 is connected to other transceivers 202 by the optical waveguides 903, as hereinbefore described. The requirements on the transceiver's bandwidth density are bounded by (1) pitch-matching the ASIC 201; (2) by trading off the RF channel induced by a fanout of the electrical trace leads 203 to a less-dense bandwidth/shoreline at the edge of the device; (3) the opposite of the previous point, for a trade-off of the RF channel induced by fanning-in to a higher-density bandwidth/shoreline transceiver 202; and (4) the required optical fanout on the opposite side of the transceiver 202, which necessitates a larger RF fanout of electrical trace leads 203 from ASIC 201 to transceiver 202 in order to pack the transceivers 202 close to the ASIC 201.

Significant design-effort is required to optimize each of these shoreline densities and trade-off against the channel compensation capabilities of the transmitter and receiver implemented on the ASIC 201. If the RF I/O shoreline density or the optical shoreline density of the transceivers 202 is too low, then the required RF fanout from ASIC 201 to the transceivers 202 may result in a sensitivity reduction, eventually preventing use of the transceivers 202 altogether.

Increasing the baud rate or utilizing advanced packaging can increase the RF I/O shoreline density. Utilizing multiplexing, such as along wavelengths and polarizations, can reduce the fiber shoreline density at the cost of increased laser power. Increasing the power handling of a single optical link 9 can increase the fiber shoreline density by reducing the number of laser input fibers at the cost of potentially less efficient lasers. Outlined below are various examples that aid in the design of a co-packaged computer system 1 with high shoreline densities.

For computer systems 1 where the quantity of electrical I/O connections is not limited by the quantity of available wires, using Non-Return-to-Zero (NRZ) signaling is significantly more power efficient than multi-level signaling such as a 4-level pulse amplitude modulation (PAM4) for optical systems. Optical NRZ signaling can be more efficient than PAM4 signaling because it relaxes the noise and distortion requirements on electrical amplifiers in the E-O-E path. Further, without consideration for the 2× reduction of bandwidth/optical fiber, there is an intrinsic approximately $10*\log 10(3)=\sim 4.8$ dB improvement in receiver sensitivity. For the same amount of total bandwidth (2 NRZ channels for every PAM4 channel at the same baud rate), this can result in a 1.8 dB reduction in the required laser power consumption, all other properties of the link being equal. In practice, there are additional impairments for PAM4 that result in a higher sensitivity benefit by using NRZ signaling.

FIGS. 21A to 21D illustrate examples of several configurations in descending order of power consumption for a typical optical/electrical link, e.g. at 112 Gbps PAM4. Each example includes the ASIC 201 and the transceiver 202 mounted on a common substrate 211 via a ball grid array (BGA) 212 and/or a pluggable mount or a socket mount. A long range (LR) or short range (XSR) SERDES 213 may be provided between the ASIC 201 and the transceiver 202. In example devices 200*a* and 200*b*, the transceiver 202 is mounted on the common substrate 211 via a pluggable connector 214 or a socket connector 216, respectively, requiring a retimer device 217. Accordingly, it is possible to achieve a 50% reduction in energy/bit by transitioning from a pluggable form factor, i.e. an example device 200*a*, to co-packaged optics in example devices 200*c* and 200*d*. However, there are a few physical limitations to enable co-packaged optics, including: 1) transmit and receive channel-channel pitch; 2) transmit and receive die-area/channel; 3) electrical I/O shoreline and required packaging technology; 4) optical fiber shoreline; 5) laser input distribution and power handling limitations; 6) power dissipation density—thermal and required electrical I/O; and 7) yield management for large quantities of optical I/O.

Figures 22A, 22B:
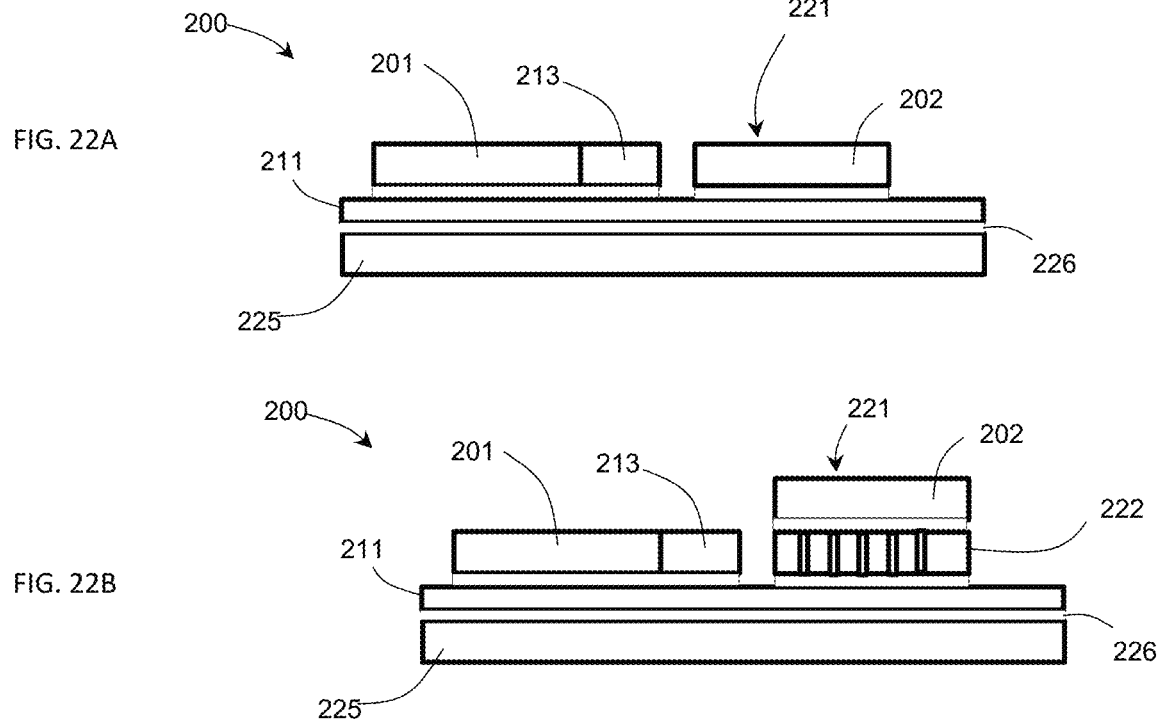
Figure 22C:
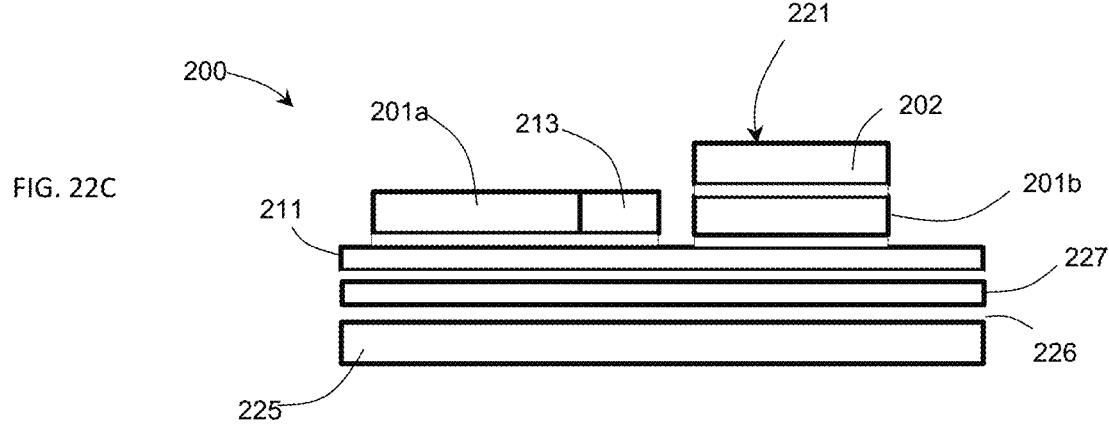

With reference to FIGS. 22A to 22I, there are many permutations of integration possible for the ASIC 201 with the transceiver 202 composed of one or more photonic integrated circuits (PIC) 221 including the transceiver 202 and other optics, and possibly one or more electrical integrated circuits 222. Each PIC 221 on each device 200 may be identical or different. In FIG. 22A, the PIC 221, and the ASIC 201 are flip-chip bonded onto an upper surface of the common substrate 211 and then mounted on an upper surface of a printed circuit board 225, e.g. via a BGA 226. In FIG. 22B, the PIC 221 is part of a die stack on top of an electrical integrated circuit 222 on the common substrate 211 with the ASIC 201. With reference to FIG. 22C, the ASIC 201 comprises a plurality of chiplets, e.g. chiplets 201*a* and 201*b*, with the PIC 221 integrated on top of one or more of the chiplets, e.g. chiplet 201*b*. The chiplets 201*a* and 201*b* are mounted on the common substrate 211 directly or via advanced packaging 227, all of which can be mounted on the PCB 225, e.g. via the BGA 226.

Figure 22D:
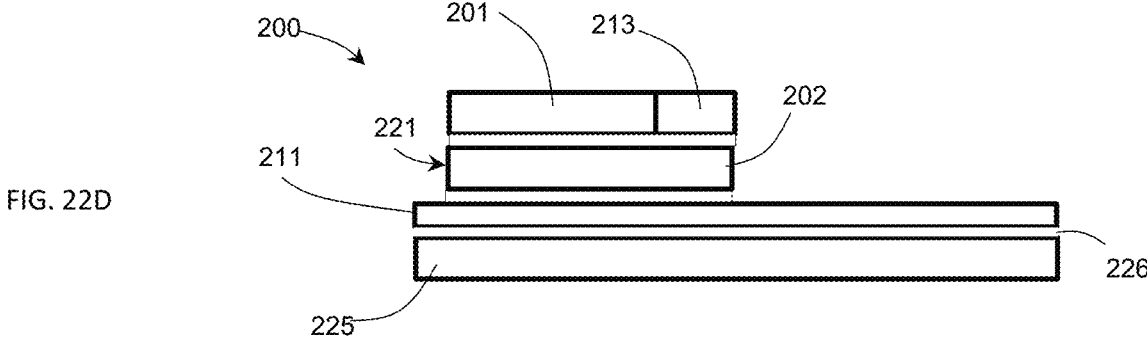
Figure 22E:
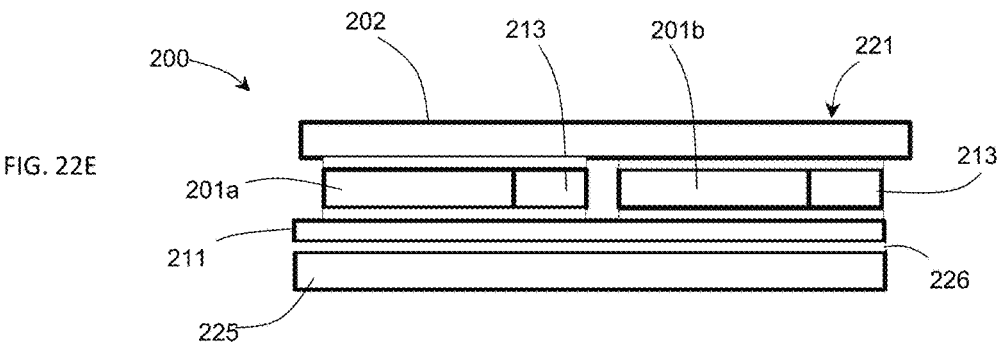

In the example of FIG. 22D, the PIC 221 acts as interposer for the ASIC 201 and transceiver 202 with the ASIC 201 mounted on top of the PIC 221, which is mounted on the common substrate 211 and/or the PCB 225. With reference to FIG. 22E, the PIC 221 acts as an interposer for a plurality of ASIC chiplets, e.g. 201a and 201b, wherein the PIC 221 is configured to extend across the plurality of ASIC chiplets 201a and 201b, which are all mounted on the common substrate 211 and/or the PCB 225.

Figure 22F:
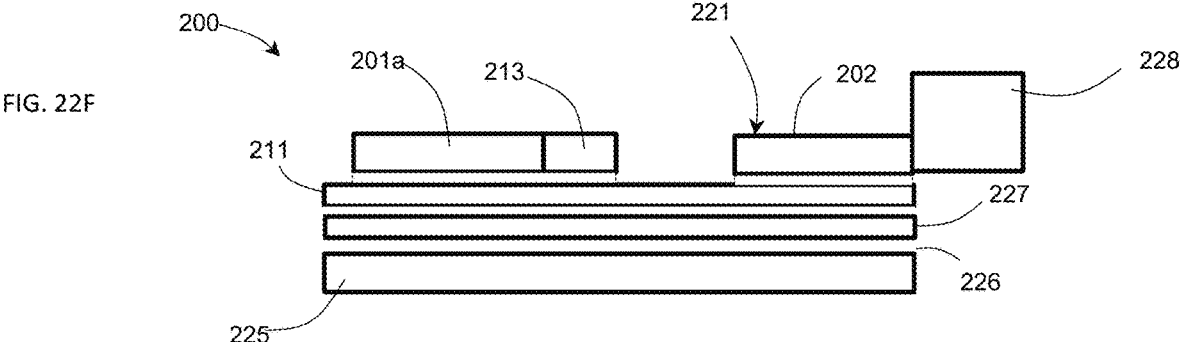

For the example disclosed in FIG. 22F, an external photonic integrated circuit 228, e.g. including a multiplexer/demultiplexer, is coupled to the PIC 221 directly. The external photonic integrated circuit 228 could be applied to any one of the aforementioned proposed die stack solutions of FIGS. 22A to 22E.

Figures 22G, 22H, 22I:
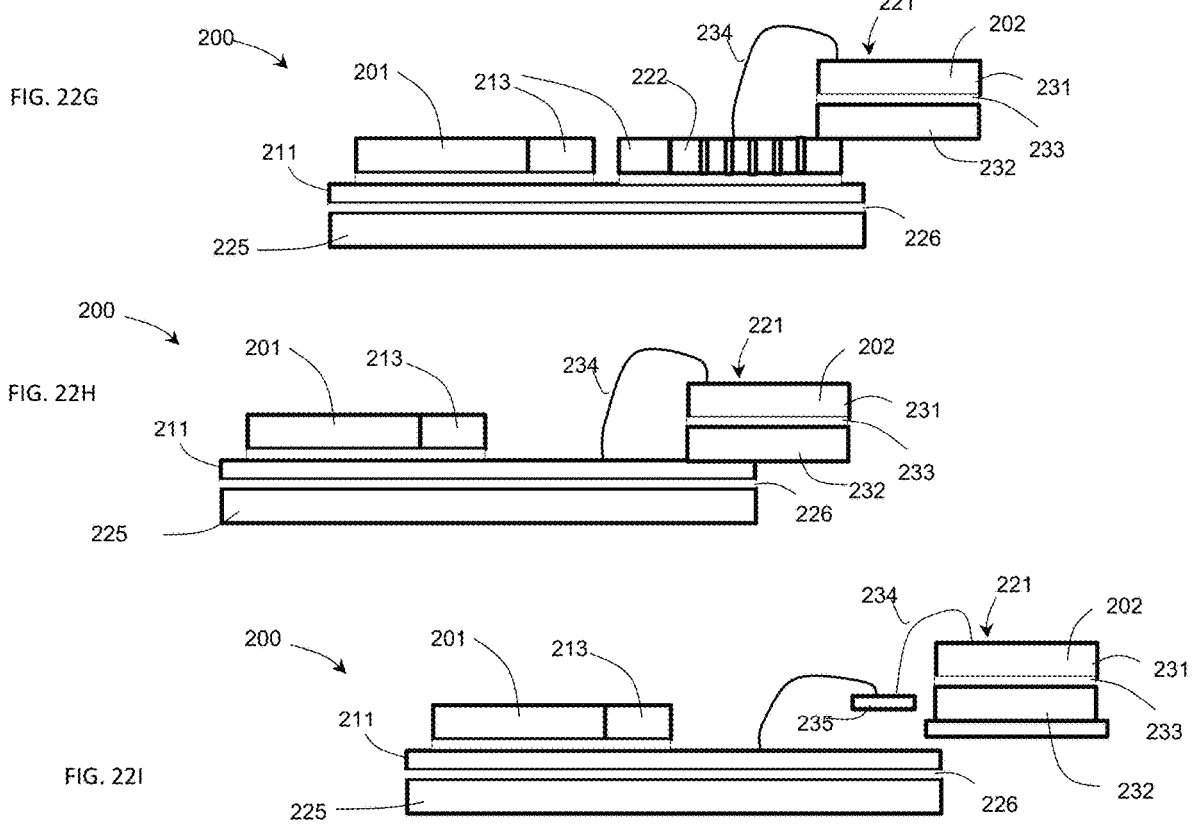

With reference to FIG. 22G, in accordance with any of the aforementioned die stack solutions, the PIC 221 may be a thin film lithium niobate chip (TFLN), comprising TFLN waveguide layer 231 mounted on an upper surface of a substrate 232, e.g. silicon or quartz, with an oxide layer 233 therebetween. The TFLN chip may be mounted on and wirebonded with wires 234 to the EIC 222, which is mounted on the common substrate 211 along with the ASIC 201. Alternatively, as illustrated in FIG. 22H, the PIC 221 could be the thin film lithium niobate chip (TFLN) wire-bonded directly to the common substrate 211 hosting the ASIC 201. FIG. 22I illustrates an alternative example in which the PIC 221 is the thin film lithium niobate chip (TFLN) separately packaged with an electrical interface to the common substrate 211 of the ASIC 201. In the example, a flex-PCB 235 and wirebonds 234 are used to connect the ASIC 201 on the common substrate 211 to the PIC 221, but other interfaces are possible.

With reference to FIG. 23, the optical/electrical interface between ASICs 201 on different devices 200 via the optical waveguide 903 includes the TX optical link interface 901, and the RX optical link interface 902, as defined above, which may include a serializer 931 and a deserializer 932, respectively. Each communication link 9 may comprise a pair of optical links 900, each optical link 900 comprising one transmitter (TX) optical link interface 901, one receiver (RX) optical link interface 902, although only the TX optical link interface 901 is illustrated in FIG. 23. Each communication links 9 may be bidirectional, as discussed hereinafter.

Each communication link 9 also includes the transceiver 202 including an TX electrical interface 203a configured for communicating with the TX optical link interface 901 and/or an RX electrical interface 203b configured for communication with the RX optical link interface 902. The transceiver 202 also includes an TX optical interface 204a configured for optical coupling to the optical waveguide 903, and/or a RX optical interface 204b configured for optical coupling to the optical waveguide 903. A transmitter portion of the transceiver 202 includes an optical transmitter 250, e.g. a CW laser, configured for generating an input optical signal, and an optical modulator configured for converting the input optical signal into a modulated output optical data signal based on a modulated RF electrical data signal. A receiver portion of a transceiver 202 includes photodetectors for converting the modulated output optical data signal into an input electrical data signal.

As described above, the ASIC 201 and the transceiver 202, e.g. the optical transmitter 250 and the receiver electrical interface can be: flip-chip bonded onto the common substrate 211 (FIG. 22A); a die stack utilizing throughsilicon-vias on the ASIC 201 on the common substrate 211 (FIG. 22B); a wirebond assembly on a substrate 211 (FIG. 22G-22I); or any of the above where the substrate 211 is socketed onto another electrical interface, such as another substrate or a printed circuit board 225.

The common substrate 211 may be an organic multi-layer build-up; a low-temperature co-fired ceramic; a high-temperature co-fired ceramic; or a silicon interposer. One or more of the ASIC 201 and/or the transceiver 202, e.g. the transmitter or the receiver, may be used as an interposer as part of a die stack. The optical interfaces 204a and 204b may include: one or more arrays of V-grooves in silicon with individual optical fibers, ribbonized optical fibers, or a rigid array of optical fibers.

The optical waveguides 903, e.g. optical fibers, may be a combination of standard single-mode, polarization-maintaining, and multi-core with cladding diameters that could be any of approximately 80 μm, 125 μm, or 250 μm; another planar lightwave circuit in glass, silicon nitride, SOI, or III-V; a 3-dimensional glass waveguide butt-coupled or adiabatically coupled to the transceiver 202; and a lens array.

The optical transmitter 250 can be: one or more lasers emitting in the optical wavelengths from approximately 1200 nm to 1600 nm; one or more lasers, whose output frequencies or wavelengths are on an approximate periodic grid, such as 100 GHz, 200 GHz, 400 GHz, 20 nm, or another spacing; one or more lasers, each optionally coupled through an optical isolator, and whose collective outputs are coupled into one or more single-mode or polarization-maintaining fibers; or one or more lasers coupled into one or more optical amplifiers followed by a beam splitter into two or more single-mode or polarization-maintaining fibers, as described below.

Figure 24:
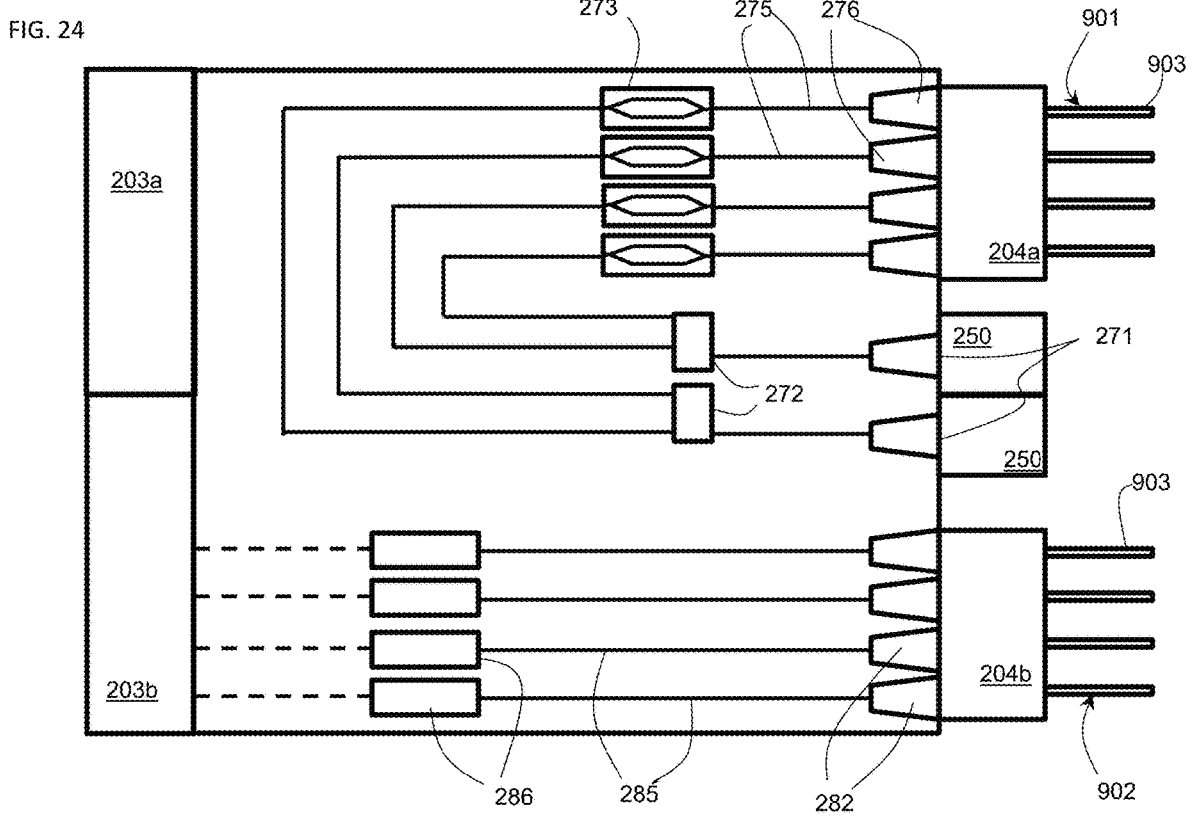

With reference to FIG. 24, the transceiver 202 may comprise a multi-channel transceiver including: i) one or more laser input couplers 271 configured for coupling to the one or more optical transmitters 250, along with one or more optical splitter devices 272 to divide the input light from the corresponding optical transmitter 250 between multiple modulator channels; ii) multiple parallel modulators 273, such as ring modulators, Mach-Zehnder modulators, Fabry-Perot modulators, electro-absorption modulators, coupling modulators, Michelson modulators; as well as one or more of the aforementioned modulators arranged into an IQ modulator or used themselves as individual optical phase and intensity modulators; the various modulated optical output signals from the modulators 273 are transmitted onto the output waveguides 275, as described herein below; and iv) one or more output couplers 276 to interface with the optical waveguides 903 via the TX optical interfaces 204a.

Figure 25A:
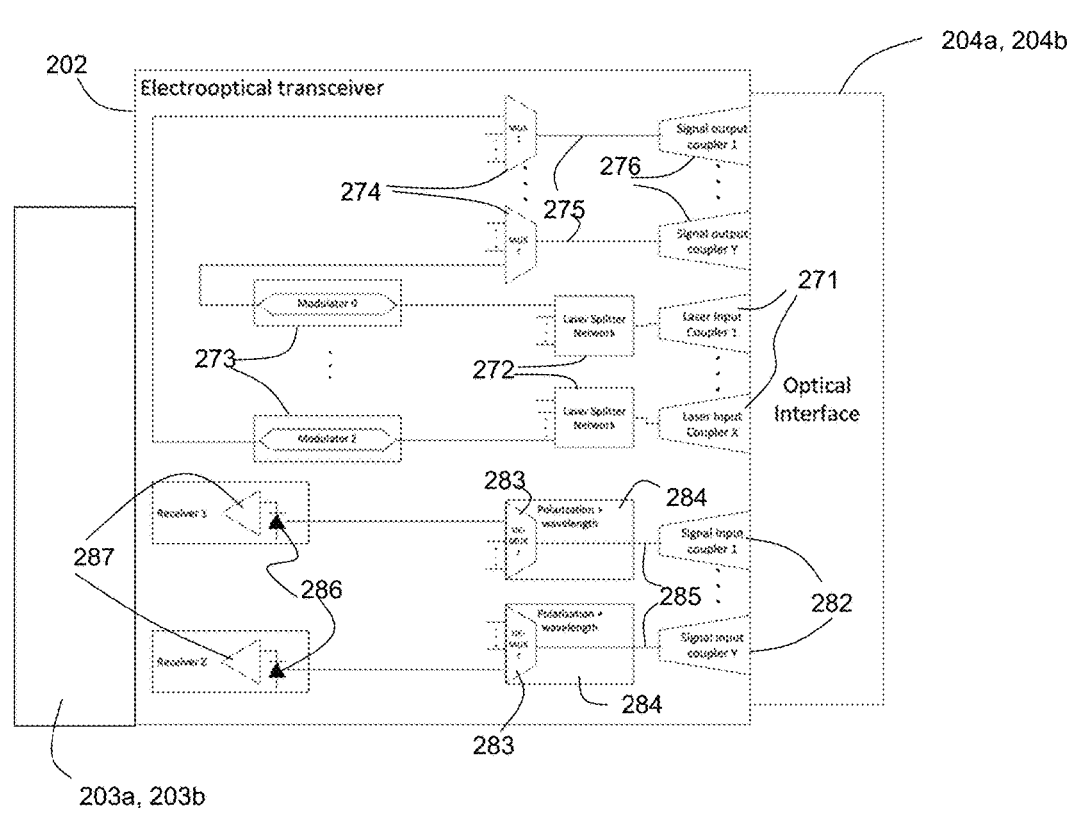

With reference to FIG. 25A, one or more optical multiplexers 274 may be provided to combine the various modulated optical output signals from the modulators 273 onto a fewer total number of the output waveguides 275, as described herein below; which are coupled to the one or more output couplers 276 to interface the optical waveguides 903 via the TX optical interfaces 204a. In some embodiments there are 1 or 2 optical transmitters 250, and the optical splitters 272 are 1:8 or 1:16-way splitters; however, there could be 16 optical transmitters 250 and up to 64 optical sub-beams multiplexed onto 16 or fewer optical waveguides 900.

Figure 25B:
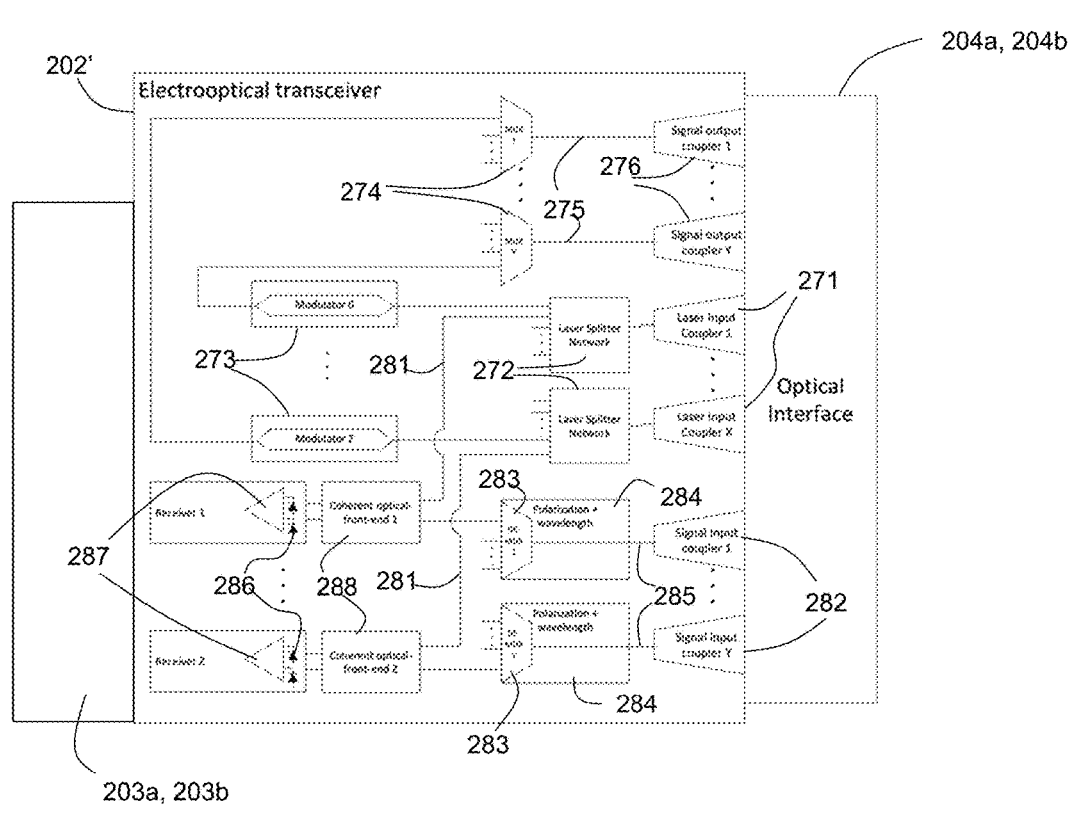

With reference to FIG. 25B, in another exemplary embodiment, additional components may be provided to implement a transceiver 202' including coherent optical transmitter and receiver, such as: i) an additional laser splitter path 281 to direct a local oscillator (LO) optical signal to the receiver coherent optical front end section of the transceiver 202 from the optical splitter device 272, ii) nested phase modulators inside the outer Mach-Zehnder interferometer 273, and a phase controller to add the phase modulator outputs in quadrature, as is well known in the art. The modulators 273 don't necessarily have to be nested phase modulators. One of the newer concepts in the DSP-free homodyne is to use a single (un-nested) Mach-Zehnder interferometer as a phase modulator for coherent communication.

The receiver section of the transceiver 202 and 202' comprises: one or more input couplers 282 to interface waveguides 285 to the RX optical interface 204b. None, one, or more optical demultiplexers 283 are configured to separate the various receiver input optical signals into separate waveguides each carrying one data signal. A polarization beam splitter and polarization rotator 284 may be provided configured to split orthogonally polarized, e.g. TE and TM polarized, input light into separate waveguides. One or more photodetectors 286, which may comprise doped silicon, germanium, SiGe, InP, GaAs, graphene, InGaAs, or InGaAsP, are configured to convert the input optical signals into input electrical signals. Optionally, electrical transimpedance amplifiers 287 or similar amplifier is provided to amplify the photocurrent output from the photodetectors 286.

Optionally, additional components may be provided to implement a coherent optical receiver for the coherent transceiver 202', such as a 90° optical hybrid or one or more 2×2MMIs 288 to combine the local oscillator optical signal and the input optical signal. Thermal tuners and VOAs may be provided within the coherent optical front-end to balance splitting ratios of the 90° hybrid or the 2×2MMIs 288, as well as relative optical phase response between the outputs of the 90° hybrid or 2×2MMI 288, and zero or one additional photodetector 286 per signal channel to implement a balanced detection.

With reference to FIGS. 26 and 27, it is possible to use the same optical waveguide 903, e.g. optical fiber, to carry a data signal in the forward and backward directions without the use of an optical isolator. A multi-channel bidirectional optical transceiver 302 (FIG. 26) and a multi-channel coherent bidirectional optical transceiver 302' (FIG. 27) will reduce the total number of optical fibers within the optical interface i.e. TX PHY 911 or RX PHY 921. Optical signals can be multiplexed by polarization, wavelength, or both and transmitted through the same fiber 903. One of the key advantages of a bidirectional transceiver 302 and 302' is that optical crosstalk in a bidirectional demultiplexer 291 does not directly result in a performance penalty because the signals are counter-propagating. The crosstalk signal will propagate through the optical transmitter 250 and eventually into the laser coupler fiber. Many lasers can tolerate −25 dB or more of relative power incident into their output facet relative to their output power while still maintaining adequate performance. Due to additional insertion losses through the transceiver chip and attenuation from the opposing light source from the optical transmitter 250 across the optical fiber 903, the isolation requirements of a bidirectional demultiplexer 291 are significantly relaxed. The bidirectional transceiver 303 and 302' concept can work with both IMDD (intensity modulated direct detection) and coherent communication systems.

The multi-channel bidirectional optical transceiver 302 (FIG. 26) and the multi-channel coherent bidirectional optical transceiver 302' (FIG. 27) comprise substantially the same elements as the multi-channel optical transceiver 202

(FIG. 24) and the multi-channel coherent optical transceiver 202' (FIG. 25), respectively, i.e. like reference numerals relate to like elements as describe above, except that the output couplers 276 and the input couplers 282 are replaced by input/output couplers 292, and the bidirectional demultiplexer 291 is provided, which is optically coupled to the input/output couplers 292 and configured for directing incoming optical signals to the optical demultiplexers 283 and for directing outgoing optical signals from the optical multiplexers 274 to the input/output couplers 292.

An exemplary bidirectional demultiplexer 291 comprises: a polarization controller; a polarization beam splitter and rotator, in combination with polarization maintaining fiber, i.e. optical waveguide 903, used in the network; and a WDM mux/demux (Echelle grating, arrayed waveguide grating, cascaded Mach-Zehnder interferometers, multi-mode couplers, ring resonators, coupled ring resonators, grating-assisted contra-directional couplers, or a combination of these and other suitable elements).

The transmitter and receiver sections of the transceiver 202, 202', 302 and 302' may be integrated on the same die or on separate die.

With reference to FIGS. 28A to 28C, nonlinear losses at high optical powers are a common problem for silicon waveguide systems. Unfortunately, as illustrated in FIG. 28C optical nonlinear losses are greater for a first polarization mode, e.g. the fundamental transverse electric ($TE_0$) polarization mode, while rotator splitter losses are greater for a second polarization mode, e.g. the orthogonally polarized fundamental transverse magnetic ($TM_0$) polarization mode. Using an optical polarization mode with lower nonlinear loss and splitting the input laser light in that mode before rotating improves the net fiber-to-waveguide coupling efficiency. Accordingly, inputting the input optical signal in the $TM_0$ polarization mode is better than in the $TE_0$ polarization mode, but rotating and splitting the input optical signal in the $TE_0$ polarization mode is better than in the $TM_0$ polarization mode.

A proposed structure for the optical splitter device 272 includes one or a plurality of splitters, each comprising a $TM_0$ polarization mode input, followed by 1×2 MMI splitter, followed by a polarization splitter and rotator (PSR) to convert the laser input to a $TE_0$ polarization mode. However, with reference to FIG. 28A, a preferred exemplary optical splitter device 272 includes one or a plurality of optical splitters 295, each optical splitter 295 comprising an input port 296 for receiving the $TM_0$ polarization mode from the optical transmitter 250, followed by a $TM_0$ polarization mode to a first order transverse electric ($TE_1$) polarization mode converter 297, followed by a y-branch splitter 298 with first and second output optical waveguide arms 299a and 299b, respectively, each configured to output a portion, e.g. a half, of the input optical signal in the $TE_0$ polarization mode. The optical splitter 295 is much more compact and broadband, since the y-branch splitter 298 is broadband while the conventional MMI splitter is not. Moreover, the optical splitter 295 is lower-loss than the conventional optical splitter, since most PSRs have ~1 dB loss in TM-to-TE conversion.

The optical splitter 295 comprises a rib waveguide 300a and a slab waveguide 300b. The rib waveguide 300a tapers from a first end with a first width at the input port 296 to a second end with a second wider width at a second end forming the y-branch splitter 298. Preferably, the rib waveguide 300a has a first taper, which is linear and at a first constant taper angle. The slab waveguide 300b extends from the first end at the input port 296 with first width to the second end with the second width. However, the slab waveguide 300b comprises: an initial tapered section with a wider taper angle than the first taper angle extending about a half the length, e.g. a midpoint, of the optical splitter 295 and expanding to a maximum width wider than the second width, and a final tapered section, which narrows down from the maximum width to the second width at the second end. Preferably, the initial tapered section has a constant linear taper, and the final tapered section has a constant linear taper, which could have equal and opposite angles or different angles.

The y-branch splitter 298 can be used because the $TE_1$ polarization mode has a field null along its axis, and thus there is very little back reflection at the junction, which has a minimum gap between the first and second output optical waveguide arms 299a and 299b, according to foundry design rules. The "high-nonlinearity" $TE_0$ polarization mode only exists as the $TE_1$ polarization mode, in a relatively wide waveguide, over a very short distance.

If more than two optical sub-signals are required, the optical splitter device 272 may comprise a plurality of the optical splitters 295 in a tree-like formation, i.e. with the output optical waveguide arms 299a and 299b coupled to the input ports 296 of subsequent optical splitters 295. Accordingly, when the input ports 296 of two (second level) optical splitters 295 are optically coupled to the output optical waveguide arms 299a and 299b of a single (first level) optical splitter 295, the optical splitter device 272 has a single input and four outputs. A third level of optical splitters 295 can be added to provide one input and eight outputs, etc, as required.

With reference to FIG. 29, the multiplexers 274 and the demultiplexers 283 for CWDM are challenging to design and manufacture due to inexact knowledge of the input laser wavelength from the optical transmitter 250. However, integrated tunable laser assemblies (ITLAs) enable precise and software-controlled selection of the laser wavelength. Accordingly, the optical transmitter 250 may comprise one or more ITLA in combination with a high-powered EDFA 301 followed by a 1:N optical splitter 272 to produce a plurality of optical signals with the same wavelength, which can reduce the total cost per mW while still allowing for the precise tuning of source wavelengths. Furthermore, when a plurality of ITLAs are used for the optical transmitters 250, each ITLA can generate a plurality of like-wavelength optical signals which are different for each ITLA, and one of each of the different wavelength optical signals can be multiplexed onto the same optical waveguide 903 via one of the multiplexers 274 after modulation in modulators 273, thereby reducing the number of optical waveguides 903, e.g. optical fibers, required to connect to the device 200 and relax the requirements on the multiplexers 274 and the demultiplexers 283.

With reference to FIG. 30, for some optical transceivers 202 in which the optical signal from one optical transmitter 250 is divided into a plurality of optical sub-signals on a plurality of lanes, e.g. waveguides, by a 1:N optical splitter 272, there are cases where the clock recovery circuit is only implemented on a single critical lane, e.g. TX 0, and then shared between all of the other lanes at the receiver end. However, a loss-of-signal on the critical lane with the clock recovery circuit will mean a loss-of-signal on all lanes. Accordingly, it is advantageous to increase margin by intentionally transmitting a higher power optical signal on the critical lane for the clock recovery signal. A primary unbalanced splitter 305 with an unbalanced split ratio, e.g. 1-2 or 1-4, whereby the critical lane receives an optical sub-signal with a larger fraction, e.g. $\frac{1}{3}$ to $\frac{1}{5}$, of the total optical power from the input optical transmitter 250. The remaining optical signal is then split into the plurality of optical sub-signals by a secondary optical splitter 306, e.g. 1:N−1. The primary unbalanced splitter 305 may be a directional coupler, an asymmetric Y-junction, or an asymmetric MMI coupler.

With reference to FIG. 31, to further reduce the number of optical waveguides 903 required, polarization multiplexing may be used in combination with wavelength multiplexing or by itself. As above, the optical transmitter 250, which may or may not be an ITLA, generates an optical signal, each optical signal having a different wavelength, which is split into a plurality of optical sub-signals by the optical splitters 272, and modulated into optical data signals by the modulators 273. One optical sub-signal from each optical transmitter 250, initially with the same polarization, is sent to a multiplexer comprising a polarization rotator and combiner 311, which rotates the polarization of one of the optical sub-signals to an orthogonal polarization, and combines the two optical sub-signals for transmission on the optical waveguide 903. At the receiver side, a polarization rotator and splitter 312 splits the combined optical sub-signals into the two, e.g. orthogonal, polarization states, and the demultiplexer 283 further separates the two sub-signals into distinct optical data signals.

A polarization rotator and splitter 312 with relaxed control-error/crosstalk followed by the wavelength demultiplexer 283, e.g. MZI/ring/other traditional demux technology, with similarly relaxed crosstalk can be used rather than a single high isolation demultiplexer 283, e.g. cascaded MZI. In this scheme, one stage of the demultiplexer 283 may be replaced with a polarization controller 313.

For any polarization controller 313, broadband splitters are preferred inside the cascaded Mach-Zehnder interferometer or else there is inherent wavelength sensitivity to the control. In cases where very broadband couplers are not available, the wavelength demultiplexer 283 can be inserted between the polarization splitter & rotator 312 and the active polarization controller 313.

With reference to FIG. 32, an exemplary polarization controller 313 is configured for the manipulation of one or both of the $TE_0$ and $TM_0$ polarization modes. The input state of polarization (SOP) of individual light signals is not necessarily constant over time because of changes in mechanical stress or thermal variation in the optical waveguides. Accordingly, an active polarization controller 313 may be employed including a controller 340 to continuously track polarization changes throughout the optical link 9, and in particular in receiver section of the transceiver 202, e.g. prior to the photodetectors 286. Tracking the polarization changes may be as simple as dithering the phases of a phase controller $333_1$ to $333_n$ with the objective of maximizing the optical output power in one or both of first and second output waveguides 338 and 339, e.g. or at least until a desired threshold (maximum or minimum) of output power in the first or second output waveguides 334 or 335 is reached or exceeded. The control system may comprise computer software stored in non-transitory memory executable on a processor, all or portions of which may be provided in the controller 340 or in a remote location connected thereto.

The polarization controller 313 includes an integrated optical device, in the form of a polarization splitter/rotator (PSR) 317, including a beam splitter 318 configured for splitting an input light signal 314 with both $TE_0$ and $TM_0$ polarization modes into a first sub-beam 321 with $TM_0$ polarized light and a second sub-beam 322 with $TE_0$ polarized light onto a first waveguide 323 and a second waveguide 324, respectively.

The PSR 317 also includes a polarization rotator 319 configured to rotate the polarization of at least one of the first and second sub-beams 321 and 322, whereby both the first and second sub-beams 321 and 322 have the same polarization. In a preferred embodiment, the polarization of the TM polarized light of the first sub-beams 321 is rotated by 90° to be TE polarized light by using the polarization rotator 319 disposed in the path of the first sub-beam 321. Exiting the PSR 317, both the first sub-beam 321 and the second sub-beam 322 are transmitted as two modes with the same polarization, e.g. TE, traveling in the first and second waveguides 323 and 324, respectively.

In some embodiments, the polarization controller 313 may comprise a plurality of Mach-Zehnder interferometers in series, each interferometer comprising parallel pairs of waveguide arms, one of the phase controllers $331_1$ to $331_n$ in one or both waveguide arms, and optical couplers $334_1$ to $334_n$ at one or both ends of the pairs of waveguide arms for combining and/or splitting the first and second sub-beams 321 and 322. A variable optical attenuator 335 may be provided in one or both of the pair of waveguide arms, configured to provide optical attenuation under control of the controller 340. The optical couplers may be 3 dB optical couplers, directional couplers, cascaded directional couplers of different coupling lengths, or multimode interferometers.

Each coupler $334_1$ to $334_n$ may comprise a 2×2 50/50 waveguide coupler including two input ports, two output ports, and a multi-mode interference MMI region, but other configurations are possible. The two input ports of the first coupler $334_1$ may be coupled to the first and second waveguides 323 and 324, respectively, and the two output ports of the first coupler $334_1$ may be coupled to the two input ports of the second coupler $334_2$, respectively. Each of the plurality of phase controller $333_1$ to $333_n$ may be followed by one of the plurality of couplers $334_1$ to $334_n$ in an alternating fashion, e.g. the first phase controller $333_1$ is optically coupled to one of the two input ports of the first coupler $334_1$, and the second phase controller $333_2$ is disposed between one of the output ports of the first coupler $334_1$ and one of the input ports of the second coupler $334_2$. Accordingly, the first sub-beam 321 and the second sub-beam 322 are combined in the first coupler $334_1$, which outputs a first combined sub-beam and a second combined sub-beam via the two output ports. The second phase controller $333_2$ then adjusts the phase of one of the first combined sub-beam and the second combined sub-beam, which are then combined in the second coupler $334_2$. The final phase controller $333_n$ then adjusts the phase of one of the previously combined and separated sub-beams from the previous coupler $334_{n-1}$, which are then combined in the last coupler $334_n$. The last coupler $334_n$ outputs substantially all of the combined sub-beams to the single output waveguide or port 338 or 339, or substantially all of a single optical mode, such as $TE_0$ or $TM_0$, that originated from the far end of an optical fiber 9 coupled to the input port 314. For example, an optical transmitter 250 may multiplex two optical signals onto the $TE_0$ and $TM_0$ mode of an optical waveguide 903. However, after propagation through the optical waveguide 903 and then subsequently connected to another optical waveguide, e.g. interface waveguides 285, at the receiver section, that other waveguide $TE_0$ mode will contain fractions of both the original $TE_0$ and $TM_0$ mode from the originating optical waveguide 903.

The variable phase controllers $333_1$ to $333_n$ may be connected by electrical trace connectors in the PIC to the controller 340, which may set the variable phase controller $333_1$ to $333_n$ to maximize the optical power on the output waveguide 338, which then connects to a subsequent optical component, e.g. a photodetector 286. One of the output ports of the last coupler $334_n$, e.g. $334_2$, is coupled to the output waveguide 338, while the other output port of the last coupler $334_n$, e.g. $334_2$, may be coupled to the second output port 339 or a terminated waveguide. One or more monitor photo diodes (MPD) 346, electrically connected to the controller 340 and optically connected to the output waveguide 338, or any of the plurality of waveguides coupling between $334_1$ to $334_n$, may be used to provide an indication of the optical power of the single output beam in the first output waveguide 338, or any of the plurality of waveguides coupling between $334_1$ to $334_n$, for the maximization control process used by the controller 340 to control the phase controller $333_1$ to $333_n$. A small portion, e.g. 3%-6%, of the light in the output waveguide 338, any of the plurality of waveguides coupling between $334_1$ to $334_n$, may be tapped off using a tap 347 coupled to the MPD 346. Alternatively, the MPD 346 and the tap 347 may be disposed on the second output waveguide 349 and may be used in a minimization control routine, i.e. to provide an indication of the optical power of the output beam in the output waveguide 339, employed by the controller 340 to control the phase controller $333_1$ to $333_n$.

One potential problem of the polarization controller 313 is that the range of control is limited by the range over which the phases controller $333_1$ to $333_n$ may vary. Phase controller $333_1$ to $333_n$ are typically voltage or current controlled and their ranges are limited by their control electronics. Polarization changes may eventually lead the phase controller $333_1$ to $333_n$ to their control limits at which time, the SOP can no longer be tracked and the optical power on the first and second output waveguides 334 and 335 will begin to drop. If the phase controller $333_1$ to $333_n$ are designed with a radian range, they can generally control any a radian rotation of the input SOP before they reach their limit. Each phase controller $333_1$ to $333_n$ may comprise a single phase tuner 353, which may be a thermal phase tuner, which may include air-filled trenches and/or an undercut, but do not have to include either. The thermal phase tuners could also be reverse-biased PN or PIN diodes, forward biased PIN diodes, mechanically actuated phase shifters (MEMS).

With reference to FIG. 33, one or more of the phase controller $333_1$ to $333_n$ may be an endless phase controller, which may be constructed by a series of Mach-Zehnder interferometers (MZI) within one or more of the pairs of waveguide arms of the MZI of the polarization controller 313. The couplers inside the MZI can be directional couplers, cascaded directional couplers of different coupling lengths, or multimode interferometers.

Alternatively, in some embodiments, each phase controller $333_1$ to $333_n$, may comprise a plurality of Mach Zehnder interferometer stages, comprising pairs of parallel waveguide arms separated by optical couplers 354 with a phase tuner 353 in one or both waveguide arm of each pair. The phase tuners 353 may be able to translate any input SOP to any output SOP which enables all the input optical power to be placed on the first output waveguide 338, the second output waveguide 339 or evenly therebetween. However, one or more additional stages may be included, as illustrated in FIG. 33 to enable "endless" polarization control by the controller 340. To illustrate this consider using the first set, e.g. one or two. of the phase tuners 353 to track polarization and maintain maximum optical power on the first output waveguide 338, while a second set, e.g. one or two, of the phase tuners 353 are left at some nominal value in the center of their control range. Once the control limit is reached in the first set of phase tuners 353, the second set of phase tuners 353 may be configured to continue to track polarization, while the first set of phase tuners 353 are concurrently reset to the center of their control range. This provides a reset free or endless polarization tracking ability to the polarization controller 313. Accordingly, a plurality of phase tuners 353 sequentially adjust a phase difference between respective incoming sub-beams 321 and 322; and the plurality of couplers $334_1$ to $334_n$ sequentially combine the respective incoming sub-beams 321 and 322, and sequentially output combined sub-beams 321 and 322 until the final coupler $334_2$ or $334_n$, which outputs the single output beam to the output waveguide 338 and minimal, if any, light to second output waveguide 339 or the terminated waveguide 339. It should be noted that while the invention is described with waveguides that carry TE light, it is not limited to applications of this particular mode, it is only used to simplify the description of the invention.

Depending on how the overall AI computer system links are implemented, it may not be necessary to use an endless phase controller 313. For example, if there is no expected long-term polarization drift in the fibers, then a single phase shifter 333 could be used instead of an endless phase shifter 333. Or, in the case where a brief period of loss-of-signal, in which the data is known to be bad due to polarization crosstalk, is acceptable if the polarization reaches the edge of the control range, a brief "reset" period may be initiated. During this reset, the non-endless phase shifters 333 could be placed into the middle of their control range and then data transmission could be resumed.

With reference to FIGS. 34-39, in order to control yield for large quantities of optical components, the socket connector 216 may be used to attach the PIC 221, i.e. the transceiver 202, to the substrate 211 or the printed circuit board 225. However, the size of the socket connector 216 forces a lower limit to the physical separation between the PIC 221 and the ASIC 201, if the socket connectors 216 are placed all on the same side of the substrate 211. Placing the socket connectors 216 on two sides, e.g. top and bottom, of the substrate 211 is challenging due to mechanical warpage, stress, and stability. A method to create a "socket sandwich" enables a lower power consumption to electrically connect the digital IC and the socket connector 216 and smaller substrate designs with reduced mechanical concerns, such as warpage and yield.

The socket connector 216 may comprise land grid array (LGA) socket technology, which is a packaging technology with a grid of contacts, i.e. lands, on the underside of a package. The contacts are to be connected to a grid of contacts on the substrate 211 or the PCB 225. The contacts may be stamped metal contacts. The socket connectors 216 are important for providing a means to interchange the PICs 221 after the device 200 has been assembled.

The double socket technology concept may require a precise loading mechanism (LM). The LM will create easy heatsink adaptation and allow multiple generations of CPU designs to be compatible. The LM must be designed to handle a range of loading to protect the transceivers 202 and the socket connectors 216. In some embodiments, a compression cover 401 is used to cover, mount and protect the individual transceivers 202 or a plurality of the transceivers 202. With the ASIC 201 mounted in the middle of the substrate 211, an array of transceivers 202, e.g. 1 to 10 transceivers, preferably 3-5 transceivers, is mounted opposite each side of the ASIC 201, i.e. four arrays of transceivers 202. The transceivers 202 may be SFP modules, e.g. copper, configured to receive a pluggable optical fiber, or hardwired optical modules, e.g. transceivers 202, 202', 302 or 302'. Mechanical fasteners 402 are included for securing the compression cover 401 to corresponding connectors 403, e.g. threaded inserts, in or on the PCB 225. The mechanical fasteners 402 may include (FIG. 34) a head 406, a threaded shaft 407, a washer 408 mounted on the threaded shaft configured for engaging the compression cover 401, and a spring 409 extending between the head 406 and the washer 408 configured for adjusting a loading force on the compression cover 401.

A loading force fluctuation can be implemented by the mechanical fasteners 402, which should have a specific torque value associated with the target transceiver 202 and socket connector 216. Since the backing plate used in a single-sided socket cannot be implemented for the LM of the double socket, the loading mechanism flexural stiffness should be precisely configured to avoid any undesired warpage. An extensive tolerance study may be conducted to ensure all the mechanical components are self-locating and self-fixturing. A compression wave spring 411 may be provided between the compression cover 401 and the transceivers 202 configured for applying a more equally distributed force from the compression cover 401 to the transceivers 202. The compression wave spring 411 may extend around the periphery of the compression cover 401 and/or the transceivers 202.

A thermal solution should follow the double-sided concept in order to cover both sides of the PCB 225. An exemplary embodiment includes a heat sink 412 that can be integrated with the compression cover 401, which can be easily assembled and disassembled. In the illustrated embodiment, a plurality of thermal bridge heat sinks 412 are mounted in openings 413 on each compression cover 401, and each heat sink 412 extending into engagement with a corresponding transceiver 202. In addition, as illustrated in FIG. 37, a device cover 421 may be mounted on the PCB 225 using mechanical fasteners 422 for covering the entire device 200.

With reference to FIG. 40, an optical fiber redundancy system is provided in some embodiments, for components that have high intra-chip variation, such as high-component loss variation or high fiber-chip coupling loss variation. At the output of the transceiver 202 or the TX optical interface 204a, an optical switch 510, e.g. 1×2 to 1×4 optical switch, is provided to divide the output optical signal onto a plurality of interim fibers 511 in a fiber array 512. The interim fibers 511 with best optical alignment could be split out and chosen to connect to a final output optical fiber ribbon 515 for the optical waveguides 903.

With reference to FIGS. 41-44, in an effort to reduce the optical shoreline requirement for each transceiver 202 on each device 200, some embodiments use multi-core optical fibers (MCF) 550 for coupling to the edge of the device 200. In many conventional fiber-chip edge coupling, the density of optical I/O is limited not by the optical crosstalk between adjacent channels or feature sizes on the PIC 221, but by the mechanical dimensions of conventional fiber optical cables. Single-mode fibers with 80 μm or 125 μm diameter cladding are common; however, the core sizes within these fibers are often close to 10 μm, wherein multi-core fibers can pack additional cores within the same 80 μm or 125 μm diameter cladding. An interface planar lightwave circuit (PLC) 555, e.g. comprising glass or silicon, such as the one disclosed in U.S. patent application Ser. No. 17/903,410, entitled Waveguide to Fiber Transposer, filed Sep. 6, 2022 in the name of Neal et al, which is incorporated herein by reference, could be used to break-out the MCF 550 in 3-dimensions, i.e. transpose the cores in each MCF 550 to a linear array of SMF fibers 560, thereby interfacing to standard SMF fibers 560 far away from the PIC 221 where optical shoreline density is not a concern. Optionally, the interface PLC 555 may also contain additional functionality, such as optical multiplexers & demultiplexers, thereby reducing or eliminating the need for some or all of the multiplexers 274 and/or some or all of the demultiplexers 283 on the transceiver 202. Accordingly, the optical link 9 includes an optical waveguide 903 comprising a middle section of SMF fibers 560, and two end sections, one at each end of the SMF fibers 560, with the interface PLC 555 and one or more MCF 550.

One embodiment of the interface PLC 555 comprises: a wavelength multiplexer and demultiplexer PLC device 565 with a first MCF fiber array unit (FAU) 561, e.g. 16×, extending out from one end thereof, and a second SMF fiber array unit (FAU) 562, e.g. 16×, extending out from an opposite end thereof. The construction of the first MCF FAU 561 comprises a first baseplate 571 with V-grooves, comprised of glass or silicon; and a first cover glass lid 572 with the MCF fibers 550 sandwiched therebetween. The second SMF FAU 562 comprises a second baseplate 581 with V-grooves, comprised of glass or silicon; and a second cover glass lid 582 with the SMF fibers 560 sandwiched therebetween.

In the illustrated exemplary embodiment, the interface PLC 555 comprises: a 16× (8 Tx and 8 Rx) 4-channel Mux/Demux device 565; a 16×(8 Tx and 8 Rx) FAU 561 of multi-core fibers (MCF) 550 embedded in V-grooves with cores aligned horizontally, terminated with polished bare end-face, coupling to the transceiver 202 and the PLC device 565; a 16× (8 Tx and 8 Rx) FAU 562 of single mode fiber (SMF) 560 embedded in V-groove, terminated with fiber connectors, coupling to the PLC device 565. A 16× 4-core MCF FAU 561 supports 32× duplex fiber channels with 1 color per channel. After the PLC device 565, each SMF 560 carries 4× different optical wavelength channels, e.g. colors. The cable assembly supports 3.2 Tbps data transfer, if each core of the MCF 550 carries 100 Gbps.

A third MCF FAU 563 is configured for coupling to the transceivers 202. The third MCF FAU 563 comprises a third baseplate 591 with V-grooves, comprised of glass or silicon; and a third cover glass lid 592 with the MCF fibers 550 sandwiched therebetween. The third MCF FAU 563 may also include a plurality, e.g. four, of polarization maintaining fibers (PMF) 580 extending between the light sources 250 and the TX optical interface 204a configured for maintaining the state of polarization of the light from the light sources 250 to the transceivers 202, 202', 302, 302'.

In another exemplary embodiment illustrated in FIG. 46, the interface PLC 555 is completely eliminated in cases where a breakout to SMF 560 is unnecessary, since the entire span of the optical waveguide 900 comprises MCF 550. In this embodiment both ends of the optical waveguide 900 comprise one of the MCF FAUs 563, each of which comprises: one of the baseplates 591 with V-grooves made from glass or silicon; and one of the cover glass lids 592. The MCF FAU 563 may include a plurality of multi-core fiber (MCF) 550, e.g. eight to sixteen, embedded in the V-groove baseplate 581 with cores aligned horizontally, terminated with polished bare end-face. A plurality, e.g. two to six, polarization maintaining fibers (PMF) 580 may also be embedded in V-groove baseplate 581 with stress rods aligned vertically, terminated with polished bare end-face at the baseplate 581 and fiber connectors at the other ends.

The foregoing description of one or more example embodiments has been presented for the purposes of illustration and description. It is not intended to be exhaustive or to limit the invention to the precise form disclosed. Many modifications and variations are possible in light of the above teaching. It is intended that the scope of the disclosure be limited not by this detailed description.

We claim:

1. A computer system comprising:

a plurality of memory aggregation devices configured to retrieve data from and store data in a plurality of random access memory modules forming a unified contiguous memory address space disaggregated from a processing unit;

a plurality of computational devices configured for simultaneously launching a plurality of data signals including memory read and/or write requests for the data to the plurality of memory aggregation devices; and a plurality of optical links configured for coupling each of the plurality of memory aggregation devices to each of the plurality of computational devices for transferring the data therebetween;

wherein the plurality of computational devices are configured to read/write multiple read/write requests simultaneously in parallel across the unified contiguous memory address space in the plurality of random access memory modules via the plurality of memory aggregation devices;

wherein the plurality of optical links comprises a plurality of transmitter optical links and a plurality of receiver optical links; and wherein the plurality of transmitter optical links comprises:

a first light source coupled to a first one of the plurality of memory aggregation devices or a first one of the plurality of computational devices configured for generating a first optical beam;

a first photonic integrated circuit (PIC) mounted on the first one of the plurality of memory aggregation devices or the first one of the plurality of computational devices comprising:

a first splitter configured for splitting the first optical beam into a plurality of first optical sub-beams;

a first plurality of modulators configured for modulating the plurality of first optical sub-beams into a plurality of first modulated optical signals;

a first optical waveguide coupled to an edge of the first PIC configured for transmitting a first one of the plurality of first modulated optical signals from the first one of the plurality of memory aggregation devices or the first one of the plurality of computational devices;

a second optical waveguide coupled to the edge of the first PIC configured for transmitting a second one of the plurality of first modulated optical signals from the first one of the plurality of memory aggregation devices or the first one of the plurality of computational devices; and a second photonic integrated circuit (PIC) mounted on the second one of the plurality of memory aggregation devices or the second one of the plurality of computational devices, comprising:

a first plurality of photodetectors for converting the first one of the plurality of first modulated optical signals and the second one of the plurality of first modulated optical signals into respective electrical signals.

2. The computer system according to claim 1, further comprising:

a second light source coupled to the first one of the plurality of memory aggregation devices or the first one of the plurality of computational devices configured for generating a second optical beam;

wherein the first photonic integrated circuit (PIC) includes:

a second splitter configured for splitting the second optical beam into a plurality of second optical sub-beams;

a second plurality of modulators configured for modulating the second optical sub-beams into a plurality of second modulated optical signals;

a first multiplexer configured for combining a first one of the plurality of first modulated optical signals and a first one of the plurality of second modulated optical signals into a first multiplexed optical signal; and a second multiplexer configured for combining a second one of the plurality of first modulated optical signals and a second one of the plurality of second modulated optical signals into a second multiplexed optical signal;

wherein the first multiplexed optical signal is transmitted on the first optical waveguide;

wherein the second multiplexed optical signal is transmitted on the second optical waveguide;

wherein the second photonic integrated circuit (PIC) includes:

a first demultiplexer coupled to the first optical waveguide configured for demultiplexing the first multiplexed optical signal into the first one of the plurality of first modulated optical signals and the first one of the plurality of second modulated optical signals;

a second demultiplexer coupled to the second optical waveguide configured for demultiplexing the second multiplexed optical signal into the second one of the plurality of first modulated optical signals and the second one of the plurality of second modulated optical signals.

3. The computer system according to claim 2, wherein the plurality of receiver optical links comprises:

a third light source coupled to the second one of the plurality of memory aggregation devices or the second one of the plurality of computational devices configured for generating a third optical beam;

wherein the second photonic integrated circuit (PIC) comprises:

a third splitter configured for splitting the third optical beam into a plurality of third optical sub-beams;

a third plurality of modulators configured for modulating the plurality of third optical sub-beams into a plurality of third modulated optical signals;

a fourth light source coupled to the second one of the plurality of memory aggregation devices or the second one of the plurality of computational devices configured for generating a fourth optical beam;

a fourth splitter configured for splitting the fourth optical beam into a plurality of fourth optical sub-beams;

a fourth plurality of modulators configured for modulating the fourth optical sub-beams into a plurality of fourth modulated optical signals;

a third multiplexer configured for combining a first one of the plurality of third modulated optical signals and a first one of the fourth modulated optical signals into a third multiplexed optical signal;

a fourth multiplexer configured for combining a second one of the plurality of third modulated optical signals and a second one of the plurality of fourth modulated optical signals into a fourth multiplexed optical signal;

a third optical waveguide configured for transmitting the third multiplexed optical signal from the second one of the plurality of memory aggregation devices or the second one of the plurality of computational devices;

a fourth optical waveguide configured for transmitting the fourth multiplexed optical signal from the second one of the plurality of memory aggregation devices or the second one of the plurality of computational devices;

wherein the first photonic integrated circuit (PIC) also comprises:

a third demultiplexer coupled to the third optical waveguide and to the first one of the plurality of memory aggregation devices or the first one of the plurality of computational devices configured for demultiplexing the third multiplexed optical signal into the first one of the plurality of third modulated optical signals and the first one of the plurality of fourth modulated optical signals; and a fourth demultiplexer coupled to the fourth optical waveguide and to the first one of the plurality of memory aggregation devices or the first one of the plurality of computational devices configured for demultiplexing the fourth multiplexed optical signal into the second one of the plurality of third modulated optical signals and the second one of the plurality of fourth modulated optical signals; and a second plurality of photodetectors for converting the first one of the plurality of third modulated optical signals, the first one of the plurality of fourth modulated optical signals, the second one of the plurality of third modulated optical signals, and the second one of the plurality of fourth modulated optical signals into respective electrical signals.

4. The computer system according to claim 3, wherein the third plurality of modulators comprise coherent modulators;

wherein the first PIC includes a plurality of coherent receivers configured to combine a first plurality of local oscillator optical signals with the first one of the plurality of third modulated optical signals, the first one of the plurality of fourth modulated optical signals, the second one of the plurality of third modulated optical signals, and the second one of the plurality of fourth modulated optical signals into respective electrical signals; and wherein the first plurality of local oscillator optical signals includes a third one of the plurality of first optical sub-beams, and a third one of the plurality of second optical sub-beams.

5. The computer system according to claim 3, wherein the first optical waveguide comprises the third optical waveguide; and wherein the second optical waveguide comprises the fourth optical waveguide;

wherein the computer system further comprises:

a first bidirectional demultiplexer optically coupled to the first optical waveguide and configured for directing the third multiplexed optical signal to the third demultiplexer, and for directing the first multiplexed optical signal to the first optical waveguide; and a second bidirectional demultiplexer optically coupled to the second optical waveguide and configured for directing the fourth multiplexed optical signal to the fourth demultiplexer, and for directing the second multiplexed optical signal to the second optical waveguide.

6. The computer system according to claim 2, wherein the first multiplexer comprises a polarization rotator and combiner for rotating a first polarization state of the first one of the plurality of first optical signals to be orthogonal to a second polarization state of the first one of the plurality of second optical signals before combining into the first multiplexed optical signal; and wherein the first demultiplexer comprises: a polarization rotator and splitter configured for splitting the first combined multiplexed optical signal into the first one of the plurality of first modulated optical signals with the first polarization state, and the first one of the plurality of second modulated optical signals with the second polarization state, and for rotating one of the first polarization state or the second polarization state to be a same polarization; and a WDM demultiplexer configured for further separating the first one of the plurality of first modulated optical signals and the first one of the plurality of second modulated optical signals into distinct optical data signals.

7. The computer system according to claim 6, further comprising a polarization controller configured for manipulation of one or both of the first polarization state and the second polarization state;

wherein the polarization controller comprises:
a plurality of first Mach-Zehnder interferometers in series, each first Mach-Zehnder interferometer comprising parallel pairs of waveguide arms;
a phase controller in one or both of the waveguide arms;
wherein each phase controller comprises: a plurality of second Mach Zehnder interferometer stages, each of the plurality of second Mach Zehnder interferometers comprising first and second parallel waveguide arms separated by optical couplers; and a phase tuner in one or both of the first and second waveguide arms.

8. The computer system according to claim 1, wherein the first splitter comprises:
an input port for receiving the first optical beam in a first fundamental (TM$_0$) polarization mode from the first light source;
a polarization mode converter for converting the first, fundamental polarization mode (TM$_0$) to a second, first-order polarization mode (TE$_1$);
a y-branch splitter including a first output optical waveguide arm and a second output optical waveguide arm, each configured to output a portion of the first optical beam in the second, fundamental polarization mode (TE$_0$).

9. The computer system according to claim 8, wherein the polarization mode converter comprises:
a rib waveguide, which tapers with a first taper angle from a first end with a first width at the input port to a second end with a second wider width at a second end at the y-branch splitter; and
a slab waveguide, which comprises: an initial tapered section with a second taper angle wider than the first taper angle and expanding to a maximum width wider than the second width; and a final tapered section, which narrows down from the maximum width to the second width at the second end.

10. The computer system according to claim 1, wherein the first optical waveguide includes a first optical core of a first multi-core optical fiber optically coupled to the first PIC, and wherein the second optical waveguide includes a second optical core of the first multi-core optical fiber.

11. The computer system according to claim 10, wherein the first optical waveguide includes an optical interface optically coupled to the first optical core of the first multi-core optical fiber, and a first single mode fiber optically coupled to the optical interface; and wherein the second optical waveguide includes the optical interface optically coupled to the second optical core of the first multi-core optical fiber, and a second single mode fiber optically coupled to the optical interface.

12. The computer system according to claim 1, further comprising a third photonic integrated circuit substantially identical to the first photonic integrated circuit;
wherein the first one of the plurality of memory aggregation devices or the first one of the plurality of computational devices includes a first substrate;
wherein the first photonic integrated circuit (PIC) is mounted on a first surface of the first substrate; and
wherein the third photonic integrated circuit (PIC) is mounted on a second surface of the first substrate opposite the first surface.

13. The computer system according to claim 1 wherein the first splitter comprises:
a primary unbalanced optical splitter with an unbalanced split ratio configured for splitting the first optical beam into a first one of the plurality of first optical sub-beams and a remaining portion of the first optical beam, whereby the first one of the plurality of first optical sub-beams comprises a larger fraction of a total optical power of the first optical beam than each of the other of the plurality of first optical sub-beams; and
a secondary optical splitter configured for splitting the remaining portion of the first optical beam into others of the plurality of first optical sub-signals.

14. The computer system according to claim 1, wherein each transmitter optical link and each receiver optical link comprises a serializer for converting the data from parallel electrical signals to serial optical signals; and a deserializer for converting the serial optical signals into parallel electrical signals at the computational devices and the memory aggregation devices.

15. The computer system according to claim 1, wherein the plurality of optical links connected to the plurality of memory aggregation devices provide substantially all of an available read/write bandwidth of the plurality of random access memory modules to be accessed simultaneously.

16. The computer system according to claim 1, further comprising a switching system configured to provide any to any switching of the data signals between the plurality of computational devices and the plurality of memory aggregation devices.

17. The computer system according to claim 1, wherein each computational device includes a memory copy engine configured to move the data over the optical links from any memory in any of the plurality of computational devices, the plurality of memory aggregation devices and the plurality of random access memory modules to anywhere in the plurality of random access memory modules.

18. The computer system according to claim 17, wherein each memory copy engine is configured to divide transfers of data into packets and to dispatch the packets over multiple communication links in parallel and substantially simultaneously to a plurality of the plurality of memory aggregation devices for uniformly storing in a plurality of the plurality of random access memory modules.

19. The computer system according to claim 17, wherein the plurality of computational devices comprises at least eight computational devices;

wherein the plurality of memory aggregation devices comprises at least eight memory aggregation devices;

wherein each memory copy engine is configured to launch at least sixteen of the memory read and/or write requests in parallel and substantially simultaneously to each memory aggregation device over the optical links there between.

20. The computer system according to claim 19, wherein the plurality of random access memory modules include four to eight random access memory modules per memory aggregation device.

\* \* \* \* \*